United States Patent [19]

Graziano et al.

[11] Patent Number: 5,758,075
[45] Date of Patent: May 26, 1998

[54] MULTIMEDIA COMMUNICATION APPARATUS AND METHODS

[75] Inventors: Michael J. Graziano, Warrenton; Jon F. Hauris; Daniel L. Stanley, both of Manassas, all of Va.

[73] Assignee: International Business Machines Corporation, Armonk, N.Y.

[21] Appl. No.: 719,050

[22] Filed: Sep. 24, 1996

Related U.S. Application Data

[62] Division of Ser. No. 282,376, Jul. 29, 1994, Pat. No. 5,687,316.

[51] Int. Cl.⁶ .................. G06F 13/00; H04L 5/00
[52] U.S. Cl. ............ 395/200.8; 395/872; 370/463
[58] Field of Search .............. 395/200.8, 200.81, 395/200.61, 874, 875, 876, 872; 370/438, 439, 463

[56] References Cited

U.S. PATENT DOCUMENTS

| | | | |
|---|---|---|---|
| 4,507,760 | 3/1985 | Fraser | 365/221 |
| 4,682,284 | 7/1987 | Schrofer | 364/200 |
| 4,698,802 | 10/1987 | Goke et al. | 370/60 |
| 4,807,111 | 2/1989 | Cohen | 395/874 |
| 4,816,996 | 3/1989 | Hill et al. | 364/200 |
| 4,914,652 | 4/1990 | Nguyen | 370/85.15 |
| 4,951,280 | 8/1990 | McCool | 370/85.12 |
| 4,955,019 | 9/1990 | Mizuhara et al. | 370/85.7 |
| 5,001,704 | 3/1991 | Narup | 370/85.13 |
| 5,043,938 | 8/1991 | Ebersole | 364/900 |
| 5,043,981 | 8/1991 | Firoozmand | 370/85.1 |
| 5,065,397 | 11/1991 | Shiobara | 370/85.5 |

FOREIGN PATENT DOCUMENTS 459753  4/1991  European Pat. Off. .

OTHER PUBLICATIONS

Digital Tech. Journal, vol. 3/No. 2, pp. 10–18 by W. R. Hawe et al., "Fiber Distributed Data Interface Overview".
Proceedings of SPIE vol. 1577, Sep. 1991, High–Speed Fiber Networks & Channels, article by R. Venkataraman; "Designing a VMEbus FDDI Adapter Card"; pp. 86–96.
Elettronica OGGI (Italy), No. 97–31 Marzo 1990, pp. 101–109 by Emanuele Dal Lago.

*Primary Examiner*—Dinh C. Dung
*Attorney, Agent, or Firm*—John D. Flynn; Morgan & Finnegan

[57] ABSTRACT

A communications adapter receives and transmits simultaneously packet and/or isochronous data between two interfaces; a network and a host bus system. The adapter stores the isochronous and packet data in receive and transmit queues configured in a FDDI RAM buffer. A controller manages the transfers of the data into and out of the queues. A local bus interacts with the system to provide descriptors of addresses in the system for transfers of data out of the queues to the system or the network. The controller is programmable to provide a variable threshold for the transfer of data between the queues and the system or the network. A systems interface unit handles the transfer of data to/from the system and allows data to bypass the queues and directly access the system or the network.

48 Claims, 32 Drawing Sheets

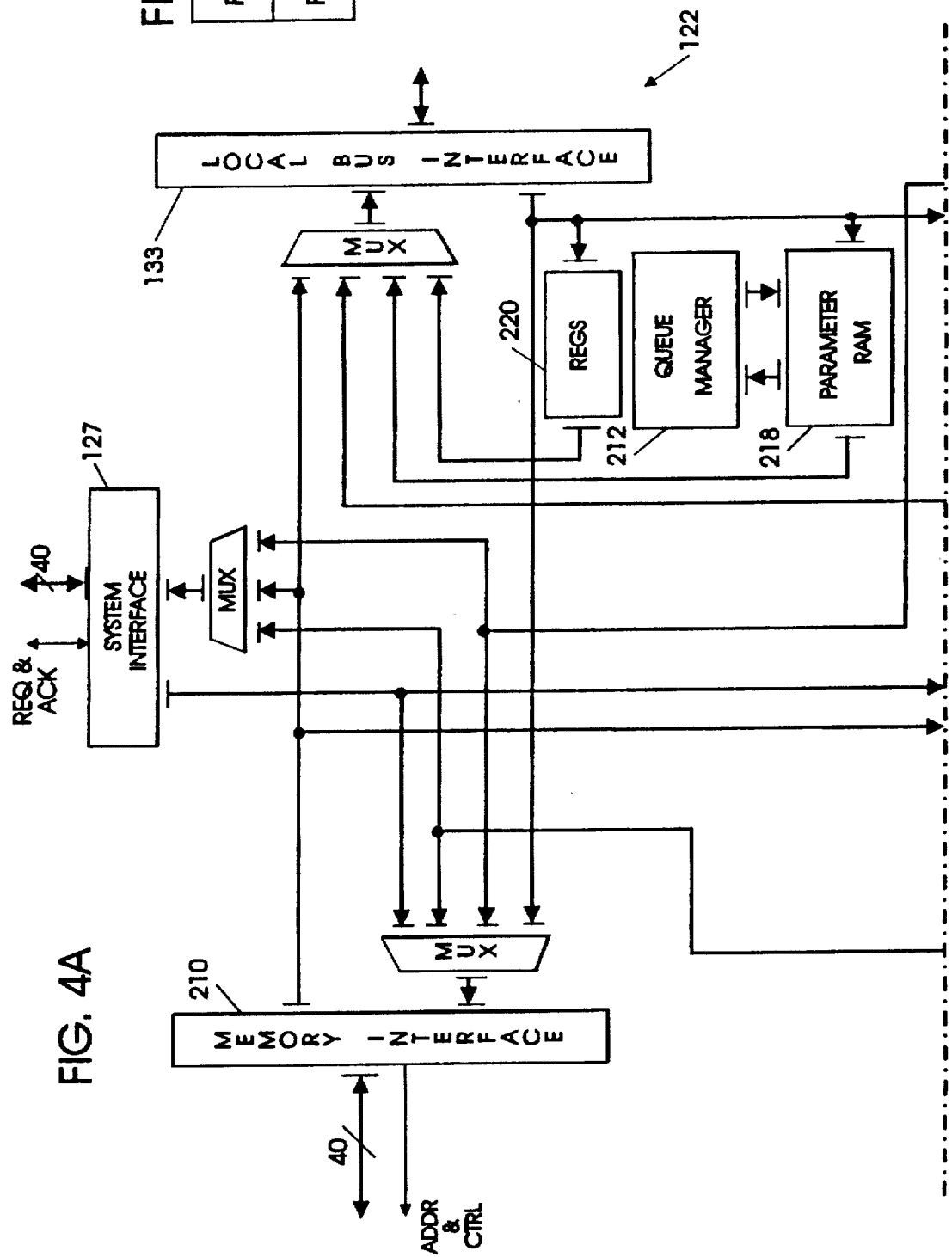

FIG. 5A

TABLE 1. CONTROLLER RECEIVE QUEUES.

| QUEUE NUMBER | QUEUE USAGE | ADDITIONAL PROGRAMMABLE OPTIONS |
|---|---|---|
| 0 | RECEIVES SYNCHRONOUS FRAMES. | NONE. |
| 1 | RECEIVES ASYNCHRONOUS AND MAC FRAMES. | SKIP OPTION USING BIT 4 OF MODE REG: FILTERS DUPLICATES OF DIRECTED BEACONS MAC FRAMES. |
| 2 | RECEIVES SMT FRAMES. | NONE. |
| 3-7 | RECEIVES ISOCHRONOUS RING DATA. | NONE. |

FIG. 5B

TABLE 2. CONTROLLER TRANSMIT QUEUES.

| QUEUE NUMBER | QUEUE USAGE |
|---|---|
| 0 | • TRANSMITS SYNCHRONOUS FRAMES WHEN BIT 8 OF MODE REG IS RESET. |
| 1 | • TRANSMITS ISOCHRONOUS TRAFFIC WHEN BIT 8 OF MODE REG IS SET.<br>• TRANSMITS ASYNCHRONOUS AND MAC FRAMES IN NORMAL MODE AND BIT 7 OF MODE REG IS RESET.<br>• TRANSMITS VOID OR BEACON FRAMES IN VOID OR BEACON MODE. |
| 2-7 | • TRANSMITS ISOCHRONOUS RING DATA. |

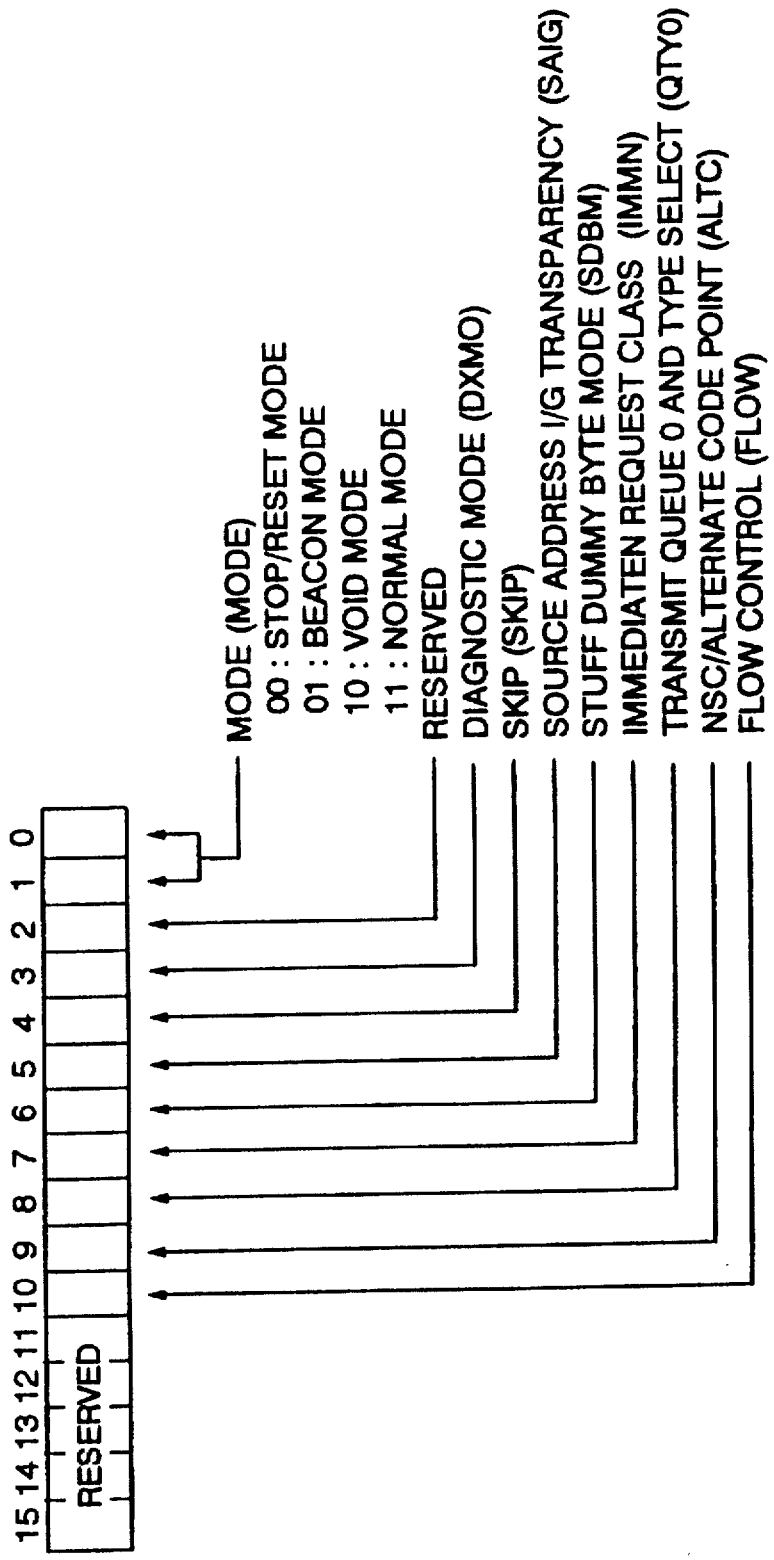

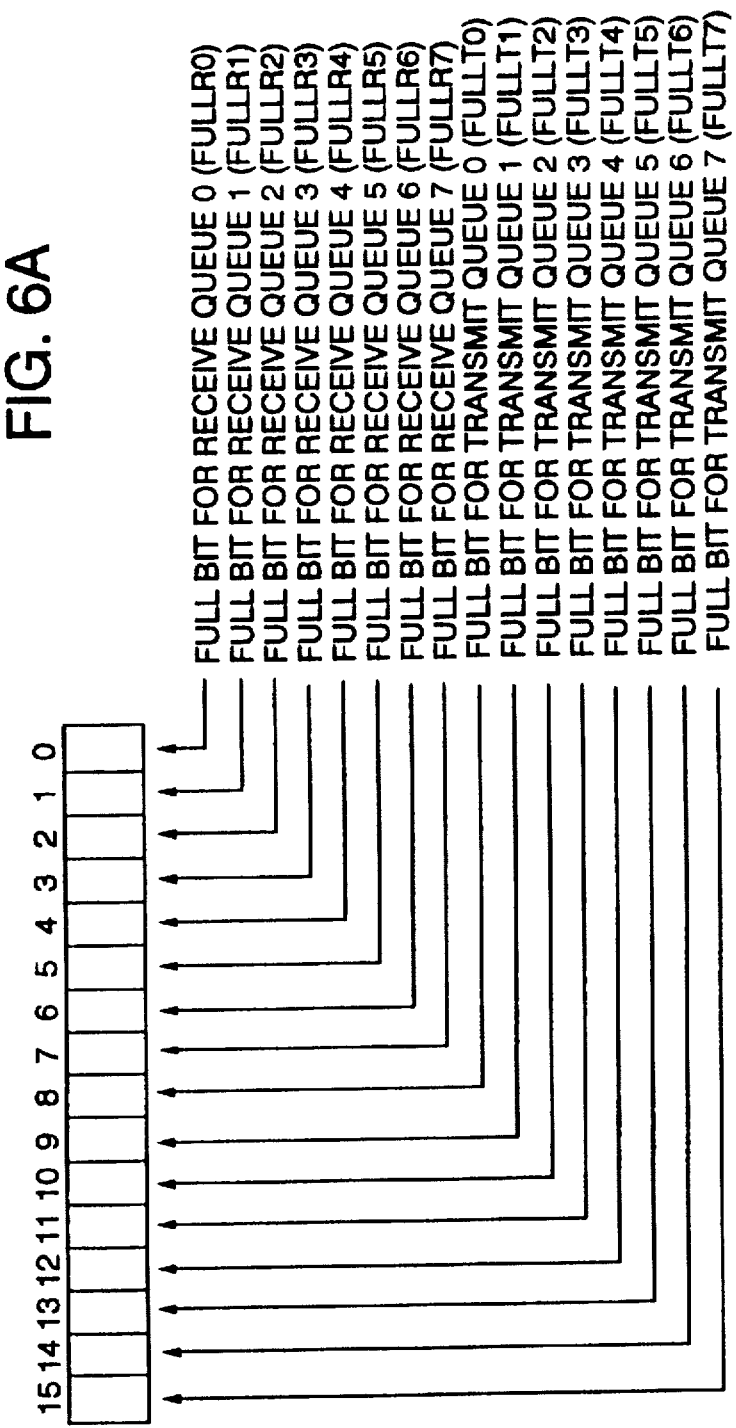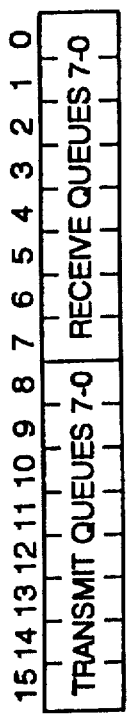

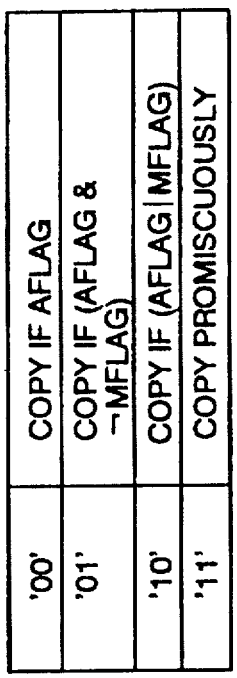
FIG. 7
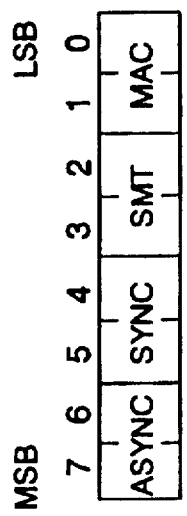
FIG. 8
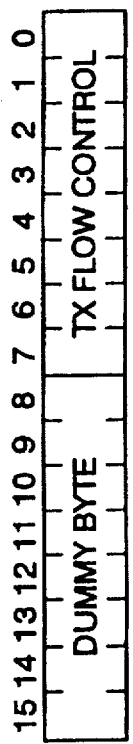
FIG. 8A
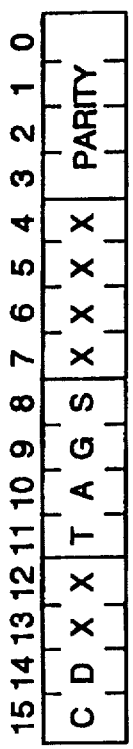

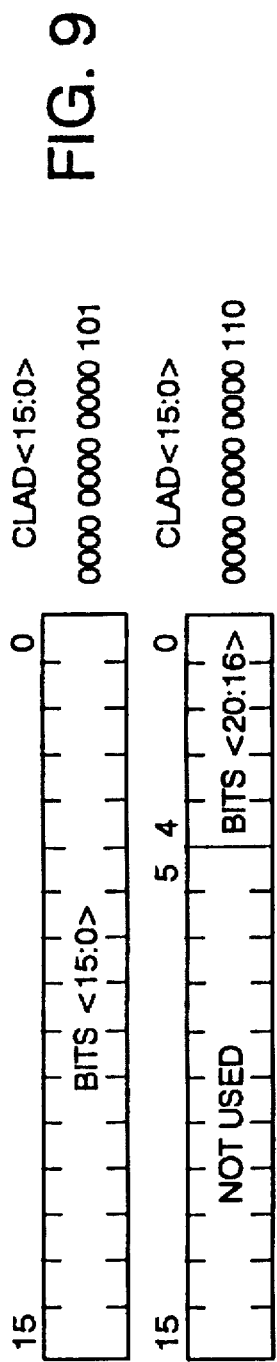
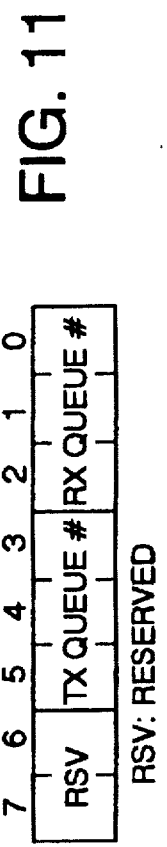
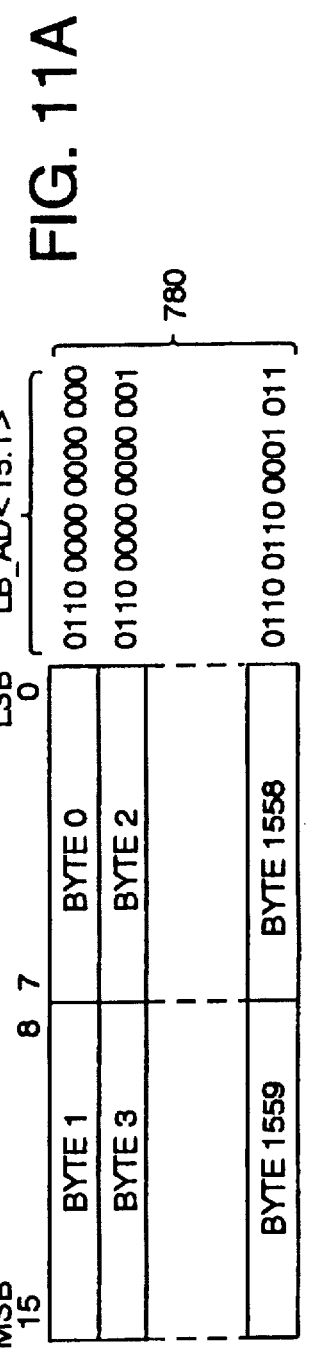

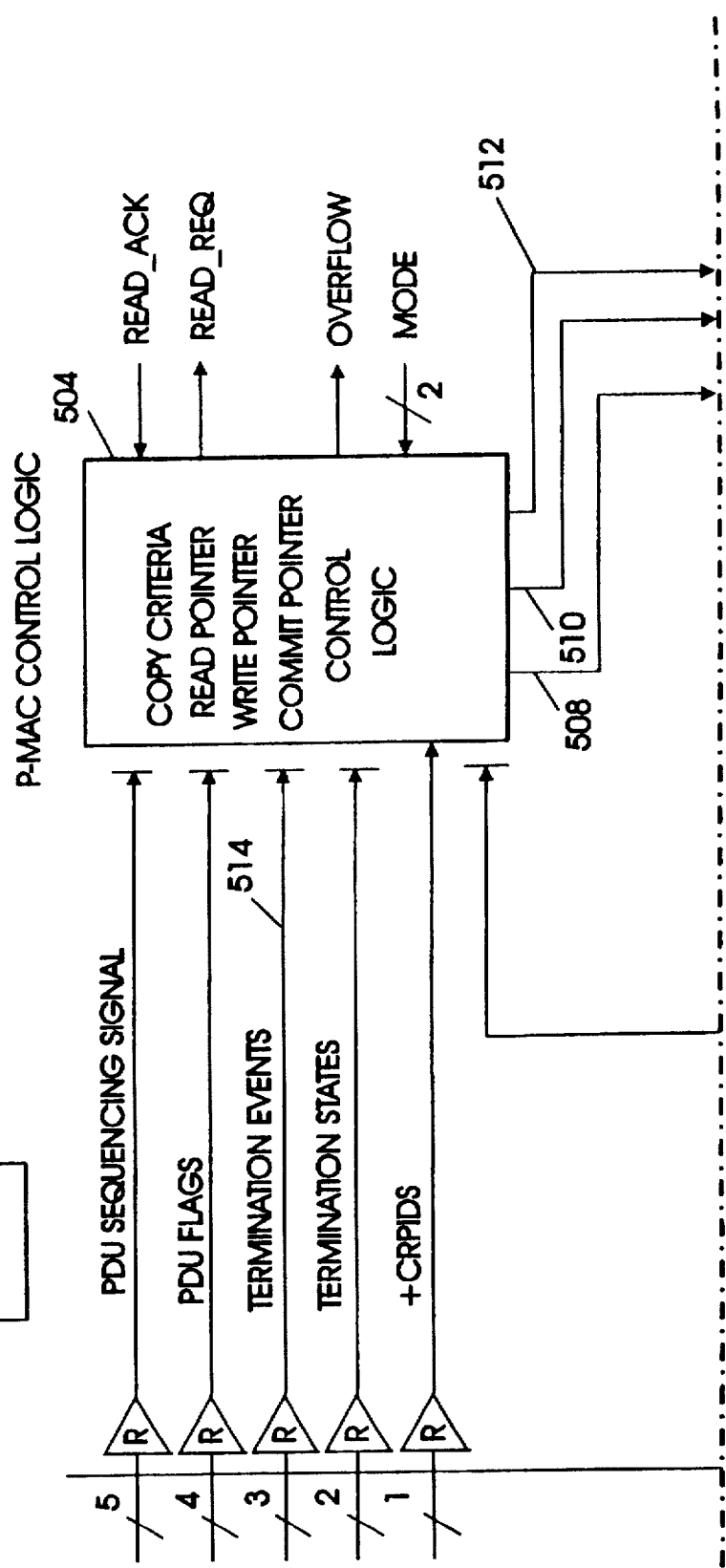

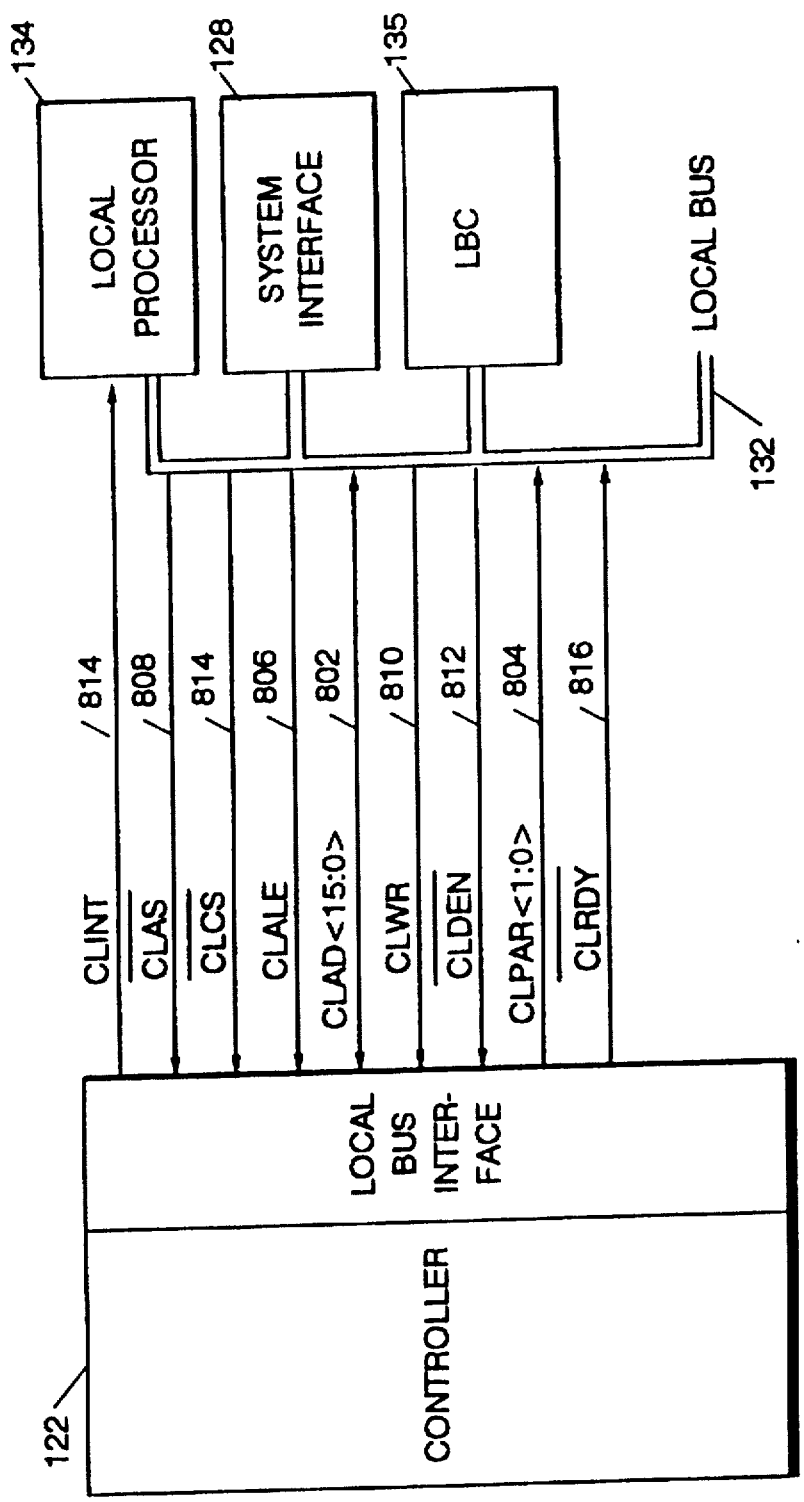

MULTIMEDIA COMMUNICATION APPARATUS AND METHODS

This is a divisional of application Ser. No. 08/282,376 filed on Jul. 29, 1994, now U.S. Pat. No. 5,687,316.

BACKGROUND OF THE INVENTION

1. FIELD OF THE INVENTION

This invention relates to multimedia communications. More particularly, the invention relates to apparatus and methods for communicating real time multimedia information across a system. Specifically, the invention relates to an architecture for a multimedia communications adapter interconnecting a Host Bus System and network including a multimedia workstation.

2. BACKGROUND DISCUSSION

The problem in communicating real time multimedia across a system is the attachment of a network to a system that will provide for and permit multiple multimedia and packet data streams to flow in real time between a host based system and a workstation coupled to a Local Area Network (LAN). Attachments between the system and the network that provide this function are generally known and referred to as a communications adapter. A communications adapter must be architected to provide high performance solutions to a number of current general problems.

One problem is concurrent and independent transfer of packet and isochronous data, in both directions, between a network and host bus system.

Another problem is directly transferring data, in both directions, between a host bus system and a network without storage in the device.

Another problem is an inefficient execution of direct memory access operations between the system and the adapter.

Another problem is the lack of concurrent and independent execution of transmit and receive descriptor indicative of the location of data to be sent to and received from the system.

Another problem is inefficient use of system bandwidth which lessens the performance of the adapter.

Another problem is simplex execution of data transfer commands.

Another problem is efficient, simultaneous processing of multiple low bandwidth isochronous and packet data in an adapter.

An adapter that addresses and solves the problems described above will enhance the development of multimedia communications in industry, government and educational communities.

3. SUMMARY OF THE INVENTION

An object of the invention is a communication device and method for multimedia data that allows efficient, simultaneous processing of multiple, low bandwidth, channels between a network and a host bus system using a queue structure.

Another object is a communication device that includes programmable data thresholds for queue structure that control access requests to both media and host attachment buses.

Another object is a multiflow adapter that handles simultaneous, multiple, real time and multimedia data streams using multiple queues controllable with independent descriptor lists.

Another object is an adapter that is an interface to any number of buses on its back end and provides connections and interfacing to any number of LAN or WAN systems on its front end.

Another object is a method of transferring real time/multimedia and packet data between a network and a host bus system.

Another object is a method of controlling a queue structure in an adapter for storage of multimedia or packet data transferred in either direction between a network and a host bus system.

A feature of the invention is an adapter that permits flows of multiple streams of packet and isochronous data through the adapter and across a system.

Another feature is an adapter which facilitates direct transfer of data between a system and a network in either direction without buffering in the adapter.

Another feature is a adapter that provides system address mapping to local memory and a separate, independent, direct memory access engine in the system that can be used for command system elements.

Another feature is generating and using descriptor pointers and lists for controlling in an adapter the flow of data in both directions between a network and a host bus system.

These and other objects and features of the invention are accomplished by a communication device and method which includes means for receiving and transmitting isochronous and packet data between a system, which in one form may be a micro channel, and a is workstation coupled to a local area network. Included in the device are physical layer means connected to the network for converting serial data streams from the workstation into byte streams while tagging all bytes as isochronous or packet data for input to a Media Access Control (MAC) device. The MAC compares the receive destinations and source addresses with internal addresses stored in a local bus memory part of a controller. Data accepted by the MAC is directed into separate isochronous or packet receive engines which prepare the data for storage in a FDDI RAM Buffer (FRB). The FRB data is directed into the queues by a queue manager using programmable registers. The data stored in the FRB receive queues is held until a threshold level is achieved. The threshold level is programmable by the queue manager. The system interface unit is activated when the threshold level has been achieved and transfers the data to addresses in the system based upon descriptors provided by the a local processor. The system interface unit permits multiple transfers of data from multiple queues between the network and the system. The local processor keeps track of descriptor usage and requests the system for additional descriptors as needed.

The host bus system can simultaneously transfer to the network through the system interface unit into transmit queues in the FRB. The system may also transmit data directly to the MAC until MAC storage becomes full whereupon the data is stored in the FRB transmit queues. Data is transferred out of the transmit queues when a threshold is reached and the MAC means obtains access to the local area network. The physical layer means converts the data from byte form to serial form as an input to the local network for use by the workstation. The adapter of the present invention permits multiple pipe, real time, multimedia and packet streams to be transferred in both directions between the network and the system.

4. BRIEF DESCRIPTION OF THE DRAWING

FIG. 5(A) is a Table describing the receive queues shown in FIG. 5.

FIG. 5(B) is a Table describing the transmit queues shown in FIG. 5(A).

FIG. 6 is a representation of a mode register included in the controller of FIG. 4.

FIG. 6(A) is a representation of a Queue Status Register included in the controller of FIG. 4.

FIG. 6(B) is a representation of the queue enable/disable register included in the controller of FIG. 4.

FIG. 7 is a representation of a P-MAC copy criteria register included in the controller of FIG. 4.

FIG. 8 is a representation of an I-MAC flow/dummy byte register included in the controller of FIG. 4.

FIG. 8(A) is a representation of th e FRB/FIFO parity/tag register included in the controller of FIG. 4.

FIG. 9 is a representation of a synchronous bandwidth allocation register included in the controller of FIG. 4.

FIG. 11 is a representation of an I-MAC Steering Map Register.

FIG. 11(A) is a representation of an entry in the I-MAC Steering Map Register of FIG. 11.

Figure 15:
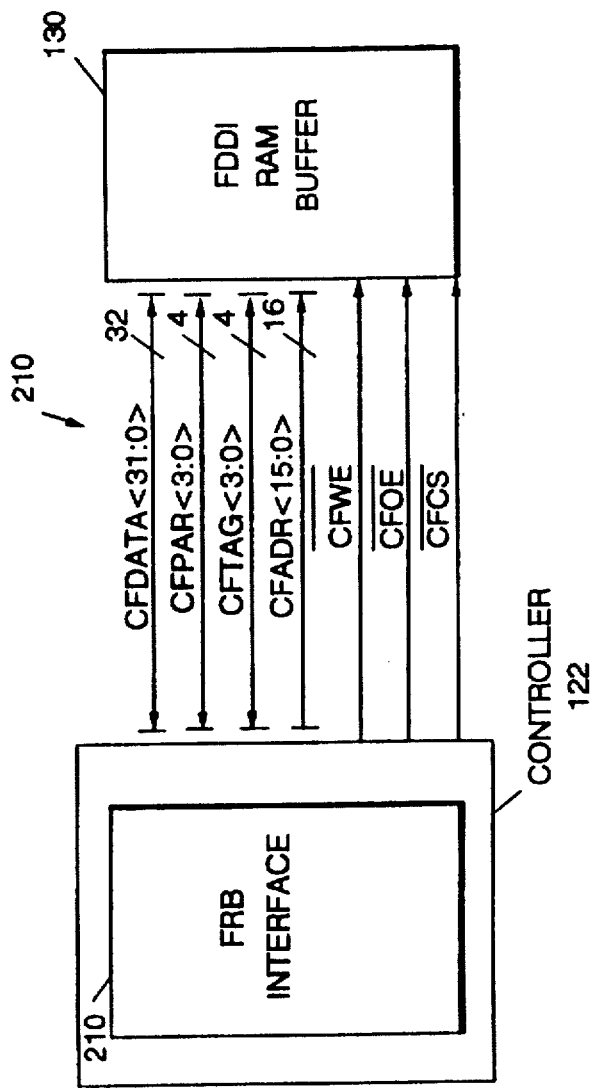
FIG. 15 is a block diagram of a FDDI RAM Buffer (FRB) interface included in FIG. 1.

FIGS. 15(D)-15(G) are timing diagrams for read and write operations for the FRB in FIG. 15.

Figure 4B:
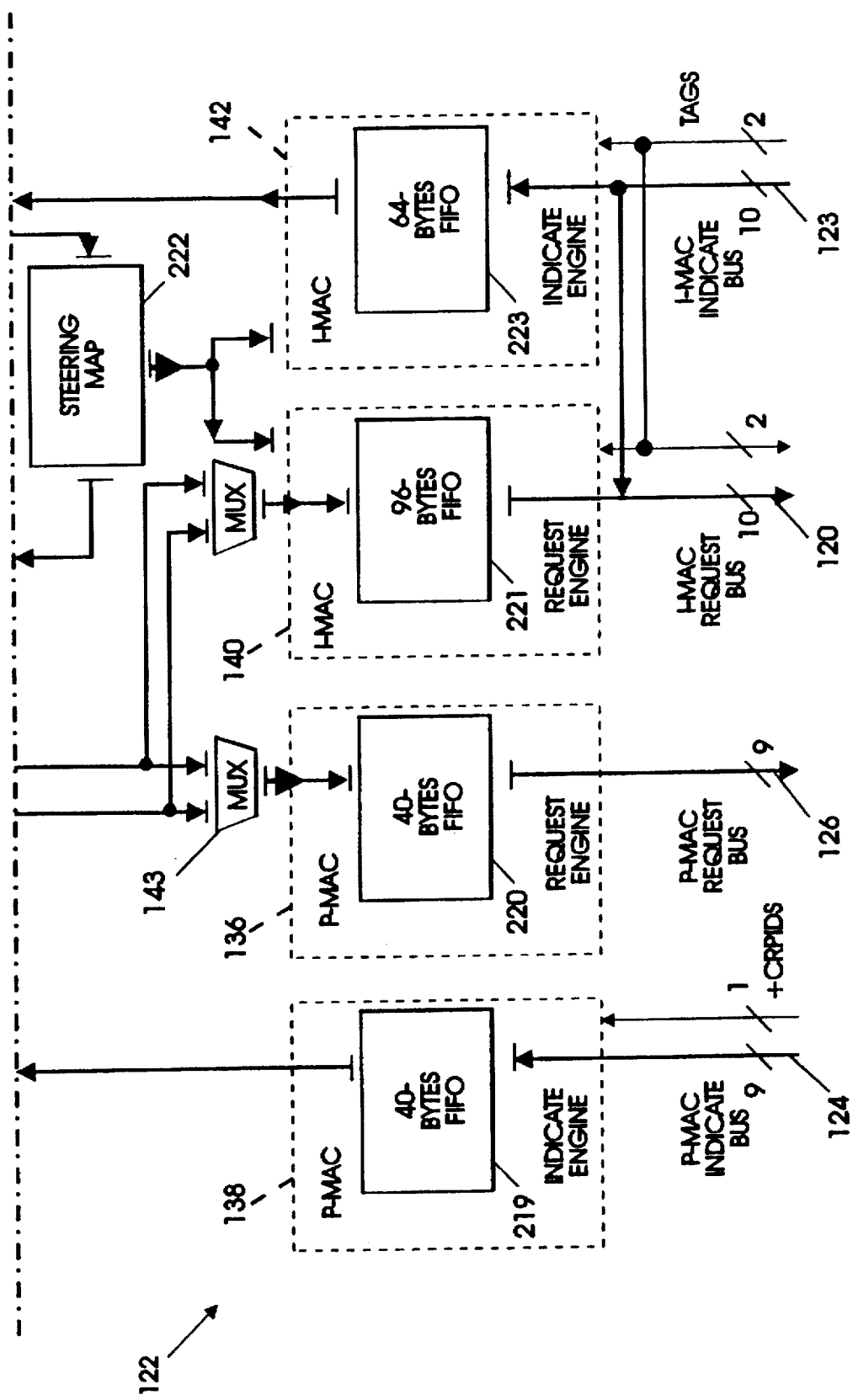
FIG. 4 is a block diagram of a controller included in FIG. 1.

FIG. 16 is a block diagram of the local bus interface signals included in FIG. 4.

Figure 17:
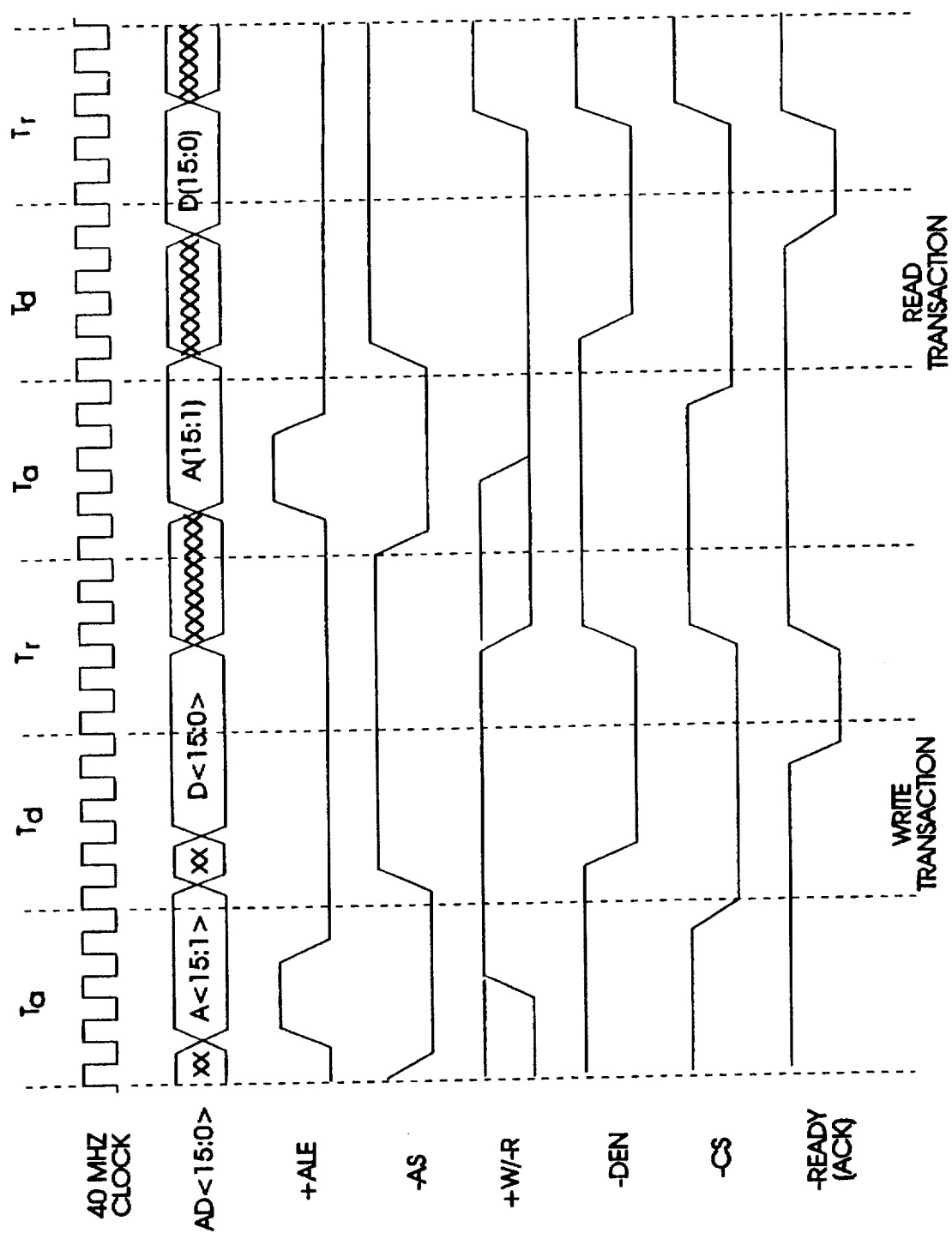

FIG. 17 is a read and write timing diagram for the local bus interface of FIG. 6.

Figure 18A:
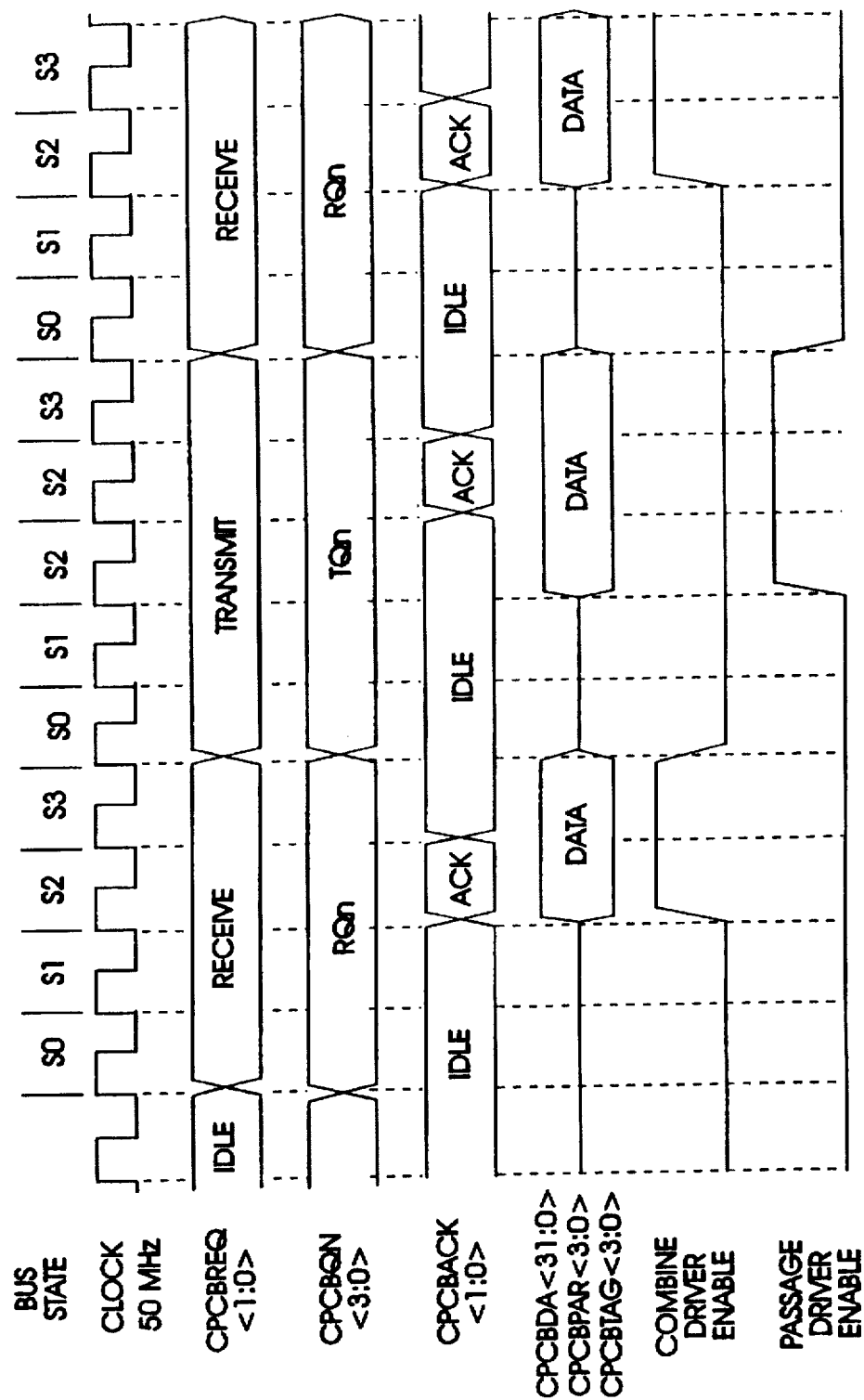
Figure 18:
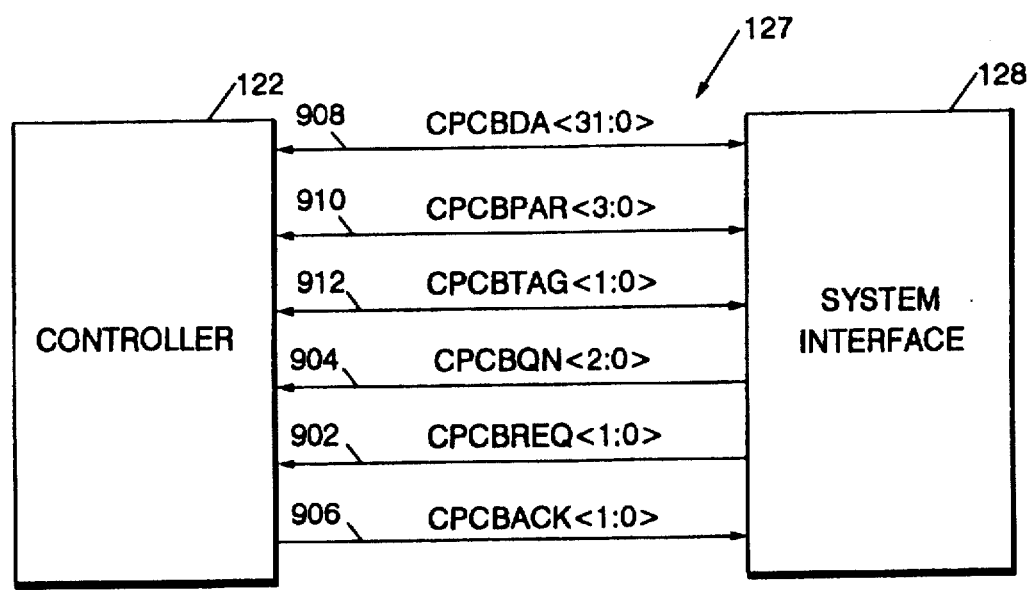

FIG. 18 is a block diagram of a system/controller interface signals included in FIG. 4.

FIG. 18(A) is a timing diagram for the interface of FIG. 18.

Figure 18B:
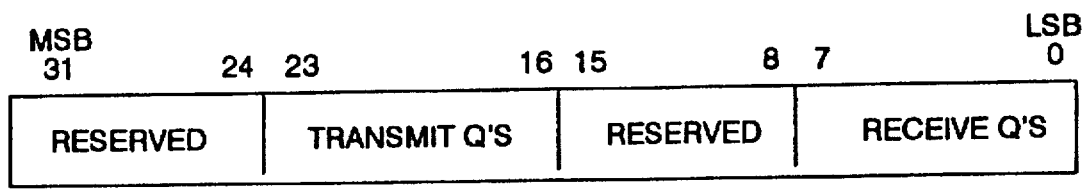

FIG. 18(B) is a representation of the system queue status registers.

Figure 18C:
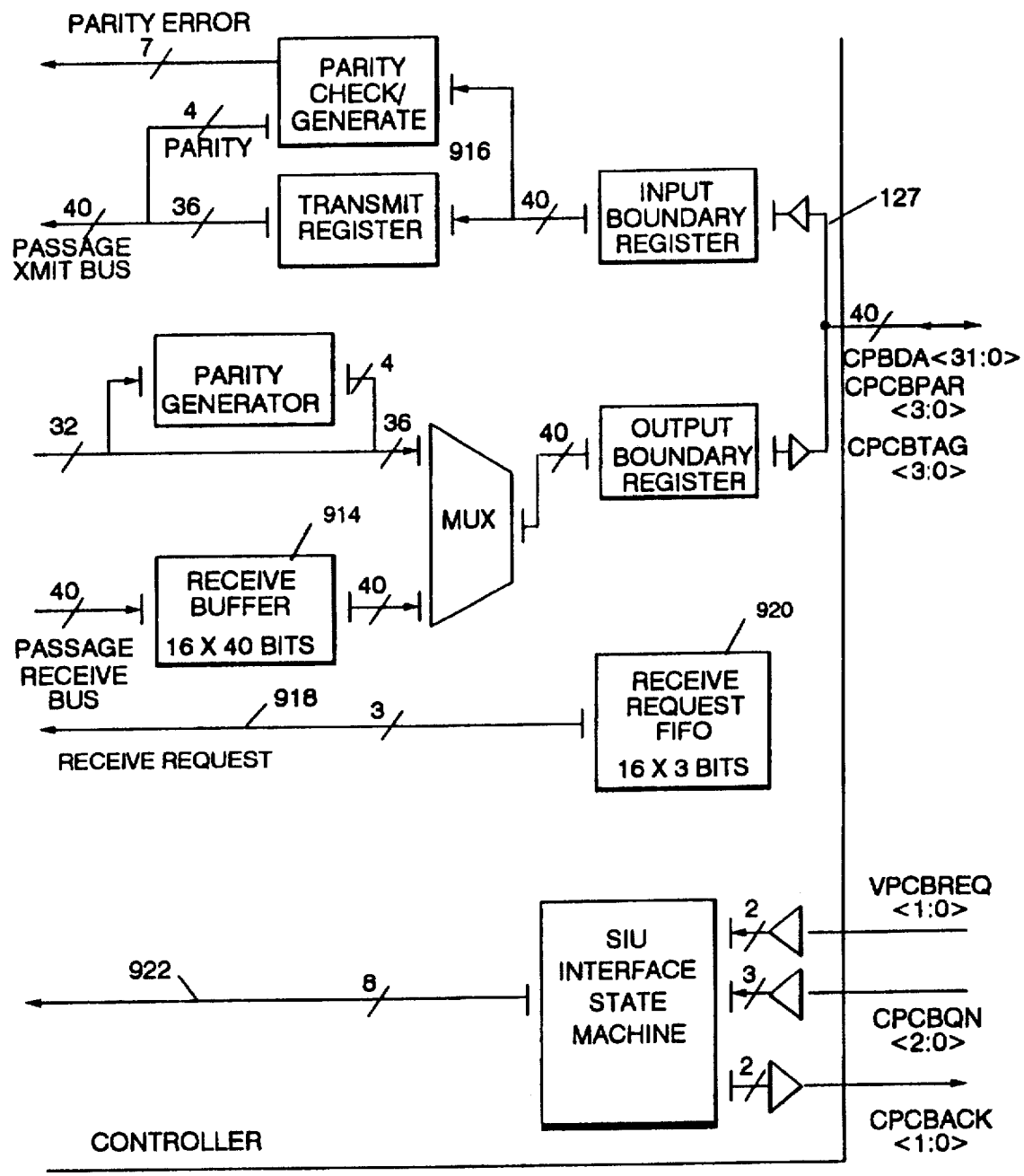

FIG. 18(C) is a block diagram of the interface of FIG. 18.

Figure 19:
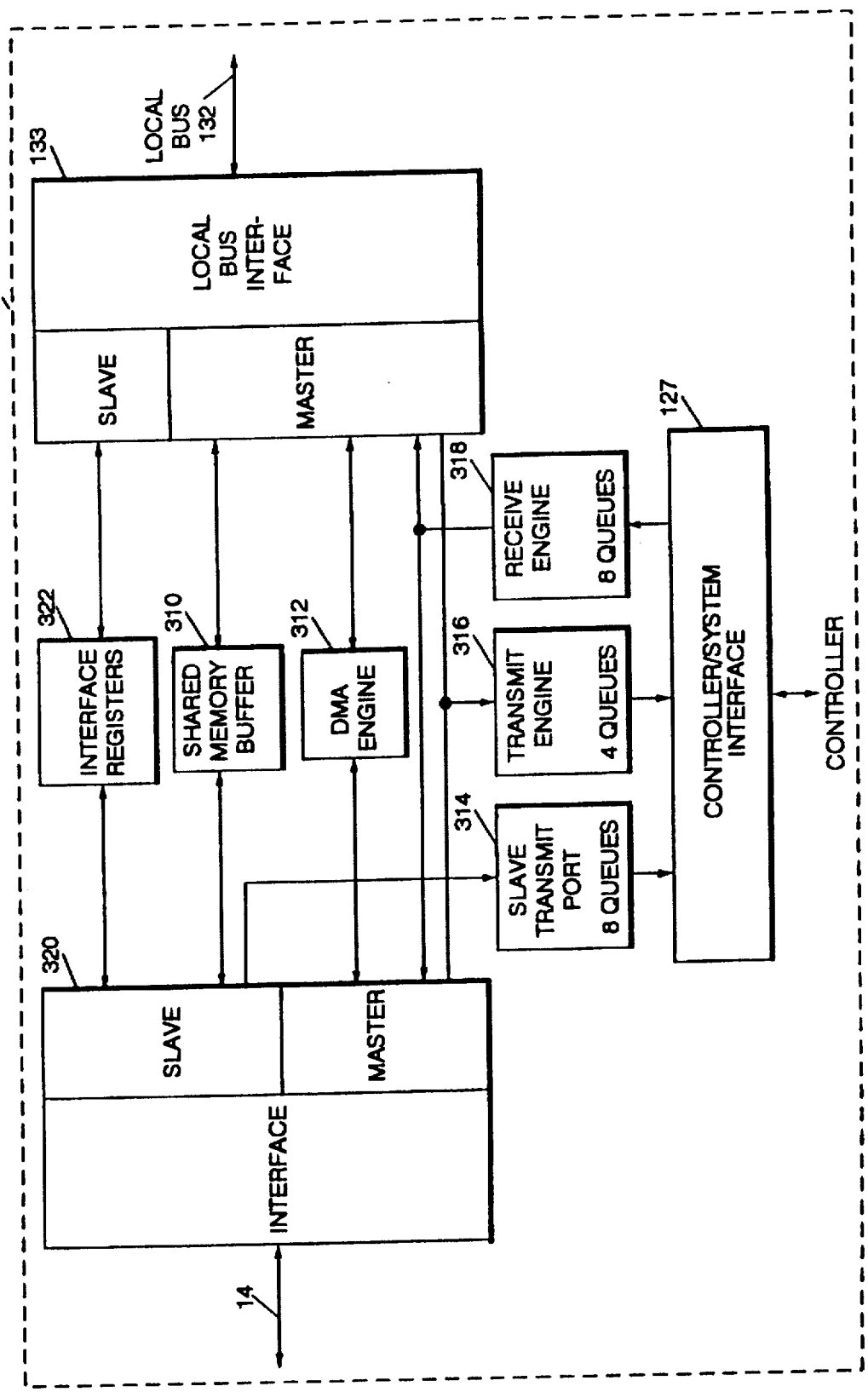

FIG. 19 is a block diagram of the system controller interface unit included in FIG. 4.

Figure 19A:
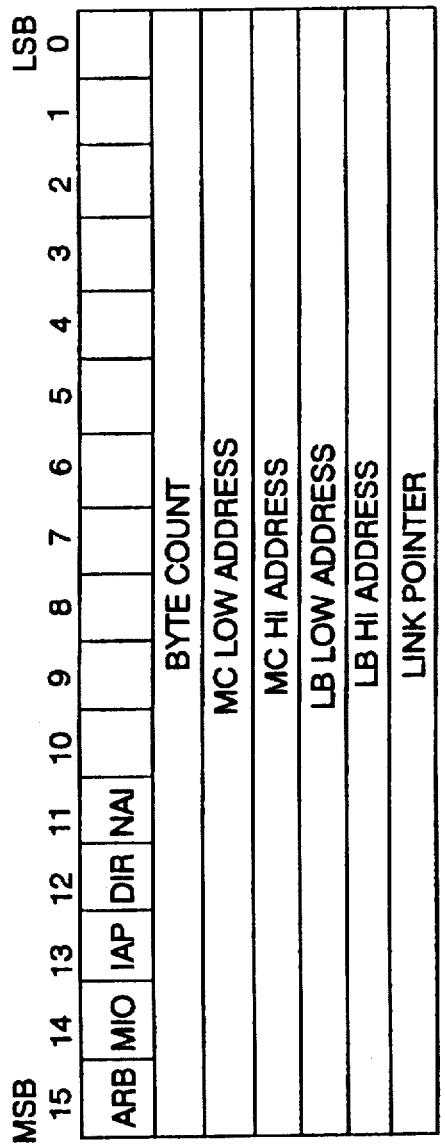

FIG. 19(A) is a representation of descriptors used by a DMA engine in FIG. 19.

Figure 19B:
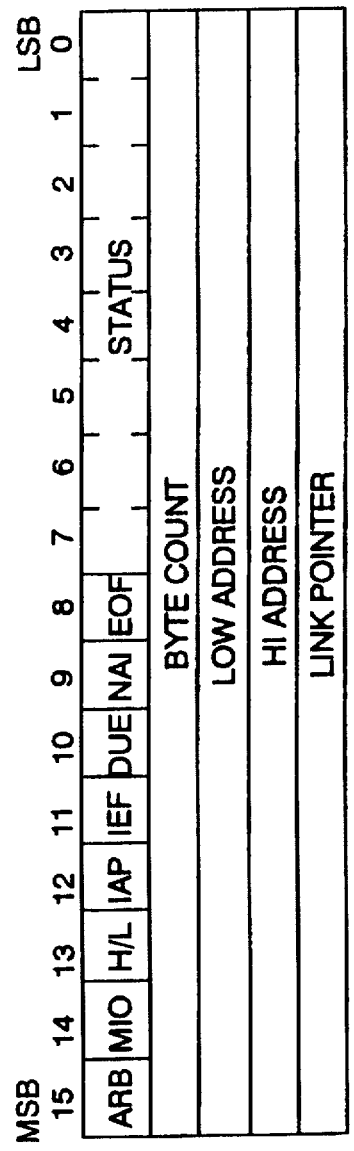

FIG. 19(B) is a representation of descriptors used in a receive engine of FIG. 19.

Figure 19C:
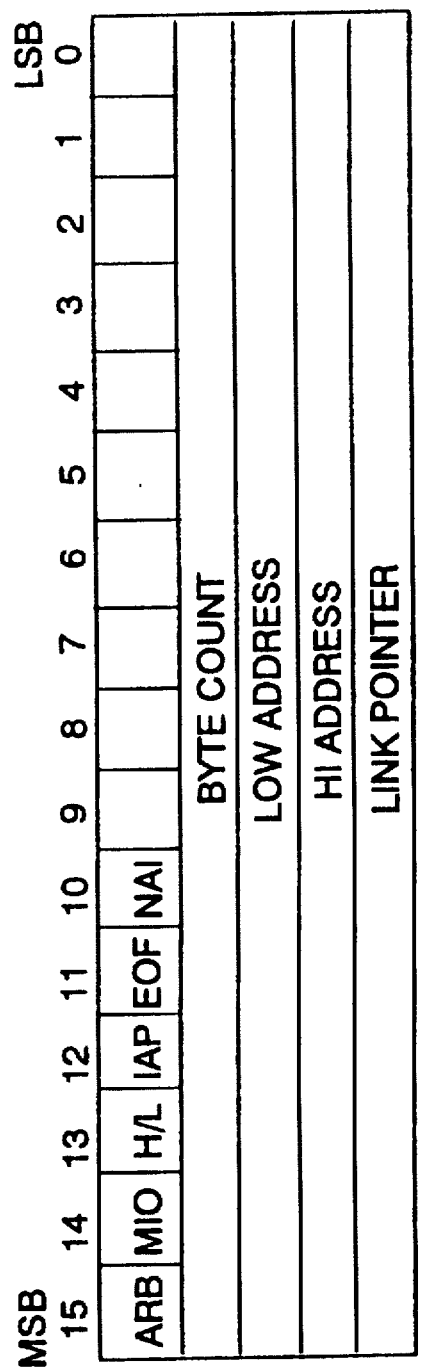

FIG. 19(C) is a representation of descriptors used in a transmit engine of FIG. 19.

Figure 20:
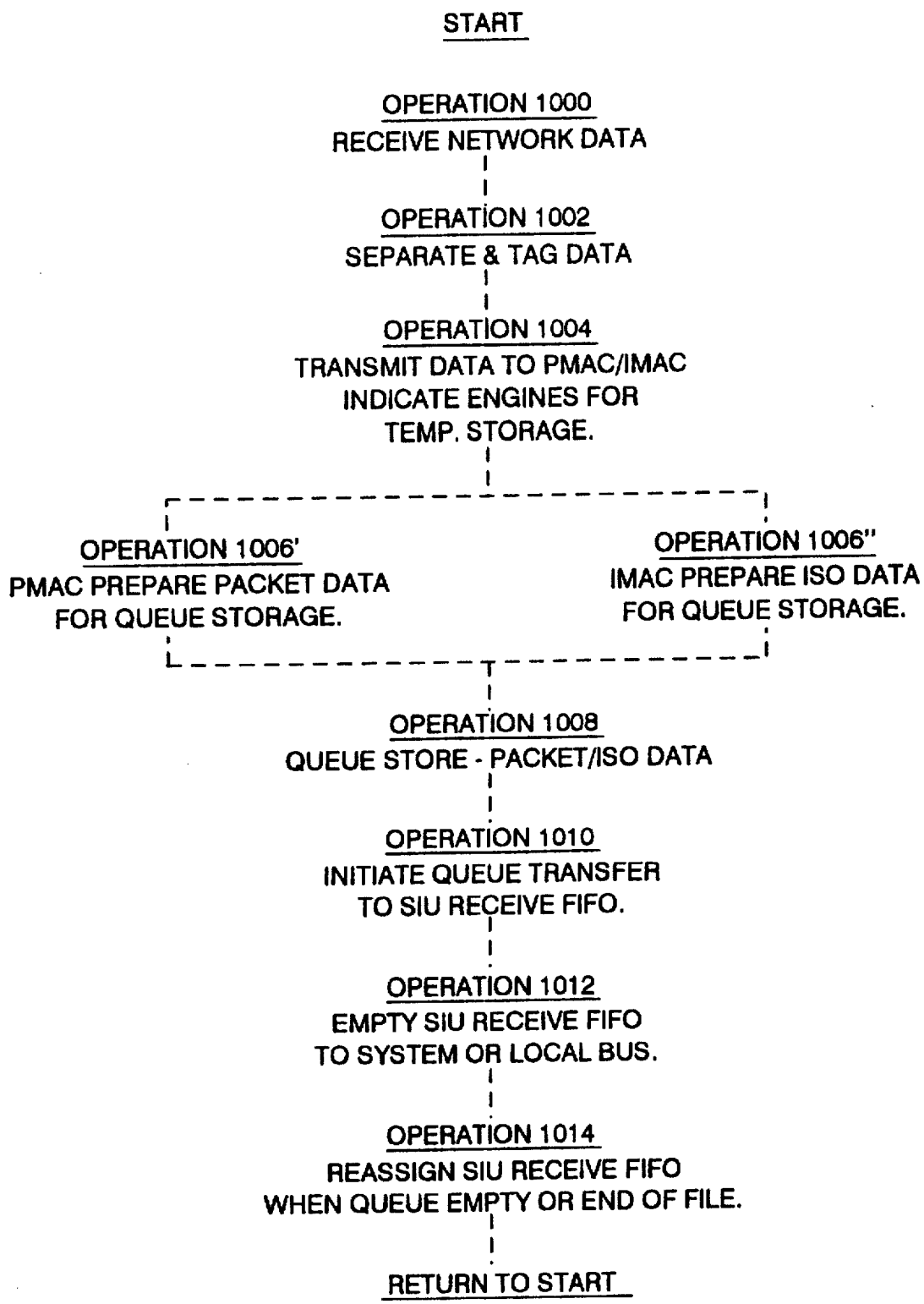

FIG. 20 is a flow diagram of a receive operation performed by the invention.

Figure 21:
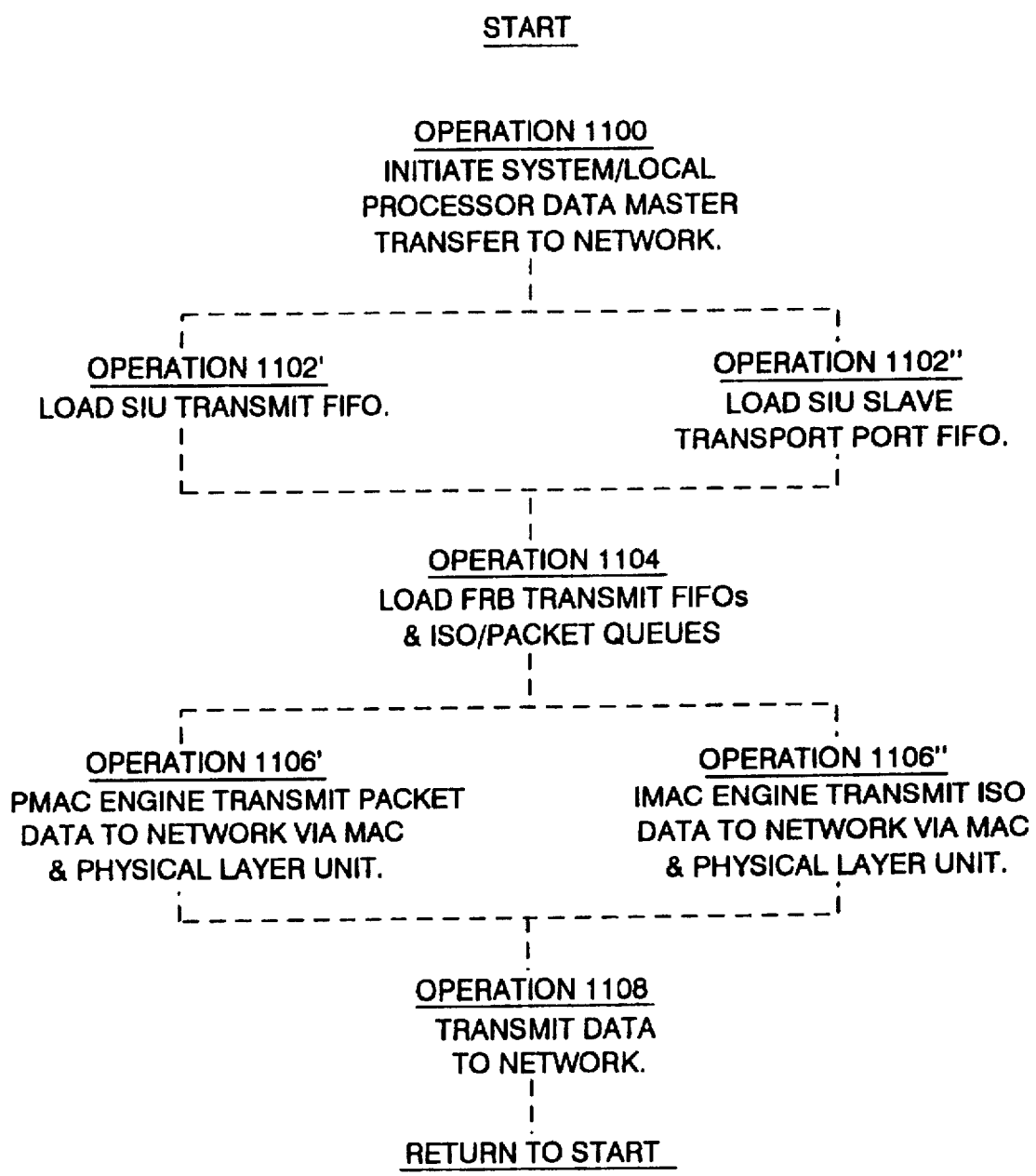

FIG. 21 is a flow diagram of a transmit operation performed by the invention.

5.0. DESCRIPTION OF THE PREFERED EMBODIMENT

INDEX

| Section | | Title |
|---|---|---|
| 5.1 | | Adapter Overview |
| 5.2 | | Physical Layer Interface |
| 5.3 | | Media Access Controller (MAC) |
| 5.4 | | Controller Overview |
| | 5.4.1 | Controller Registers |
| | 5.4.2 | Packet MAC Engines (P-MAC) |
| | 5.4.3 | P-MAC Transmit |
| | 5.4.4 | I-MAC Engine (I-MAC) |
| | 5.4.5 | Queue Manager |
| | 5.4.6 | Queue Management/Programming |
| | 5.4.7. | Thresholding |
| 5.5 | | FDDI RAM Buffer (FRB) & Interface |
| | 5.5.1 | FDDI RAM Buffer (FRB) Registers |
| | 5.5.2 | FRB Interface |
| | 5.5.3. | FRB Read/Write Operation |
| 5.6 | | Local Bus Interface |
| | 5.6.1 | Local Bus Interface Operation |
| 5.7 | | Controller/System Interface Operation |
| | 5.7.1 | System Interface Unit (SIU) Logic |
| 5.8 | | System Interface Overview |
| | 5.8.1 | DMA Engine |
| | 5.8.2 | DMA Descriptors |
| | 5.8.3 | DMA Engine Operation |
| | 5.8.4 | Receive Engine |
| | 5.8.5 | Receive Descriptors |
| | 5.8.6 | Receive Operation |
| | 5.8.7 | Transmit Engine |
| | 5.8.8 | Transmit Descriptors |
| | 5.8.9 | Transmit Operation |
| | 5.8.10 | Slave Transmit Port |
| | 5.8.11 | Slave Transmit Operations |
| | 5.8.12 | Shared Memory Window |
| | 5.8.13 | System Write Access |
| | 5.8.14 | System Read Access |
| 5.9 | | Adapter Operation |
| | 5.9.1 | Receive Operation |
| | 5.9.2 | Transmit Operations |

5.1. Adapter Overview

Figure 1:
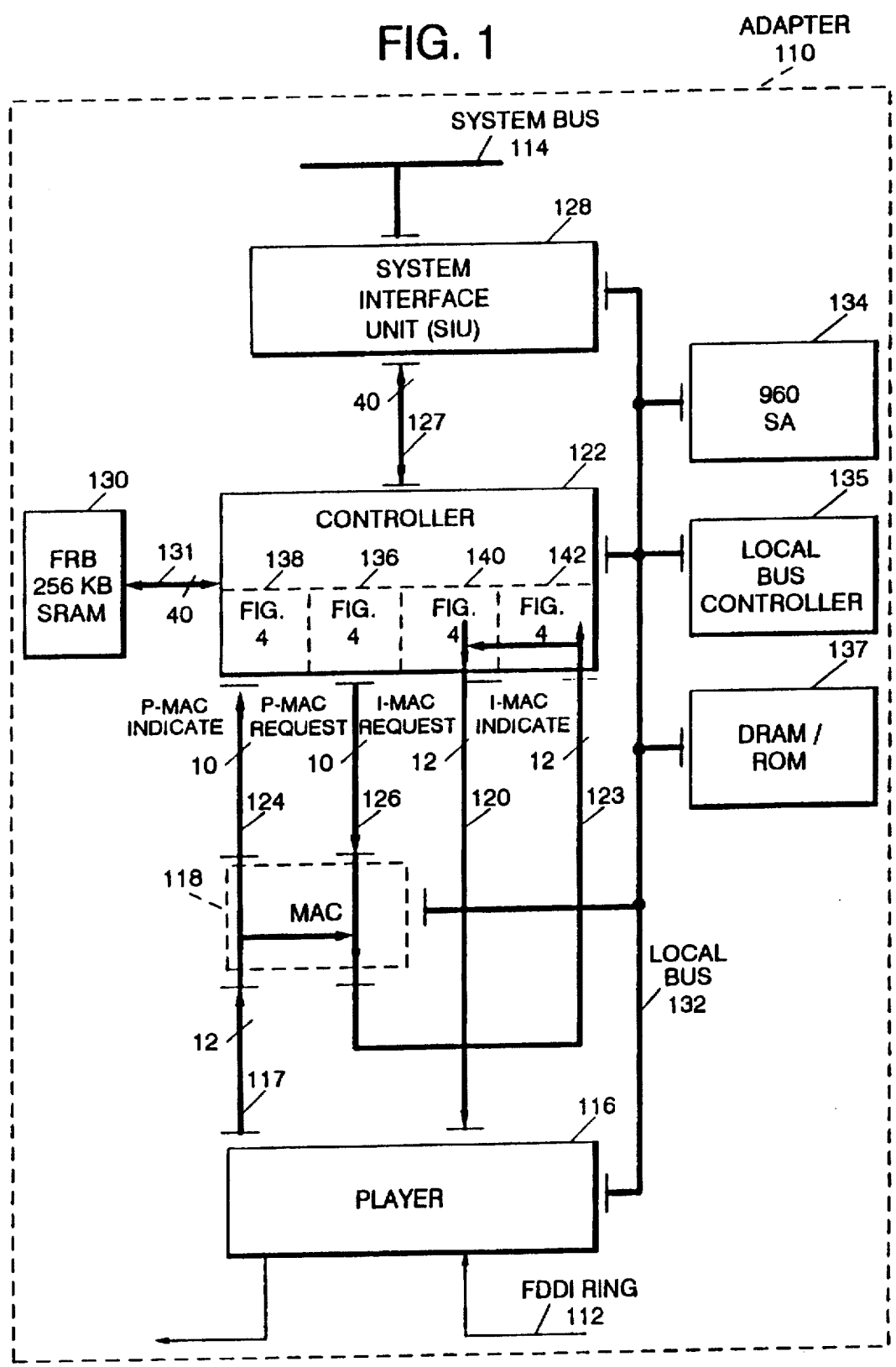
FIG. 1 is a block diagram of a multimedia communications adapter incorporating the architecture of the present invention.

FIG. 1 shows an adapter 110 in a system for receiving and transmitting packet and/or isochronous data between a FDDI ring 112 and a Host Bus system 114 which in one form may be a Micro Channel. The adapter includes a physical interface layer 116 that implements the physical layer defined by ANSI X3T9.5 Standard and also provides the functions required for hybrid mode operation. The interface 116 converts the serial bit stream from the FDDI ring into an 80 nanosecond (n.s.) byte stream for a Media Access Register (MAC) 118 with all bytes tagged as packet or isochronous. The interface 116 also connects to a request bus 120 for receiving an 80 n.s. byte stream from a isochronous memory access control request bus 120 included in and part of a controller 122.

The Media Access Control (MAC) 118 implements the function defined in ANSI X3T9.5 Standard. Each byte received from the MAC 118 is received by a controller 122 on a packet memory access control indicate bus 124. Along with the data bytes, the MAC 118 provides a set of sequencing signals and flags that are asserted on the occurrence of events, e.g., frame controlled on the indicate bus 124, match on the destination address received, etc. The MAC 118 also controls the transmission of packet data, but before transmission can occur the token must be captured on ring 112. The controller 122 first requests the capture of the token by asserting a non-zero value on a request bus 126 which connects to bus 120. When the MAC signals the controller 122 that the token has been captured, the controller 122 begins transmitting the packet frame on the bus 126. The MAC either repeats the data it receives on the bus 117 or tranmits the data output on the bus 126.

The controller 122 controls data flow between the FDDI ring 112 and a System Interface Unit (SIU) 128, and may temporarily buffer data in a FDDI Ram Buffer 130 (FRB), if necessary. A local bus interface 132 is connected to a local processor 134 which provides interrupts at access registers of the controller 122 or the FRB 130. The path to the FRB 130 is provided for two reasons. First, the processor 134 can write and read FRB 134 to verify its functionality as part of bringing up diagnostic routines. Secondly, the processor 134 can store network protocol frames in the FRB 130, and when it desires, requests the controller 122 to transmit those frames to the ring 112. The controller 122 is designed to interface with the ring 112 operating at either basic or hybrid mode. Included in the controller 122 is a packet media access control request and indicate engines 136 and 138, respectively, and isochronous memory access request and indicate engines 140 and 142, respectively. The engine 138 handles the processing of all packet data received from the MAC 118. The indicate engine 142 processes all isochronous data received from the MAC 118. Data transmitted to the interface 116 is handled out of the request engines 136 and 140. In basic mode, all data input from an indicate bus 123 is repeated on to request bus 120. The controller provides a minimum amount of buffering as isochronous/packet data is transferred to/from the byte module 116/118 and the interface 116. The controller 122 has the capability to transfer data directly to/from the system interface 128 and the PMAC and IMAC engines by passing the FRB 130. For the most part, packets and isochronous data are placed into queues (see FIG. 5) in the FRB 130, operating as circular FIFO's (First In/First Out) registers. FRB 130 is implemented with fast static rams providing the fast access required to meet the controller's bandwidth requirements. The controller manages read and write pointers to the sixteen queues (8 receive, 8 transmit) in the FRB 130. Threshold registers are provided for each queue within the controller, and are programmed by the local processor 134. As thresholds are crossed for a particular queue, the controller sets the associated bit (for that queue) in a status register (not shown) of the controller/system interface 127 which is periodically polled by the SIU 128. Once SIU 128 has determined which queue in the FRB 130 it desires access to, it places the queue number on a controller/system interface 127. Data is transferred into the queue and the FRB 130 is either filled or becomes empty. A local bus controller 135 gains access to the registers of the controller 122 by providing address/data and controls (select, address latch, data enable, etc.) to the local bus interface 132. The local bus interface 132 decodes the address and routes the incoming data to the correct registers and the controller 122 for a write operation. The interface 132 also routes the data from the desired register to the local bus on a read operation. Associated with the processor 134 is a dynamic RAM and ROM 137. The dynamic RAM is used as a program and data store. The ROM is provided for diagnostics, initialization, and vital product data.

5.2 Physical Layer Interface

Figure 2:
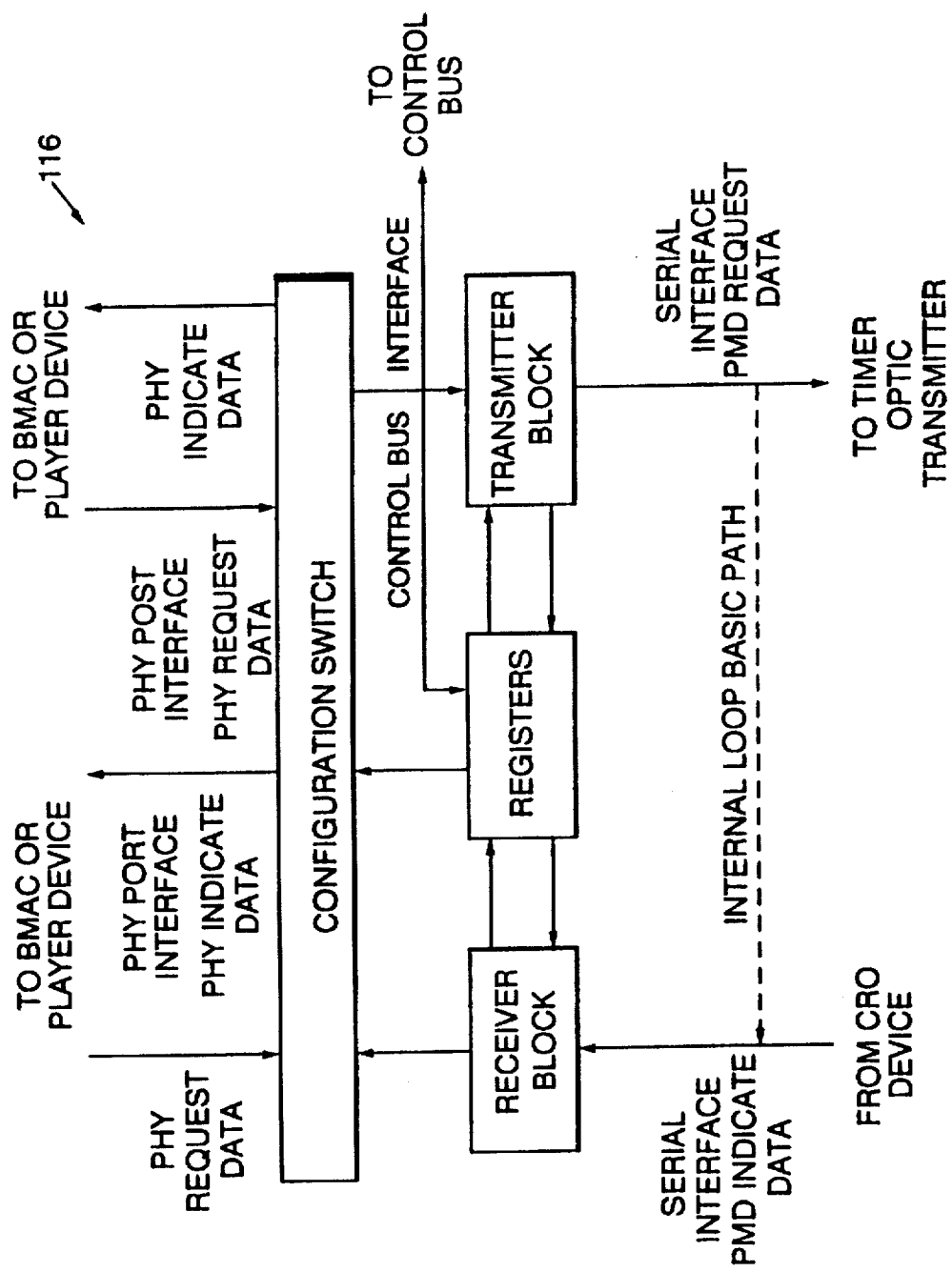
FIG. 2 is a block diagram of a physical interface layer shown in FIG. 1.

In addition to the functions described in Section 5.1, the interface layer 116 (see FIG. 1) performs clock recovery and the 4b/5b encoding/decoding of the 125 mhz. serial ring data. An example of an interface layer is shown in FIG. 2 which is taken from the National Semiconductor FDDI Data Handbook, 1991 Edition, page 2–39.

5.3 Media Access Controller (MAC)

Figure 3:
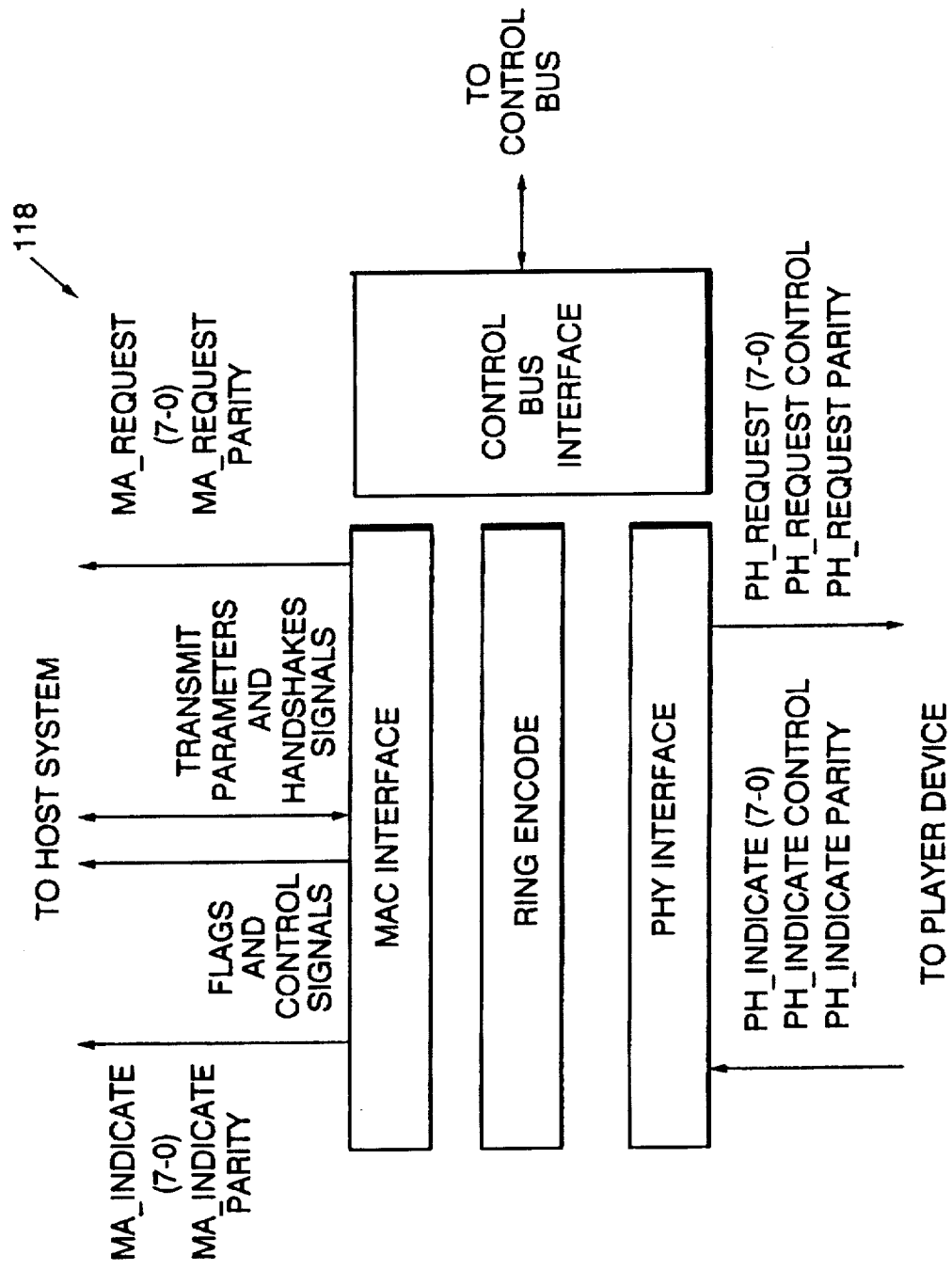
FIG. 3 is a block diagram of a Media Access Control (MAC) included in FIG. 1.

In addition tothe functions described in Section 5.1, the MAC provides for the FDDI-1 media access control function including the time token protocol, station address matching, etc. All bytes that are tagged as packet bytes by the interface layer 116 (see FIG. 1) are processed by the MAC. Additionally, all packet bytes to be transferred are inserted into the allocated master cycle packet slots by the MAC. The MAC supplies source addressing stuffing in hardware. An example of a MAC is shown in FIG. 3 which is taken from the National Semiconductor FDDI Data Handbook, 1991 Edition, page 2–133.

5.4. Controller Overview

Referring to FIG. 4, the controller 122 consists of eight major components which are: An FRB interface 210, the local bus interface 133, a controller/system interface 127, PMAC/IMAC indicate engines 138 and 142, respectively, request engines 136 and 140, respectively, and a queue manager 212. The controller 122 provides an interface 210 to the FRB 130, with data to/from either the system 128 or the interface 116 and MAC 118 (see FIG. 1). The controller manages the receive and transmit data by placing the data into 8-receive 214 and 8-transmit 216 queues (see FIG. 5) operating as circular FIFO registers. For each queue, there exists a set of registers that must be programmed by the local processor 134 (see FIG. 1) before operation commences. These registers are a base pointer, queue size, threshold value, and read and write pointers, all located in a parameter RAM 218.

The controller includes a set of registers 220, one of which is a mode register (see FIG. 6) which may be set to stop/reset mode. In the stop mode, the P-MAC indicate and request buses 124 and 126, respectively; the I-MAC indicate and request buses 120 and 123, respectively; and the interface 127 are disabled and frozen in their idle state. The local processor 134 (see FIG. 1) still has the ability to read/write the FRB 130 for diagnostic purposes and can configure the controller's register for operation. Once programmed, the local processor 134 sets the mode bits to normal mode. In normal mode, operation commences, and any frame control bytes recognized at the P-MAC interface 124 are immediately copied into P-MAC receive 220. Likewise, isochronous bytes are received and transmitted based on valid steering map entries in a register 222. At the interface 127, the controller 122 responds to any request (read or write to any queue).

Figure 5:
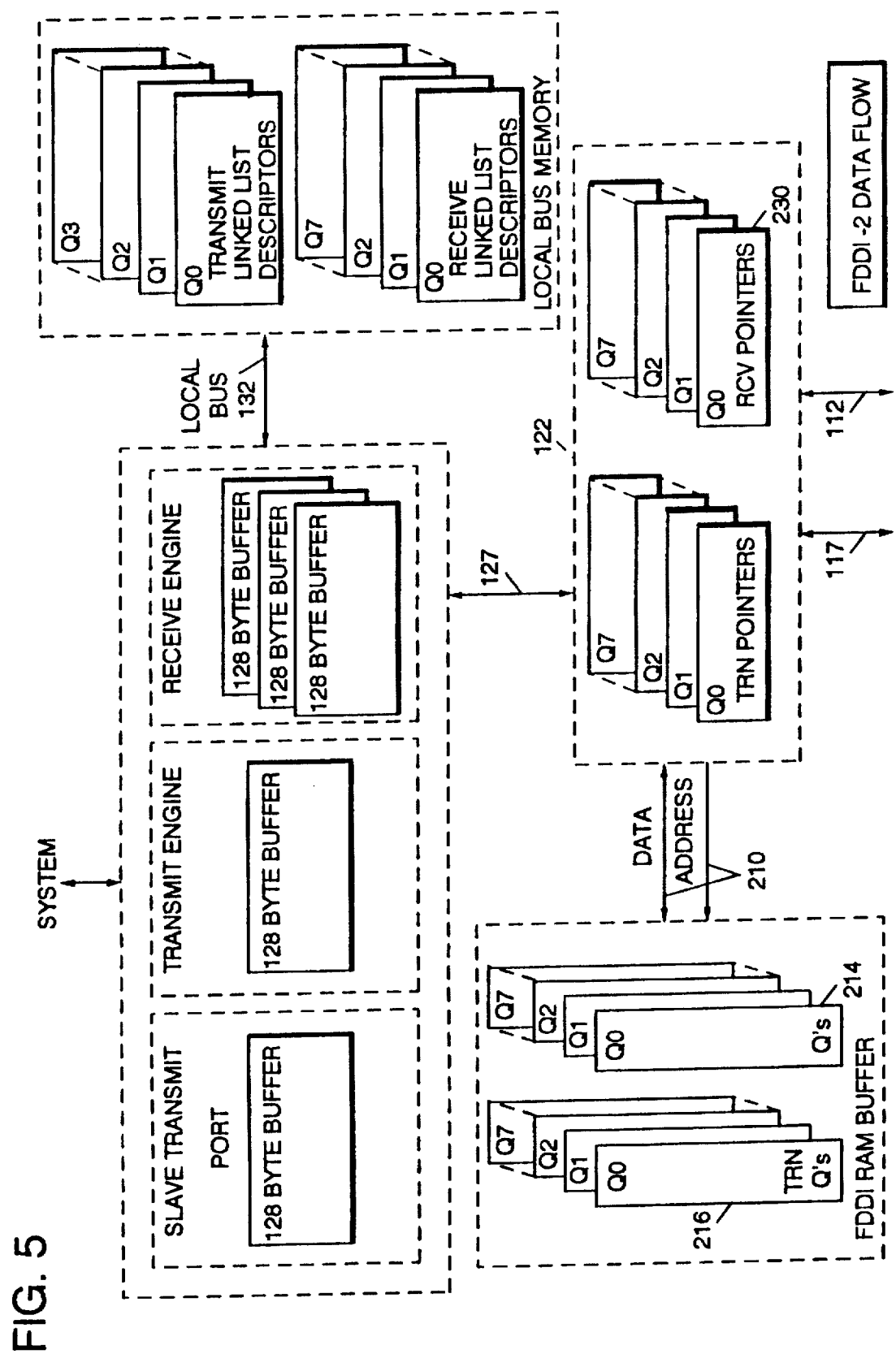
FIG. 5 is a block diagram showing the data flow, pointers and descriptors of the adapter shown in FIG. 1.

The P-MAC interface has a separate indicate (receive) 124 and request (transmit) 126 bus with an 80 n.s. byte stream transferred in each direction. Along with the byte stream, the MAC 118 (see FIG. 1) provides a set of sequencing flaqs and control signals to the P-MAC. As shown in FIG. 5, the I-MAC section is connected in a series with the P-MAC which operates independent of the FDDI ring mode. A strobe signal is provided along with a byte stream identifying whether the incoming byte is intended for the P-MAC. When the strobe is disasserted, the P-MAC ignores all incoming bytes. On those bytes intended for the P-MAC, the P-MAC looks at the flags qualified by the sequencing signals to make a decision to copy or not copy a frame. The copy criteria can be different for frames with different fields. On the output side, the request interface outputs a byte stream to the ring 112 (see FIG. 1) on a service opportunity (i.e., the token has been captured). The MAC 118 outputs on its physical request bus 124 a byte stream that is either the repeated physical indicate bus along with tag bits (identifying the bytes as packets/isochronous) or the MAC request byte stream from the controller which is inputted to the I-MAC 140, 142. All incoming bytes not tagged as isochronous are wrapped to the output of the I-MAC and transmitted to the interface device 116 via its physical request bus 120. Thus, the I-MAC interface also has an 80 n.s. byte stream transferred in each direction.

The I-MAC accesses a steering table 222 in synchronism with a hybrid ring cycle when operating in hybrid mode. For each byte in a hybrid ring cycle, the entry in the I-MAC steering table identifies a queue for an incoming isochronous byte to be placed and the queue from which the isochronous byte is to be read from for transmission into the physical request bus to interface 116. The controller gets into synchronism with the FDDI ring by detecting the starter delimiter field at the beginning of a cycle header.

The P-MAC indicate engine 138 consists of a 8-word circular FIFO 219 and decision logic in the form of a wired standard gate array that determines, among other things, whether to copy or not copy frames. The P-MAC copy criteria register (FIG. 7) is used by software to program the criteria for which different frame types are copied into FRB 130. Those packets that the P-MAC indicate engine 138 has determined should be copied are then written to FRB 130 under control of the queue manager 212. A packet frame is then placed into either queue zero, 1, or 2 (see FIG. 5) on whether the code of the frame control field indicated synchronous, asynchronous/MAC, or Station Management (SMT), respectively. Four frame types are recognized and copied into separate queues: Synchronous (Queue Zero), Asynchronous/MAC (Queue 1), and SMT frames (Queue 2). Eventually, the external queue in the FRB reaches threshold (this is maintained by the Queue Manager as bytes are written to FRB) or the end of the frame is reached. In either case, a bit in a queue status register (see FIG. 6A) that corresponds to the queue is set. The interface 127 periodically polls this register and in subsequent cycles reads that queue.

The P-MAC request engine 136 also consists of an 8-word buffer and a wired standard gate array that is used to transmit in one of the frame types: asynchronous and synchronous. Asynchronous and synchronous frames initially transmitted from the system interface 128 are directly located into la P-MAC transmit FIFO 220 under control of the queue manager 212. Subsequent bytes are placed in the FRB 130 and eventually the end of frame (EOF) or threshold is reached for that queue. At that point, the queue manager instructs the P-MAC request bus 124 to capture the token. Queues 0 and 1 are used to transmit synchronous (queue 0) and asynchronous/SMT (queue 1) frames. In addition, the P-MAC transmit FIFO provides a synchronous bandwidth allocation counter (see FIG. 9) used to control the amount of synchronous bandwidth on a service opportunity. The P-MAC transmit engine 136 transmits all the synchronous frames buffered within the time limit defined by the synchronous bandwidth allocation counter. While the synchronous frames are being transmitted, any asynchronous frames that the system interface unit (SIU) 128 is front-loaded into the P-MAC FIFO 220, with subsequent bytes written to FRB 130.

The controller begins to transmit asynchronous traffic once all of the synchronous traffic is sent or the synchronous bandwidth allocation counter has expired, and a token holder timer (not shown) maintained in the MAC 118 has not expired. Any frames, synchronous or asynchronous, once the controller has initiated tranmission, always complete, regardless of subsequent counter or timer expiration.

The I-MAC indicate engine 142 is a wired standard gate array that, among other things, copies the incoming isochronous bytes destined for the station. As previously mentioned, the I-MAC must first get in sync with the FDDI master cycle. This is done by comparing all incoming bytes tagged as control bytes with the starter delimiter of the cycle header. Once detected, the 1560 byte steering map 222 is read in advance of each byte in the wideband channels to be received/transmitted to the ring. The steering map is a one-for-one entry of each byte slot in a FDDI II cycle. Each entry contains the queue from/to which the bytes are to be received/transmitted to the ring for that time. Invalid entries indicate nothing is to be received or transmitted. The wideband channels can be configured in a variety of ways. For example, within an isochronous wideband channel, the bytes can be received/transmitted from diferent queues. The I-MAC indicate engine 142 accounts for this by providing two levels of buffering. At the first level, a 4-byte word is constructed from each byte received for each queue. The second level of buffering is a pool of built words staged from the first level along with the queue numbers for that word. The words are loaded into an 8-word deep FIFO 223 from which the queue manager transfers the word to either the interface 127 (if buffering is available for that queue) or to the FRB 130.

The I-MAC request engine 140 is a wired standard gate array that, among other things, handles the transmission of isochronous data to the ring. The I-MAC request engine indicates to the queue manager 212 the queue whose buffer is not full. The queue manager sets the queue status register bits to indicating the queues used for isochronous traffic are ready for transmission. The initial words are directly located into the I-MAC request engine 140 and only when the buffer for that queue in the I-MAC request is full or the queue manager has placed data for that queue into the FRB are subsequent words written to FRB. The queue manager attempts to keep all the buffers for each active transmit queue full. In a similar fashion to that for the engine 142, two levels of buffering are provided for the request engine 140. At the first level, are the words of each queue, and as the steering map is read, the appropriate byte is transmitted to the ring, provided a valid entry is in the steering map for that queue. The request engine 140 maintains which byte is to be transmitted to the ring, once all the bytes of the word for a particular queue have been transmitted, then a new word is staged from the second level of buffering. In the second level of buffering, two words of buffering are provided for each queue. The request engine 140 keeps the queue manager informed as to which queues need words. The queue manager attempts to keep all the buffers full for all active queues.

The queue manager 212 is a wired standard gate array, and among other things, services requests from all the other sections within the controller such as: The P-MAC request 136 and indicate engines 138, the I-MAC indicate 142, request 140 engines; the controller interface 127, and the local bus interface 132. A request signifies one of the sections asking the queue manager to either receive or transmit a word to/from another section via one of the internal buses, that is, the queue manager controls usage of the internal buses (drives the multiplexor controls) and with each service maintains the status of an affected queue. The queue manager also maintains a parameter RAM 218 where the thresholds, read and write pointers for all queues reside. Simultaneous requests are prioritized and processed sequentially, the queue manager having the intelligence to service two requests in the same cycle provided those requests do not contend for the same bus. Further, the queue manager is adapted to front-load the system interface unit 128, the P-MAC sections 136 and 138, or the I-MAC sections 140, 142, when buffer space is available instead of writing the words to an FRB 130. As an example, the P-MAC indicate engine 138 requests a receive packet word to be taken from the P-MAC's FIFO 219 (which will frequently happen as packet frames destined for this station are received). If that is the only request, the queue manager reads the word out of the P-MAC FIFO and either directly loads the controller/system interface 127 into the associated queue (provided there is buffer space available) or commands the FRB to write the word to FRB. If the word must be written to FRB, the parameter RAM 218 is read to obtain the location where the word is to be written. Once the operation completes, the write pointer is updated and written back to the parameter RAM.

The controller/system interface 127 is a synchronous interface running at 50 mhz. The system interface 128, is the master device requesting status on the FRB queues. Once a particular queue has reached threshold, the corresponding bit in a status register is set and the system interface 128 determines which queue it wishes to transmit or receive data from by placing the queue number on the interface. The transmission of each word across the interface 127 is done using a request/acknowledge scheme.

The local bus interface 132 is provided for the local processor 134, a commercially available micro processor, to configure the controller's internal registers. Also, the local processor can access the FDDI RAM buffer, if so desired, as part of the diagnostic routines during bring up. The local processor can also place network protocol frames in the FRB when it desires the controller to continuously transmit these frames.

5.4.1. Controller Registers

There are five (5) register sets used in the controller: Control registers; Event registers; Queue and Parameter RAM Registers; IMAC Map Steering registers; and FRB access registers. The FRB access register will be discussed with the FRB. The control registers comprise a mode register; queue enable/disable register; PMAC copy criteria register; I-MAC flow control register; parity control register and synchronous bandwidth allocation register.

In FIG. 6, the mode register is shown. Two bits are set in the mode register for operating the controller 122. Four modes are available: Stop/Reset; Beacon; Void; and Normal. In the stop/reset mode I-MAC, P-MAC and the controller interface 127 are in a stop mode and no data can be transferred. The Beacon mode causes the controller to transmit directed beacon frames located in the FRB without capturing a token. The Void mode causes the controller to transmit the void frame located in the FRB after the token has been captured. Normal mode enables the P-MAC, I-MAC and System Interface Unit to begin processing insochronous and packet MAC frames.

In FIG. 6(A), the Queue Status register is shown. The register allows software to know whether each receive and transmit queue is empty or full.

In FIG. 6(B), queue enable/disable register as shown allows software to enable/disable any of the 8 receive or 8 transmit queues individually. Each bit when set enables a particular queue for usage, bit 0 to 7 control the enabling or receiving queues 0 to 7 respectively. Likewise, bits 8 to 15 are used to enable/disable transmit queues 0–7.

In FIG. 7, a P-MAC copy criteria register is shown and used to program the copy criteria of MAC, SMT, SNYC, and ASYNC frames at the P-MAC indicate bus individually. Two bits are used for each frame type. When the copy criteria for MAC frames is not set to indiscriminate, the controller copies all MAC frames except voids and tokens. In the promiscous mode, all frames are copied but not tokens.

In FIG. 8, an I-MAC flow control register is shown and only applies to I-MAC queues. Bits 0 to 7 of this register specify the flow control byte that is transmitted when either: Threshold has not been reached for an isochronous queue or the isochronous queue is transmitting and became empty.

On the receiving end of a downstream station, this causes a word being built to be upstaged. This also terminates receiving any more bytes for that queue. Reception is resumed when the control byte is no longer being received and only at the beginning of the next FDDI-2 cycle. If the control byte being received is not equal to the flow control byte, than the programmable dummy byte is loaded into that queue. This is used to handle "out of sync" problems, where an early (starting delimiter limiter) is received. The dummy byte is loaded until the end of the current FDDI-2 cycle.

In FIG. 8(A) a parity control register is shown and used to enable/disable parity checking/generation and provide odd/even parity select at all the interfaces. After reset, this register is set with odd parity enabled at all the interfaces. This register allows software to verify the functionality of the parity circuits at all of the interfaces in either a diagnostic mode during bring up or in a de-bug session to isolate parity errors.

In FIG. 9, a synchronous bandwidth logic register is shown and consists of a 21-bit holding register and a 21-bit counter and is used to specify the amount of bandwidth available for synchronous frame transmission. The counter is enabled after the token has been captured and increments after each byte of a synchronous frame is transmitted; it is never incremented for any other frame type. If MAC 118 does not capture the token, a write to this register loads the holding register as well as the 21-bit counter, otherwise only a holding register is loaded. A bit in this register signifies 80 n.s. of time, which also represents one byte transmitted to the ring. The FDDI standards specifies the default maximum amount of synchronous bandwidth to be 165 ms., thus requiring 21-bits for the holding register and counter. This register must be loaded with two's complement value, since the counter is incremented and an over flow occurs when the bandwidth has expired. If the station has used up more than its allotted bandwidth, than an interrupt is generated. Nevertheless the controller completes the current transmission, the counter is disabled and once the token is released the counter is reloaded with the value in the holding register.

Figure 10:
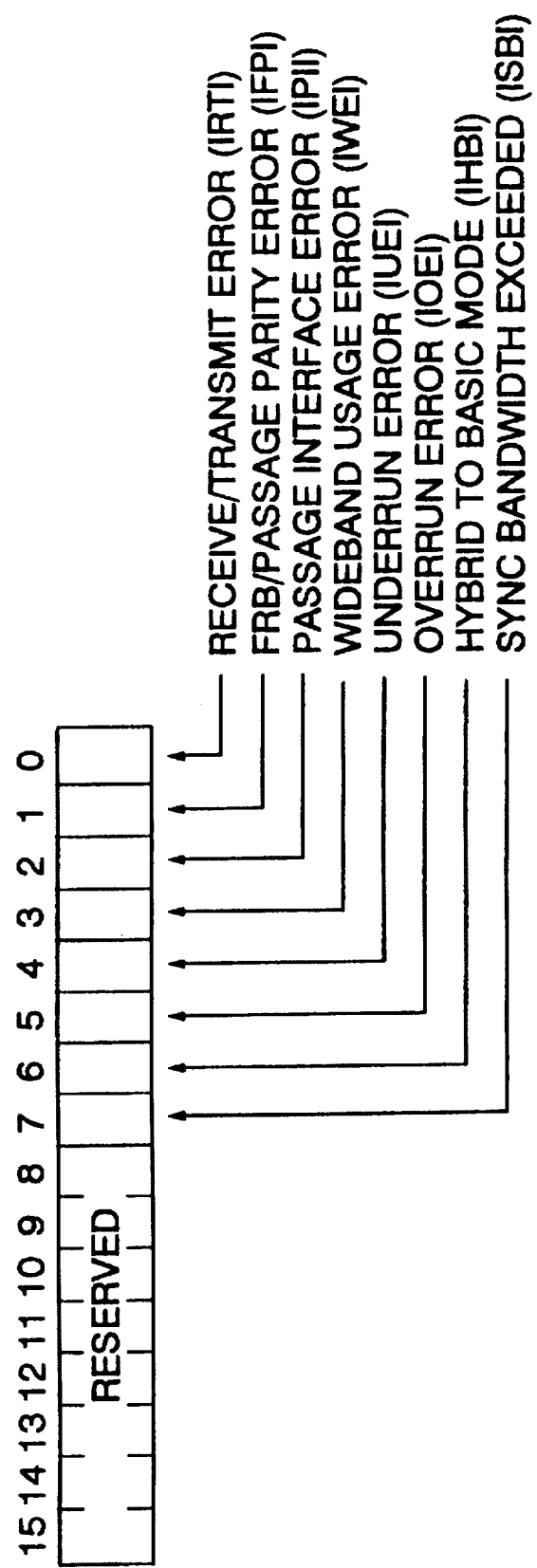
FIG. 10 is a representation of an Master Interrupt Register included in the controller of FIG. 4.

Event registers record the occurrence of events or a series of events that contribute to generating the interrupt signal. There is a two or three level hierarchy in generating this interrupt signal. At the first level of the hierarchy is a global disable interrupt from a master interrupt mask register (see FIG. 10) which serves as global interrupt control and when it is set to a (1) prevents the interrupt signal from ever being asserted. This does not prevent the interrupt register from recording any error that may occur. At the second level of the hierarchy are the mask bits (bits 0–7) of the master interrupt mask register. If one of these bits is set and the corresponding bit in the master interrupt register is set to a "1", then the error has been captured in the master interrupt register but the interrupt signal will not be asserted. The third level of the hierarchy is the mask that corresponds to each individual error in the following registers (not shown): receive/transmit error register, transmit underrun error register, receive overrun error register, parity error/mask register, and system interface error/mask register. If the mask bits are set to "1", then the corresponding error will not set a bit in the master interrupt register and will not generate the interrupt signal. However, the error will be captured in the error register for that particular error.

The Parameter RAM 218 includes queue status registers (all not shown) which are read only registers and provide the status of each queue (receive and transmit). The registers include: A queue empty register; a queue full register; a queue threshold register; queue pointer wrap register; and an almost full register. The queue empty status register allows software to know whether each receive and transmit queue is empty/not empty. This register is read only, software can read this register to know whether a queue is empty before disabling it. The Parameter RAM registers are configured in a standard RAM.

A queue full register provides software with a full/not full status indication for each queue. This register is read only. Individual bits are reset when the size and base pointer is loaded to a particular queue, set during the status bit update for FRB writes when the second to last word has been written into the queue and is reset whenever there is room for two or more words.

A queue threshold status register allows software to know which receive or transmit queues are at or above threshold. During every status bit update, the bit for the queue involved will be set that the computed number of words in the queue is equal to or greater than the queue's threshold parameter, or else it will be reset. This register is reset after power on and when software sets the size and base pointer. Transmit threshold queue status bits along with the frame counters are used by the P-MAC transmit to initiate a token capture as well as the starting frame transmission to the ring. Transmit threshold queue status bits are used by the I-MAC to start a queue's transmission to the ring. Receive threshold queue status bits are used by the queue manager to set the receive queue status register bits which tells the SIU that the controller has buffered an adequate number of words for transfer to the system.

The queue pointer wrap register allows software to know which queues are wrapped, that is when the read pointer is larger than the write pointer. The bit is set when the queue's write pointer is updated by the queue's base pointer parameter. This bit is used by the controller's queue manager hardware in calculating the number of words in the queue. A queue almost full status register has bits 0–7 for transmit queues 0–7 respectively. A bit is set during queue status bit updates if the queue has room for less than 65 words. The content of these bits is used to acknowledge the System Interface Unit (SIU) during a transmit operation if the transmit queue being accesses is almost full. These bits are reset by power on, when software sets the size and base pointer in doing queue status bit updates if the queue has room for more than 64 words.

In FIG. 11, the I-MAC steering map table 222 (see FIG. 4) provides the I-MAC receive and transmit interfaces the receive/transmit queue numbers of each isochronous byte. Each byte of the FDDI-2 master cycle is mapped one for one in the steering map, progressing across the cyclic groups, as they are received from the ring. The steering map includes the mapping of the cycle header and the dedicated packet group bytes including the isochronous maintenance channel. The map has 1560 receive/transmit entries. Each steering map entry has 4 bits providing the transmit queue number and 4 bits for the receive queue number, addressing for the IMAC steering registers as shown in FIG. 11(A).

The steering map can map isochronous bytes to any of five (5) isochronous receive queues (queue number 3 through 7) and any of the seven (7) isochronous queues (queue number 0 and 2 through 7). See FIG. 5(A). Queue number routing to isochronous queues are the only valid entries for the steering map. Other values indicate an inactive entry and therefore no receive or transmit routing at the I-MAC engine is provided for that corresponding cycle byte.

5.4.2. Packet MAC Engines (P-MAC)

Returning to FIG. 4, the P-MAC interfaces 124, 126 handle all the packet frame data being received or transmitted on the system. The P-MAC indicate engine 138 receives system data and the request engine 136 transmits data. Each of these interfaces communicates with the MAC 118 which handles the Media Access Control (MAC) protocol. The P-MAC interface buffers 219, 220 transmit and receive data, control transmission operations and supervises receive operations. On transmission, the P-MAC directs the MAC 118 to capture a token and start transmission. The receive port inputs both the receive data and status signal. The status signals and incoming data must be interpreted by the interface to determine if the frame will be copied into the receive buffer and whether the frame was copied without an error.

Figure 12B:
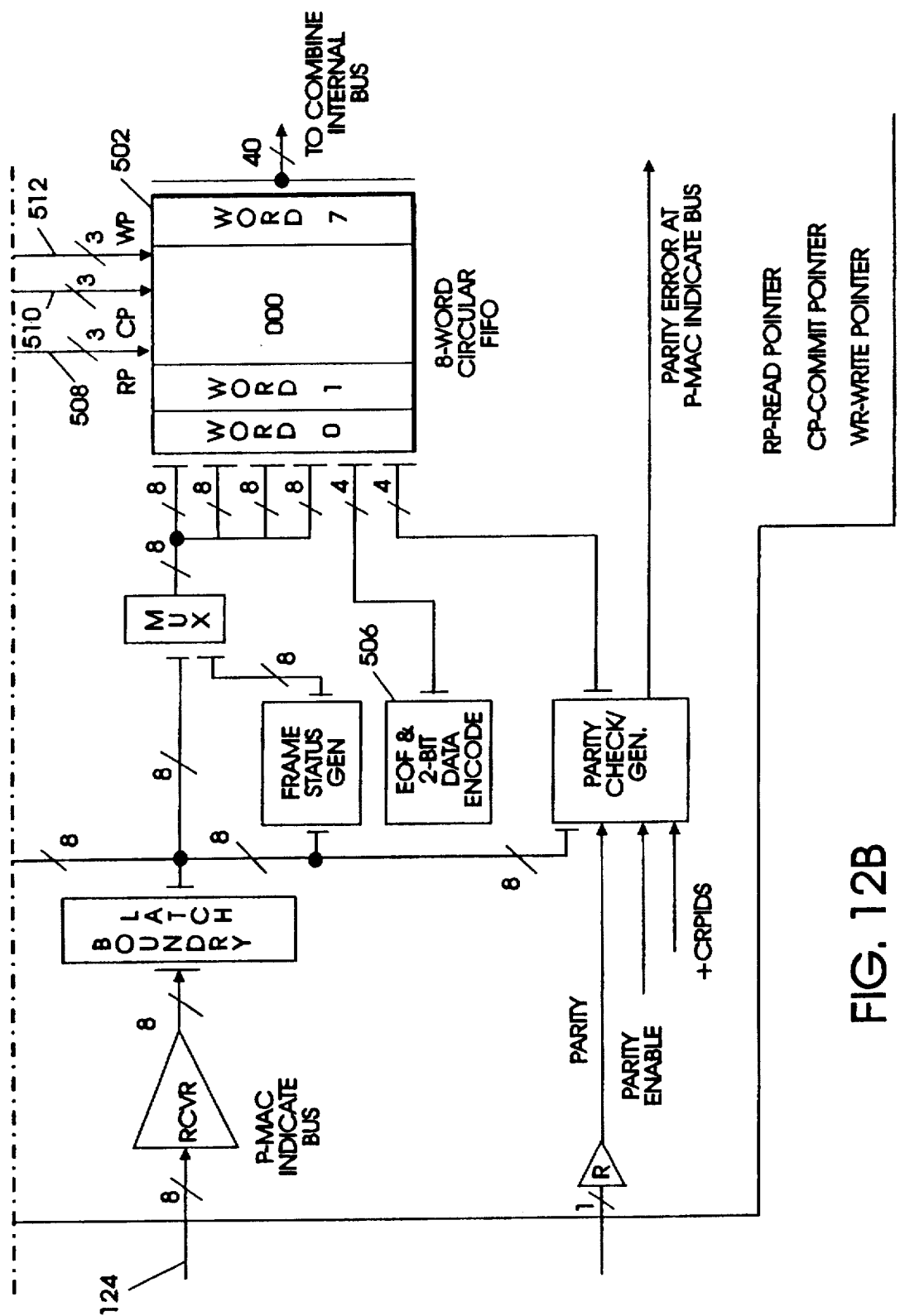
FIG. 12 is a block diagram of a P-MAC receiver included in FIG. 4.

Referring to FIG. 12, the P-MAC receives an 80 ns. byte stream from the MAC on bus 124. The bus 124 interface consists of an eight bit data bus, a parity bit, a CRPIDS strobe signal, and a set of sequencing and flag signals. The 8 bits of data are input to a 40-byte circular FIFO 502, once the frame control byte is recognized on the bus 124. Additional bytes are received with those bytes received and buffered the P-MAC makes a decision to commit and continuing copying bytes to the end of a frame and write the frame to the FRB 130. The receiver makes a decision to copy or not copy the packet based on the programming of the P-MAC criteria register 504 for one of the four frame types (MAC, SMSMT, ASYNC, and SYNC) that the controller copies to the FRB.

The FIFO 502 is used to build a 40 bit word consisting of 4 data bytes, 4 bits of parity and 4 bits for an End of File (EOF) indication. The 40 bit word is then output to the controller's internal bus and subsequently written to FRB under control of the queue manager 212 (see FIG. 4). The CRPIDS strobe is always asserted in basic mode and is only asserted when the data is intended for the P-MAC in hybrid mode. All bytes with the CRPIDS strobe de-asserted will not be written to the circular FIFO 502. The P-MAC interface 124 checks parity for each byte received and loads received parity bit in the 4-bit parity field. The parity bit generated is also compared to the parity bit received. P-MAC parity errors are reported only if there is a miscompare and the local processor is unable to parity check it and CRPIDS is asserted. Three-byte pointers are used in the criteria register 504 to manage the circular FIFO 502: A write pointer, a read pointer, and a commit pointer.

The P-MAC receiver also receives a STOP mode signal that is decoded from the two mode bits in the mode register included in the controller. After reset, the mode bits are set to STOPPED mode. In this mode, the P-MAC receiver does not recognize frame control bytes and does not receive any data from the P-MAC bus 124. The state machine is stopped and frozen in an idle machine. The local processor 134 (see FIG. 1) sets the mode bits to normal after completing configuration of the controller's register. When the STOPPED mode signal is not true, the P-MAC interface assumes that the controller is in normal mode. Normal mode enables the P-MAC receiver to recognize frame control bytes and therefore begin receiving and copying frames.

The FIFO 502 is 5 bytes wide and 8 words deep forming a 40-byte buffer. Thus, the received byte stream on the P-MAC bus 124 is built into a 40 word, 4 data bytes and a tag byte before it is written to FRB. The tag is an appended fifth byte to each 4-byte word that is built, containing the 4 bits of parity for each of the 4 bytes, 2 bits indicating how many of the 4 bytes are valid bytes and an end of frame bit to indicate the last word of the frame, one bit is reserved. A 2-bit counter 506 is used to keep track of the number of bytes written in a particular word. Thus, a count value of "zero zero" indicate that one byte has been written to the FIFO as part of the current word, "zero one" indicates two bytes, etc. This 2-bit counter is used as part of the tag field indicating the number of valid bytes within the 40-bit word as well as the EOF bit indicating the end of frame. It is also used to direct an incoming byte into the appropriate 4-byte field comprising the 40-bit word.

The end of the frame is reached when the MAC 118 asserts an ending delimiter signal. The P-MAC receives FIFO logic strips, the frame checks sequence which are the last 4 bytes before the ending delimiter. The P-MAC receive logic does this by buffering 4 bytes of data before writing to the internal FIFO. The frame check sequence will be located in the 4-byte buffer when the delimiter signal is received and will be discarded. The last 40-bit word for the receive packet frame, referred to as the end of frame word frame, contains the status byte. The status byte is the last byte of the frame and is generated by the P-MAC receiver's control logic. The ending delimiter signal increments the write pointer so that the frame status is the only valid byte in the last word of the frame. The frame status is always the least significant byte of this word.

The FIFO 502 is implemented as a circular FIFO in that the address wraps back around as the FIFO becomes full. Three pointers are used to manage the FIFO: A read pointer 508, a write pointer 512, and a commit pointer 510. Upon initialization, all pointers are equal and set to zero. During normal operation, when a P-MAC frame has been completely received and transferred out of the FIFO, the three pointers will be equal and pointing to one of the eight words. When MAC 118 asserts a signal indicating the frame control byte is on the data bus, the P-MAC receiver receives the frame control byte and ensuing bytes with the write pointer incremented with each word written to the FIFO. The ensuing bytes are the destination and source address portions of the frame. The MAC 118 asserts flags to indicate that the source and/or destination addresses received are in this station. With these flags, a decision can be made to commit this frame, that is, to continue copying the rest of the frame. The P-MAC continues to a frame based on the copy criteria, the frame type, the queue being enabled, the skipped bit in the mode register and the frame being of valid type, that is, not a token frame.

If a decision is made to not copy the frame, then the write pointer is set back equal to the commit pointer. Thus, those few bytes that were written into the FIFO are overwritten on the next occurrence. Otherwise the frame is copied and the commit pointer is set equal to the write pointer. As each new word is formed from the received bytes, both the commit pointer and write pointer are incremented. The writing of the current frame continues until a termination event occurs on line 514. A termination event is caused by one of several signals received from the MAC which will be discussed hereinafter.

5.4.3. P-MAC Transmit

Figure 13:
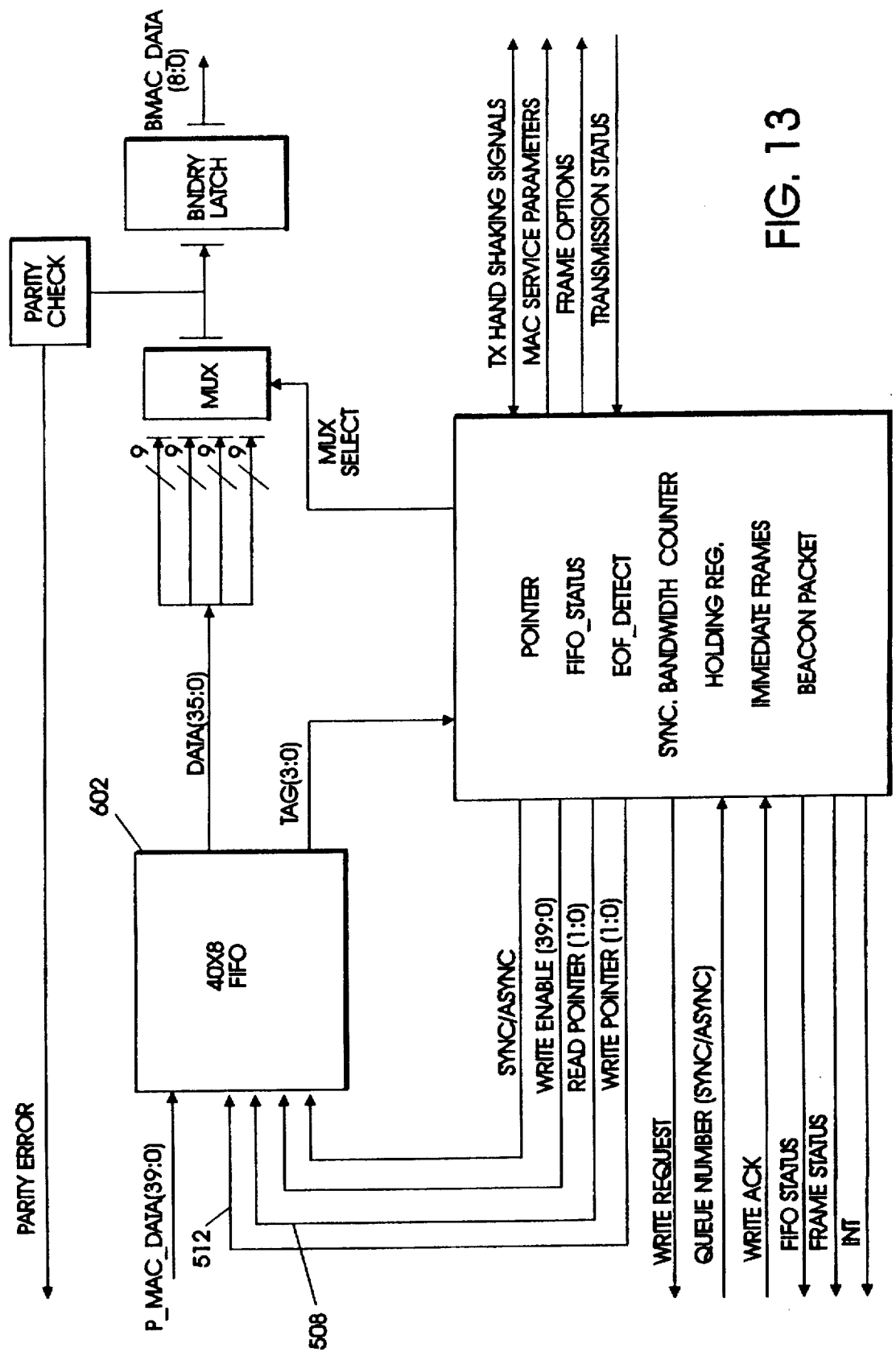
FIG. 13 is a block diagram of the P-MAC transmitter included in FIG. 4.

Referring to FIG. 13, the transmit FIFO 602 is a 40 byte (eight 5-byte words) RAM which receives a 40-bit word from the interface 127 for the FRB interface 131. The FIFO 602 is organized as two separate queues, 4 words each, one having synchronous frames, the other, asynchronous SMT/MAC. Each queue holds the front end of the larger external queue in FRB that contains the remaining portion of the frame. The queues are managed as circular FIFO's using the read and write pointers, lead pointer 508 and write pointer 512, previously described. The read pointer and write pointer are equal when the queue is empty. As the write pointer reaches the top of the FIFO, it resets back to the bottom of the FIFO so that the pointers rotate in a circular fashion. The top and bottom of the queue in the FRB are further defined by programming the base and limit pointer in the parameter RAM 218 (see FIG. 4). The transmit interface recognizes an underrun condition, that is when an end of file condition did not occur on packet frames and the read pointer is equal to the write pointer, with the error captured in a transmit underrun error register.

The system interface 128 transmits the packet frames (ASYNC or SYNC) to the controller across the controller interface 127. The front end of these packets are directly loaded into P-MAC transmit FIFO 602 if it is empty without loading the word to the FRB, the ensuing words from the MAC 128 are written to the FRB. The queue manager 212 (see FIG. 4) maintains the write pointer and threshold for the queue that the packet is being written to in the FRB, and also looks for the end of flag to occur. Two frame counters are maintained the queue manager, one for synchronous and one for asynchronous frames, the reception of an end of flag for a synchronous frame increments the synchronous final frame counter, likewise for the asynchronous frame state. The P-MAC tranmit notifies the queue manager when the last byte of a synchronous frame has been transmitted, this results in the queue manager decrementing the frame count for the synchronous frames, likewise for the asynchronous frames. A non-zero frame count or threshold reached is used for both the asynchronous and synchronous frames by the queue manager to request the P-MAC transmitter to capture a token and transmit these frames. The P-MAC prioritizes the frames transmitted with synchronous transmitted before asynchronous. The P-MAC transmitter request to the queue manager that it needs words as the frame is being transmitted whenever the FIFO is not full. The queue manager attempts to keep the FIFO full by reading words from the queue in FRB that contains the remaining portion of that frame and writing them to the transmit FIFO. As each byte is transmitted to the MAC 118, the tag bits for that word are inspected for an end of file condition. If an end of file condition did not occur, then in the P-MAC transmitter continues to empty bytes out of the FIFO and to increment the read pointer after each word has been transmitted. Eventually the end of file word is transmitted by the P-MAC transmitter, which outputs only the number of bytes indicated by the tag bits. A multiplexer 143 is stepped to the last byte and as it is transmitted, an end of file is asserted by the controller to the MAC indicating the last byte. The P-MAC signals the queue manager when the last bye of the frame is being transmitted. The queue manager keeps track of the number of completely buffered frames for each frame type. This number gets decremented when the last byte of a frame is transmitted and it gets incremented when the end of file byte gets loaded into the FRB.

The P-MAC transmitter requests a service opportunity to the MAC once there is at least one complete frame buffered in the FRB or the threshold in the FRB is crossed. Synchronous frames have higher priority than asynchronous frames and transmission can bounce between synchronous and asynchronous traffic. For example, the transmitter may be in the middle of transmitting an asynchronous frame while the synchronous frame completes transmission from the system interface into the FRB. The P-MAC transmitter requests the MAC when it wishes to switch to SYNC frames servicing once the current ASYNC frame completes. The PMAC transmitter switches to service in the synchronous frames even though additional asynchronous frames are buffered. The synchronous frame and any additional frames that may be read are transmitted to the MAC as long as the synchronous bandwidth counter has not expired. The MAC transmitter asserts a request for asynchronous traffic while the synchronous frame is transmitted, and if the token holding timer has not expired, the MAC will allow the asynchronous frames to be transmitted.

Asynchronous frames are transmitted only if there are no synchronous frames to be transmitted and the token holding timer has not expired, after a token has been captured by the MAC. Synchronous frames are guaranteed to be transmitted as long as the synchronous bandwidth counter has not expired. The synchronous bandwidth allocation counter must be programmed by the local processor. This counter specifies the amount of bandwidth available for synchronous frame transmission. The counter is reloaded with a value in a holding register once the token is released. The synchronous bandwidth counter is 21 bits, and the counter is enabled at the beginning of a service opportunity. That is the token has been captured and is only incremented while transmitting the synchronous frames.

5.4.4. I-MAC Engine (I-MAC)

Figure 14A:
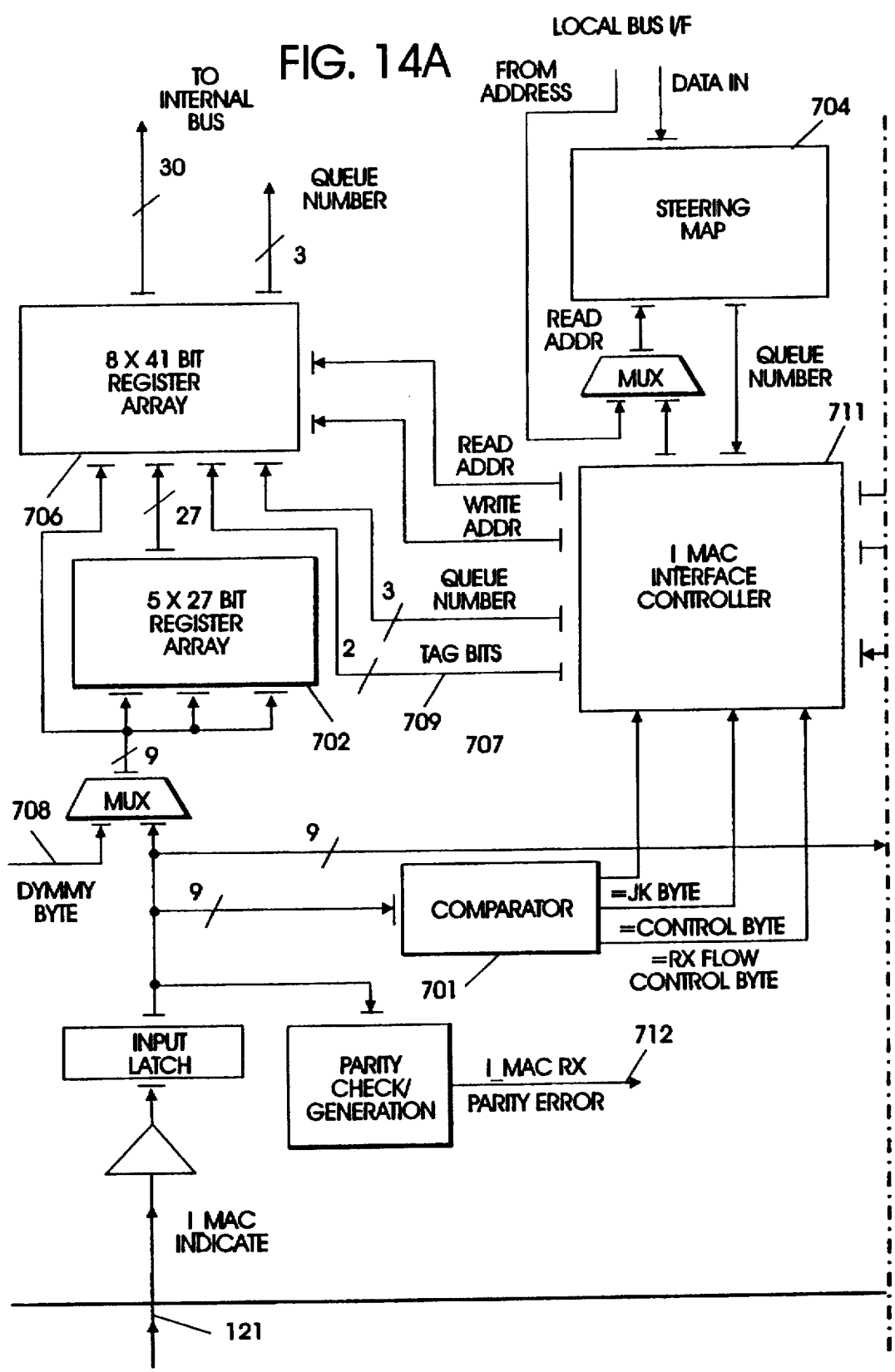
FIG. 14 is a block diagram of an I-MAC indicate and request engines included in FIG. 4.
Figure 14B:
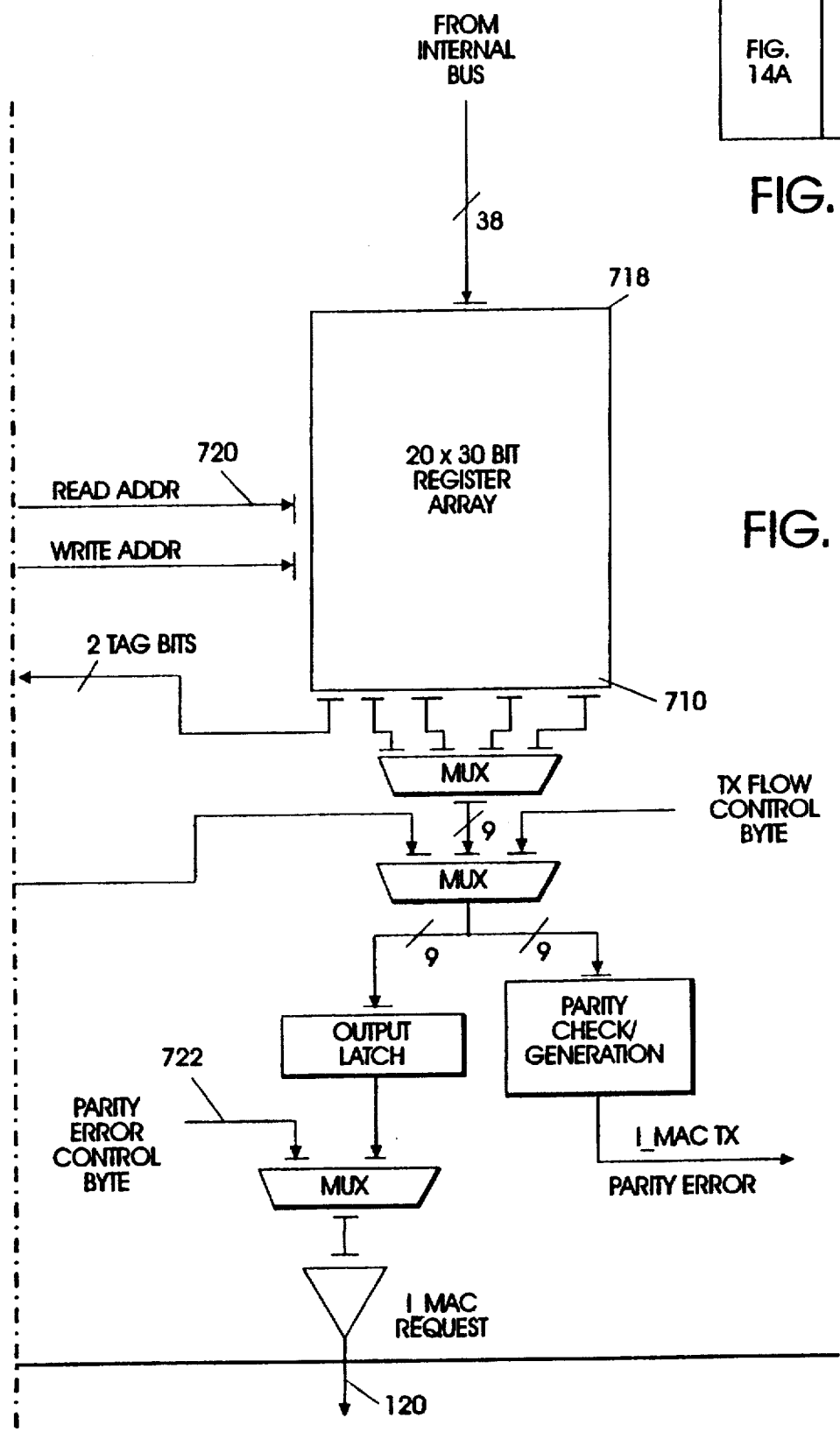

Ref erring to FIG. 14, on the receive side, all incoming bytes tagged a s control byte s are compared with the starter delimiter pair in a comparator 701. The comparison is for synchronization of the steering map table 704 with the FDDI-2 cycle on the bus 121. Incoming bytes are copied into a 5 by 27 bit register array 702 and/or repeated on the request bus 120 according to the steering map table entries in register 704. This register is organized as a five 3-byte register, one for each isochronous receive queue, and is used to build 4-byte words. Once the fourth byte of a word is received, the entire word is passed to the next stage of buffering organized as an eight 4-byte word FIFO 706 with the associated queue number and tag number provided on lines 707 and 709 from the I-MAC interface controller 711.

The queue manager 212 (see FIG. 5) transfers the first word of register 706 to FRB or the controller interface 127. When a control byte, other than the programmable flow control byte when the flow control mode is selected on the receiver, is detected on the indicate bus 121, a programmable receive dummy byte 708 is loaded in place of the isochronous data byte. When a dummy byte mode is selected in the mode register (see FIG. 6), all consequent isochronous bytes of the current cycle that are destined to the same field are replaced by the dummy byte. Normally reception is assumed at the beginning of the next cycle. Finally, when a receive flow control byte 716 is detected with the flow control mode selected, on the indicate bus 121, the word that is being constructed for that queue is upstaged into the second level of buffering.

On the transmit side, the queue manager writes a 4-byte word into a 38 4-byte register array 718. This array is organized as 7 four-word FIFO's, one for each isochronous transmit queue. Requests to the queue manager are made in order to keep these FIFO's full. Bytes are then read from this array and transmitted on the request bus 120, as indicated by the steering map table 704. When all bytes in a word have been transmitted, the corresponding FIFO read pointer 720 is updated. Also, when no byte has been transmitted, the current byte on the indicate bus is repeated. Moreover, when a queue is empty or has not crossed its threshold, a programmable flow control byte is transmitted. Finally, a parity error control byte 722 is transmitted on the request bus 120 when a parity error has been detected either on a receive byte or on the transmit byte.

The flow control byte 710 is a programmable byte that is transmitted in place of an isochronous data byte whenever a queue under runs or is empty. The flow control byte is always transmitted with a control bit. Once that flow control byte has been transmitted from the queue, identical flow control bytes are transmitted for that same queue as indicated by the steering map until data arrives in to the queue. Normal transmission is resumed on the FDDI-2 cycle immediately following the arrival of threshold bytes or data in the queue.

At the receiving station, if the flow control byte mode is not selected, no special action is taken when an incoming flow control byte is detected. It is treated as any control byte. That is, the control byte received interrupt is raised and a dummy byte is received. However, when the flow control byte is detected in the mode register, if an incoming byte is recognized as being identical to the flow control byte of the receiving station it comes in place of an isochronous byte that is to be received, the current word that is being built for that queue is upstaged into the second level of buffering and the corresponding queue reader bit in the interface 127 register is set. Subsequent flow control bytes destined to the same queue are not received. Normal reception of the isochronous bytes for that queue resumes whenever new data arrives.

Flow control byte transmission and recognition can be performed on a per queue basis. However, the value of the flow control byte is common to all queues of a given station. Finally, in order for the flow control byte mode to take place, both the transmitting station and the receiving station have to have the same flow control byte value.

When a control byte tagged as isochronous and other than the flow control byte is received in place of an isochronous data byte, a dummy byte 708 is loaded in place of the data byte. The replacement of an isochronous data byte by a dummy byte can be extended to all isochronous bytes of the current cycle going on in the same queue if the dummy byte mode is selected in the mode register.

When the a dummy byte mode is selected, and if an isochronous byte of a given queue is replaced by a dummy byte, all subsequent isochronous bytes destined for the same queue and from that same FDDI-2 cycle are replaced by a dummy byte. Normal reception of isochronous data bytes for that queue is resumed on the next FDDI-2 cycle boundary.

The steering map table 704 provides both I-MAC engines (indicate and request) with the queue number required to perform the byte routing to/from the proper queue. The steering map table offers a mapping of each byte of the FDDI2 cycle, including all header bytes. In case a byte is not destined to the station, an inactive entry is provided.

The progression across the steering map table is fully synchronized with the FDDI2 cycle. The steering map RAM is addressed by a counter (not shown) that is incremented every time a new byte is received. The counter is reset to point to the beginning of the steering map table when the end of the table has been reached.

A read operation to the steering map table provides the queue number for both the transmit and receive queues. Therefore, the steering map table has to be accessed only once to provide the routing information to both the indicate and request engines.

5.4.5. Queue Manager

Returning to FIG. 4, the queue manager 212 is the internal control logic within the controller that manages the parameter RAM 218 and performs word transfers from one functional island within the controller to another or to/from the FRB. The queue manager is driven by requests from any one of the functional islands (P-MAC indicate and request, I-MAC indicate and request, controller interface or local bus, and when it receives one or more requests, it enters an arbitration cycle to determine which request is serviced. A request is an indication from any one/all islands that have a 40-bit word read from or written to any of the other functional islands or to the FRB. The queue manager maintains the status of all queues and once it completes servicing requests, updates the parameter RAM for that queue.

The parmeter RAM 218 is implemented using four separate general register arrays with each array being 16 words by 16 bits each. Each array contains one of the four parameters maintained for each receive and transmit queue (base pointer, queue size, threshold, read and write pointers). The first array contains a 16 base and size parameter for all the queues, the second contains the threshold. The 3 low order bits of the local bus address select one of the four arrays. Bits 3–6 of the local bus address are used to select one of the 16 words/queues.

The parameter RAM must be configured by software after power on reset. The base/size is used by the software to segment the FRB into separate blocks for each receive and transmit queue. A write to the base pointer results in a read and write pointer for that queue also loaded with a base pointer value.

The queue manager responds to requests or events occurring at any one/all of the functional islands within the controller. These requests are:

(a) A word to be read from the P-MAC receive FIFO. This word is to be transferred to either the chip interface or written to the FRB.

(b) A word to be read from the I-MAC receive FIFO and transferred to either the chip interface or written to the FRB.

(c) A word to be loaded into the P-MAC request FIFO for a packet frame is counted being transmitted. The queue manager knows which queue is the source of the frame, and retrieves the word from either the chip interface or the FRB. The P-MAC request FIFO generates this request as long as the FIFO is not full and terminates it on a end of file occurrence or the release of a token.

(d) A word to be loaded into the I-MAC request FIFO. There is one request for each of the 8 transmit queues and as with the P-MAC, a word is requested for each active queue as, long as the queue is not full.

(e) A word to be read from the interface. This word is either loaded to the P-MAC/I-MAC request interfaces or written to the FRB.

(f) A local bus request to read/write one of the internal registers or to read/write the FRB.

Any one of the above requests can occur individually or in any combination simultaneously. The queue manager prioritizes these requests beginning with the highest:

1. P-MAC Transmit
2. I-MAC Transmit
3. I-MAC Receive
4. P-MAC Receive
5. SIU Transmit
6. SIU Receive
7. Local Bus The queue manager retains the status of all queues. For each transmit queue the following status is maintained:

Queue Empty
Queue Full
Almost Full (64 or less words in a queue)
Threshold Crossed For each receive queue, the following status is maintained:

Queue Empty
Queue Full
Threshold Crossed

The status of each queue is updated at each service to the FRB. The queues in the FRB operate as a circular FIFO under control of the queue manager. The queue manager does not perform a write to a queue that is full or a read from a queue that is empty. Each request requires an access to the FRB and results in all four parameters (base/size, threshold, read and write pointers) read from the parameter RAM for that queue.

5.4.6. Queue Management/Programming

Referring to FIG. 5, the queues 214 and 216 in the FDDI RAM buffer are managed by the controller 122. The controller has internal buffering at each interface 127, 132, etc., for each queue, and also has the intelligence to make "across the chip" connections between the buffers at each interface provided the target internal buffer has space and no data has been written to FRB for that queue. The internal buffering provided in the controller consists of:

Sixteen words at interface 127, 2 words/queue.

Eight words at the interface 117 receive FIFO.

Four word FIFO for synchronous traffic and another four word FIFO for asynchronous traffic at the interface 124.

Twenty-eight words total with 4 words/queue at the interface 124.

Thirteen words total, one word/per queue at the first level buffering and an eight word second level of buffering consisting of built words from the first level.

The queues that software desires use of are configured using the registers in the Parameter RAM. Five parameters are programmable for each queue (base pointer, queue size, threshold, read and write pointers). Once configured, a queue will transmit and receive data after it has been enabled by setting the appropriate bit in the queue enable/disable register.

The usage of the queues is summarized in FIGS. 5(A) and 5(B).

In FIG. 5(A), Table 1 describes the usage of receive queues 214. Receive queues 0-2 receive packet data. Receive queues 3-7 receive isochronous ring data.

In FIG. 5(B), Table 2 describes the usage of transmit queues 216. All transmit queues with the exception of queue zero have fixed usage.

Queue zero is used to transmit either isochronous or synchronous packet frame data. The queue manager 212 (see FIG. 2) has two transmit frame counters, one for queue zero and another for queue 1. These counters count the number of packet frames buffered in each queue waiting transmission to the ring. Each time a packet is placed into a queue the appropriate counter is incremented. As long as either frame counter contains at least one packet, the queue manager instructs the P-MAC request to capture the token. As a packet is transmitted, the appropriate counter is decremented. Each counter counts to a maximum of 253 and then rolls over.

5.4.7. Thresholding

A threshold parameter for a queue defines the amount of data buffered in a queue before an action is taken. The resulting action that the controller takes from a queue reaching or going above the threshold is different between receive and transmit queues and is also different between packet and isochronous queues.

For isochronous transmit queues, "At/Above Threshold" only have meaning before a queue begins transmission. Threshold defines the amount of data that should be buffered before beginning to transmit to the ring. Once threshold is reached, transmission begins on the next master cycle. Thereafter, threshold has no effect on the queue's operation until the queue goes empty.

Threshold for receive queues (isochronous or packet) specifies the amount of data buffered in a queue before the bit associated with a particular queue in the SIU status register is set, which indicates that the queue is "ready". The SIU polls the status register periodically, and will begin to read data from those queue's whose bits are set. The bit is reset only after the last word is transferred from the queue. For packet receive queues, the bit in the control interface status register is also set when an end of frame is received. Thus, packets smaller than the threshold parameter won't get "stuck" or stay longer in a queue than they otherwise would. For isochronous queues, the bit in the SIU status register is also set when a flow control byte is received. The bits in the controller interface status register associated with the transmit queues are not affected by threshold and are always "ready" except when a queue becomes almost full.

The threshold parameter for packet transmit queues specifies the amount of data buffered in a transmit queue (0 or 1) before the controller requests that the MAC capture a token. The controller will also request the capture of a token when the end of frame has been received from the MAC. So, if a packet frame is ready for transmission that is smaller than a threshold parameter, a token capture request is issued to the MAC.

Software is free to choose any value or threshold except for transmit queues. In general, the threshold value can be selected any where between: 0<=Threshold<=Queue Size. For packet queues, a threshold value can be selected. In this instance, software would be used in the reception of a complete frame for thresholding; software must be sure that the packet frame receive will always be smaller than the queue size, otherwise an overrun will occur. The threshold values selected for packet frames should never be used for isochronous queues, since an overrun will occur. If software selects a threshold value very close to or equal the queue size, than an overrun is very likely to occur as well. For all transmit queues, the controller maintains a "almost full" status; a queue is "almost full" when there is less than 65 words of room in the queue. The controller acknowledges "almost full" signals when the system interface unit transmits to a queue that is almost full. It is possible for a transmit queue to reach the "almost full" condition before reaching threshold, this could potentially leave the queue stuck in this condition. For this reason, the threshold value should be selected using the following relationship: Threshold 0<=Threshold<=(Queue Size-64).

The minimum threshold value must be carefully selected by software. A zero threshold is referred to as an "immediate" threshold. When software loads a threshold parameter for a particular queue to zeros, the threshold bit for that particular queue is set in the queue threshold register (not shown). For receive queues, the associated bit in the system interface unit queue status register is not set until the first word is received. The controller has internal buffers, which are filled before words are written to the FRB. Thus, with a threshold of zero, the first word placed into a target internal buffer sets the system interface queue status bit. A threshold of zero does not imply that there isn't a need for a queue in the FRB. Whenever a queue is enabled, a queue in the FRB must be configured, with a minimum size of 256 words, even though it might not be used. A threshold value of zero must never be used for any packet transmit queue, an under run will occur. The purpose of the threshold is to buffer up enough data before transmitting to the ring 112 so as to prevent under runs. For packet transmit queues, a recommendation for minimum threshold size is 4, which is actually 8 words buffered. In some applications, zero can be used as a threshold for isochronous transmit queues. If the threshold is greater than or equal to 1, then the amount buffered in the internal buffer is not factored into whether threshold is reached. This means that the actual amount buffered is for the amount programmed in the threshold parameter for the amount of internal buffering, which is different for receive and transmit. For receive queues, the amount is always 2 more. A program threshold value of 2 for receive queue means 4 words are buffered to reach threshold. For transmit queues, the amount is 4 more meaning a threshold of 2 would require 6 words buffered to reach threshold. Due to implementation, when an immediate threshold is selected for an isochronous transmit queue, 2 words not 1 are buffered to reach threshold.

5.5. FDDI RAM Buffer (FRB) and Interface

FIG. 15 shows the FDDI RAM buffer 130 and interface 210. The buffer 130 is a 64K by 48 memory implemented with three 64K and 16 static RAM's. The buffer provides temporary storage for the 8-receive and 8-transmit queues (see FIG. 5A) when buffering is needed. The signal IO bus 210 between the controller and the FRB consists of 40 bit data lines (32 data, 4 parity, and 4 tags), a chip select (CFCS), a Read/Write (NCFWE) line, an Output Enable (NCFOE) line, and 16 address lines, for a total of 59 signals.

Figure 15A:
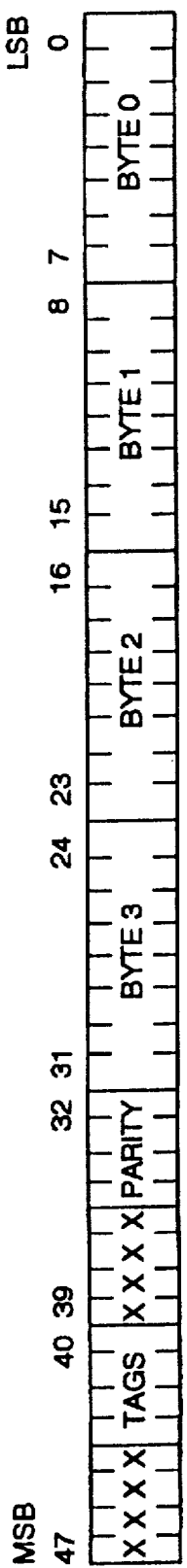
FIG. 15(A) is a represention of data bit organization in the buffer of FIG. 15.

FIG. 15(A) shows the organization of the data to/from the FRB. The 40 data bits are divided into 4 data bytes, 4 parity bits, and 4 tag bits. Only 40 of the 48 bits provided by the static RAM'S are used. Odd parity for each byte is normally used. However, software can switch to even parity if needed or for diagnostic purposes. The tag bits indicate the number of valid bytes at the given address as well as the last byte of a frame.

5.5.1. FDDI RAM Buffer (FRB) Registers

Access to the FRB is provided by four (4) FRB Access Registers. These registers are: FRB Address register; FRB Upper Word Register; FRB Lower Word Register; and FRB Tag/Parity Register.

Figure 15B:
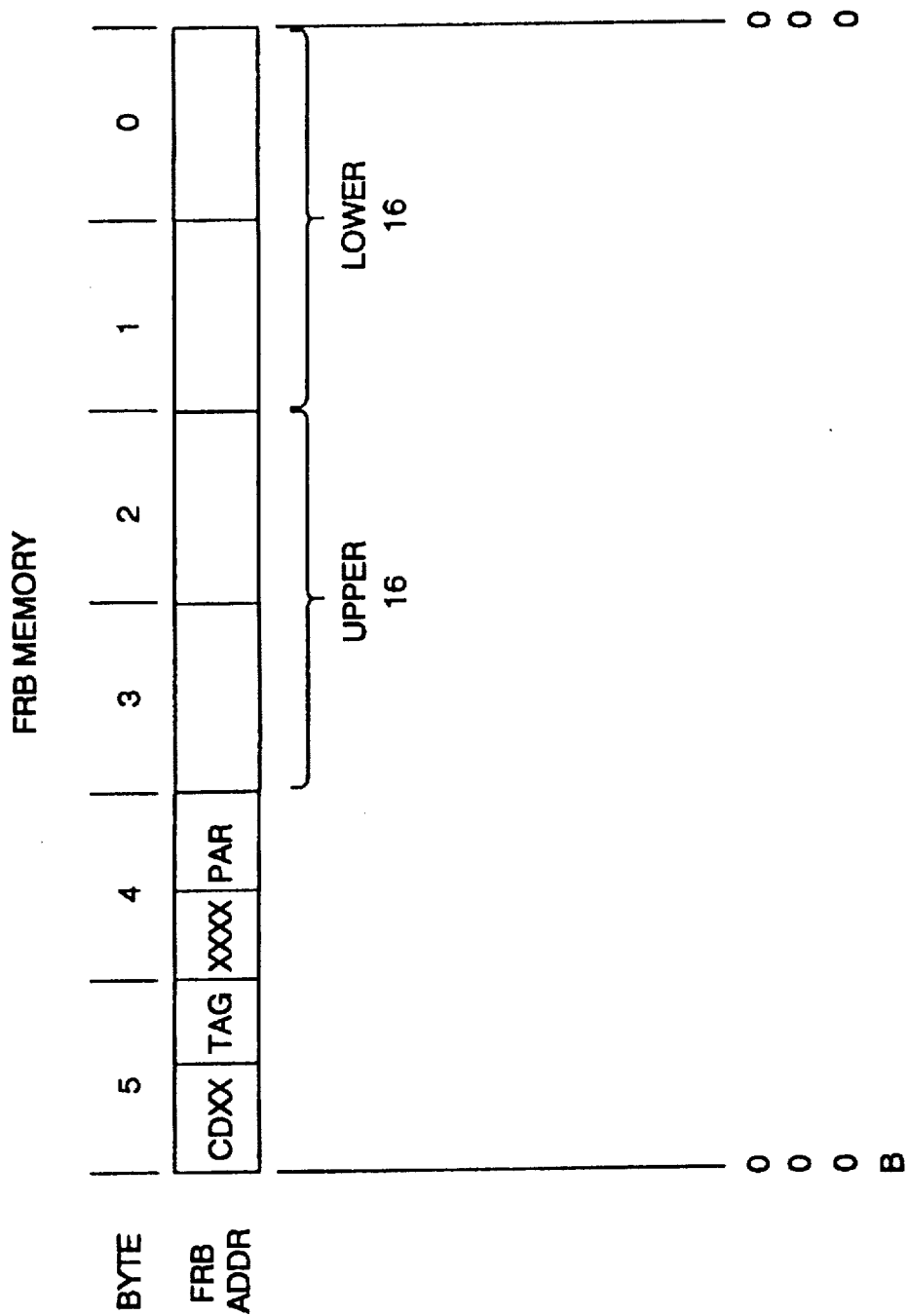
FIG. 15(B) is a representation of a FRB access register of FIG. 15.

In FIG. 15(B) FRB registers provide data and address registers to access the FRB. The FRB may be accessed any time by the local bus, to store beacon and void frames.

The FRB address register is a 16-bit register that specifies the memory location in the 64K word address space of the FRB. After each FRB access, the controller hardware auto increments this register to point to the next location in the FRB.

An FRB lower word register holds a lower 16-bit word of a 40-bit word in the FRB. An FRB upper word register holds the upper 16-bit word of the 40-bit word in the FRB. An FRB parity/tag register holds the 4-bit tag in the 4-bit parity of the 32-bit data word in the FRB and also contains a 2-bit command interface used to initiate reads/writes to the FRB as well signal completion of the operation. The 4 bit tag is in the low 4-bits of the upper byte and the 4-bit parity is in the low bits of the lower bytes.

5.5.2. FRB Interface

Figure 15C:
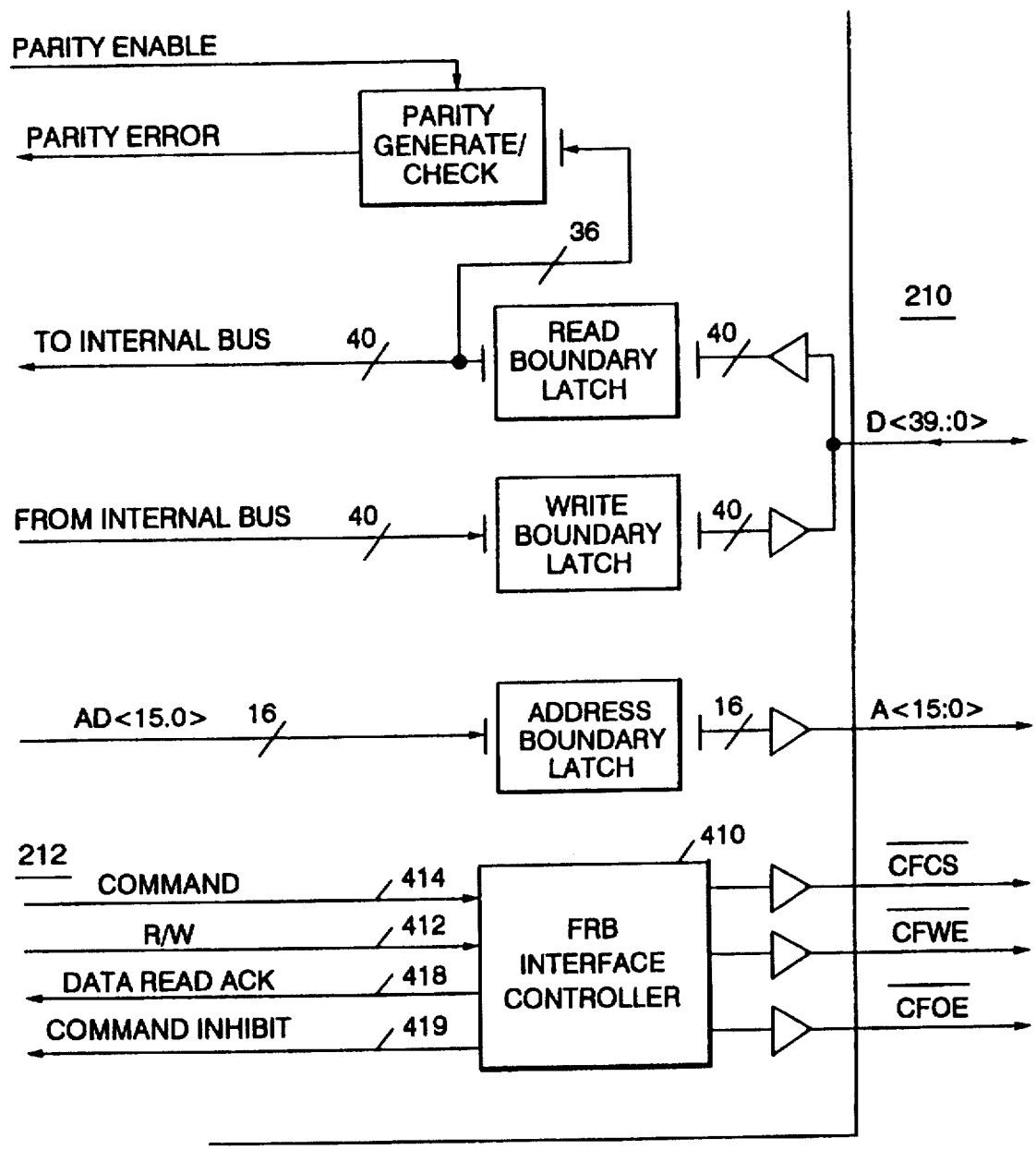
FIG. 15(C) is a block diagram of the FDDI RAM memory interface in FIG. 15.
Figure 15D:
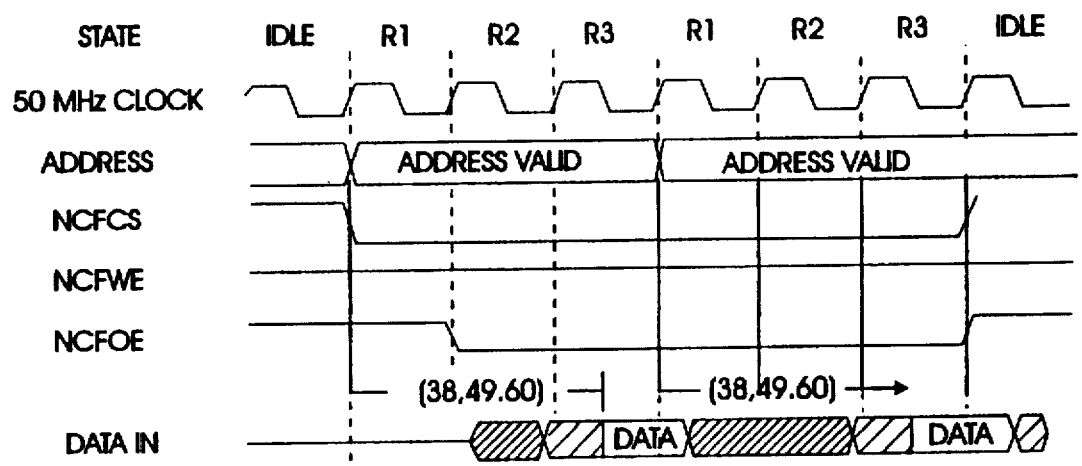

The FDDI RAM buffer interface 210 in the controller is shown in FIG. 15(C). The controller controls accesses to the FDDI RAM buffer 130. The interface accepts control information such as address, read/write, etc., from the queue manager 212 to access the queues in the FDDI RAM buffer. Besides driving the write enable and output enable signals for the FDDI RAM buffer static RAM's, the interface also drives the static RAM chip select to take advantage of the low power consumption of the static RAM devices while in stand-by mode. Finally, parity generation and checking is performed during both read and write operations.

FIG. 15(C) shows both the internal and external signals of the FRB memory interface. Internal signals are used for controls and the external signals are used for access to the FRB. An FRB interface controller 410 is controlled by the queue manager 212. The queue manager initiates a request by activating a R/W line 412, address and write data, and asserts a command signal 414 to the controller 410. The interface controller asserts the command inhibit flag 416 to signal the queue manager that the interface is busy and should not send a new command. The data read acknowledgement line 418 indicates that the read operation is completed and the data are valid on the following clock cycle.

FIGS. 15(D), 15(E), 15(F) and 15(G) give timing diagrams of the interface.

5.5.3. FRB Read/Write Operation

The read/write operations are initiated upon request from the queue manager. The interface controller recognizes the type of request through the command line and the read/write (R/W) line are encoded as follows:

| Command | R/W | Meaning |
|---------|-----|---------|
| 0 | — | No Request |
| 1 | 0 | Write Operation |
| 1 | 1 | Read Operation |

The R/W line is valid only if the command line is asserted. The interface controller stays in the idle state as long as no request is introduced. While in idle state, the NCFCS line is driven high to reduce static RAM device power consumption.

Figure 15E:
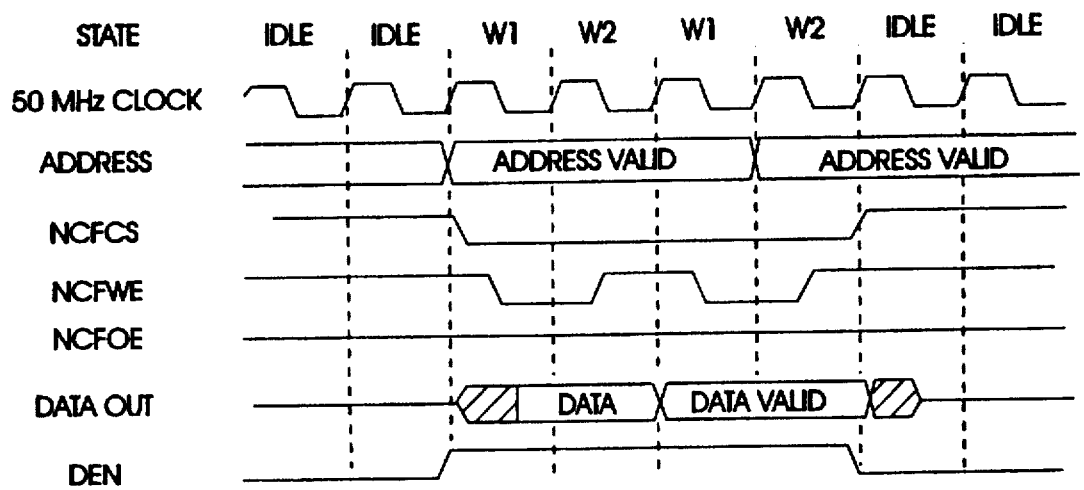
Figure 15F:
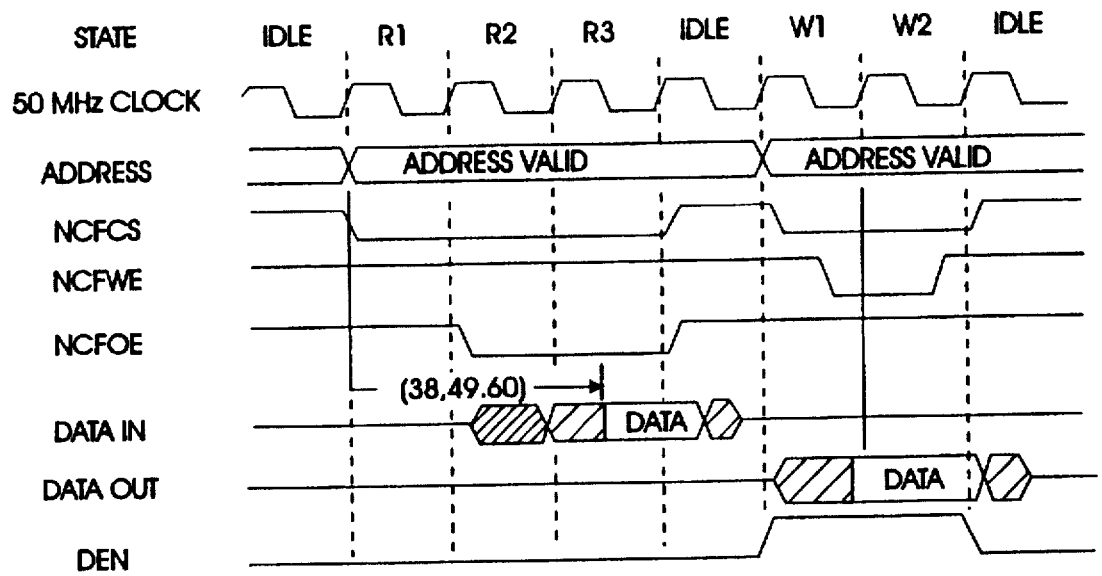
Figure 15G:
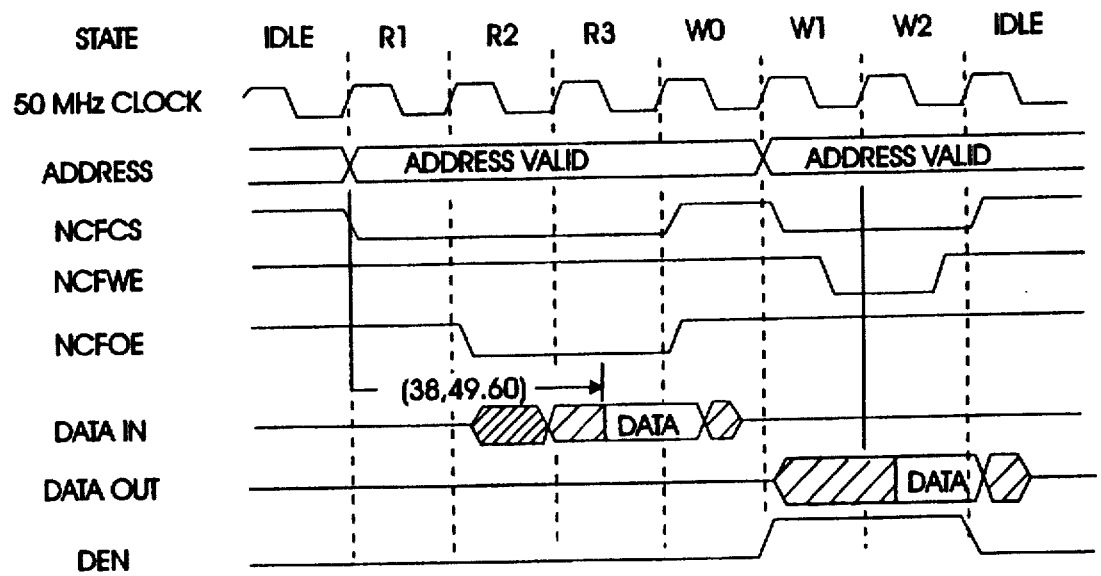

As shown in the timing diagrams, a Read Operation takes three clock cycles, i.e., 60 ns. A Write Request takes two clock cycles, i.e., 40 ns. However, if a Write request directly follows a Read Operation, a 20 ns. extra clock cycle is required at the beginning of the Write Cycle to allow the drivers to switch, as shown in FIG. 15(E).

During a Read Operation, the CFWE signal is kept high. The address is valid starting on state R1. During R1, the static RAM drivers are disabled to allow the interface driver to go to a high impedance state if the previous operation was a write. This signal NCFOE goes low on R2 to enable the memory buffers. The data is then valid on R3 and is latched at the end of this state. For a 35 ns. access time static RAM, the total access time of the data is a maximum 49.6 ns. NCFOE is brought high on an idle state for entering write operations.

For write access to the memory, the NCFOE signal is in a logical high level to keep the memory output buffers in a high impedance state. The address and data are valid on W1. The NCFWE then falls in the middle of W1 to go high during W2. The data is latched on the static RAM on a low to high transmission of NCFWE. Write operations can be pipelined at 40 ns. per cycle.

5.6. Local Bus Interface

The local bus 132 provides access to the controller 122 address space. FIG. 16 shows the significant devices in the local bus. The controller 122 is a slave on the local bus with either the local processor 134 or the system interface 128 as the bus master. The controller address space is memory mapped, including FDDI RAM buffer (see FIG. 15) which includes 4 FRB access registers described in connection with FIG. 15(B).

In FIG. 16, the interface consists of an address and data bus 802 which the address latch 806 is active, the register holds 16-bits of address used to select any of the controller's addressable space register. When the data enable 812 is active, the controller will place data on the bus for local bus reads and will accept data from the bus for local bus writes. A data parity bit 804 indicates odd byte parity on the 16-bit data bus drawing local bus read. An address latch enable 806 is an active high signal that is used to latch the address from the address data bus. An address status 808 is an active low signal that indicates an address state and is asserted during an address cycle (Ta). A write/read signal 810 indicates whether an operation is a write or a read. It is high for write and low for read. A chip select signal 814 indicates that the controller has been selected by the local processor via the local bus controller 134 address decode logic, and is active low. This signals is asserted during the address state and remains active throughout the data state. A controller interrupt signal 814 is the interrupt line to the local processor from the controller. It is asserted when an interrupting condition occurs and that condition is not masked, and is active high. A ready signal 816 is an acknowledgement to the local processor 134 terminating the current bus cycle. On writes the signal 816 is asserted when the controller has latched data from the address data signal bus. On reads, the raised signal is asserted when data is driven on the address data signal bus and is asserted into a chip select signal 814 for data enable 812 go active. If this signal is not asserted following an address state (Ta) or after a data state (Td) the processor will insert a wait state (Tw).

The local bus interface provides access to the FRB via the four FRB registers. The registers are: FRB Address Register; FRB Upper Word Register; FRB Lower Word Register; and FRB Parity/Tag Register.

The master on the local bus accesses the FRB memory by writing data into the FRB access registers and issuing a command into the FRB parity/tag register (see FIG. 8(A)). FRB access register must be written to before a FRB command is issued in the FRB parity/tag register. Once set with a command, the local bus interface initiates an FRB operation based on the direction of data transfer (write/read). If the operation is a write, the FRB interface will gather the address and data information from the FRB access register and perform a write to memory. If the operation is a read, the FRB interface will gather the information from the FRB access register, perform a read from the FRB memory, and write to the 3 FRB data registers with the data read from memory. When the operation is completed, the local bus interface clears bit 15 of the FRB parity/tag register indicating the operation is complete and the local bus interface is ready for the next operation.

The local data bus is coupled to the queue parameter RAM 218 (see FIG. 4). The queue parameter RAM contains the pointer parameters used to manage the 8 receive and 8 transmit queues. These entries are both readable and writeable via the local bus. For each of the 8 receive and 8 transmit queues, the queue parameter RAM stores four parameters, each parameter is 2-byte wide and they are: Base pointer/size parameter; threshold value pointer; read pointer; and write pointer.

The local processor 134 by way of the local bus 132 initializes the I-MAC steering map 704 (see FIG. 7). The I-MAC steering map indicates to the I-MAC transmitter or receiver which queue to write or read isochronous byte. The map consists of 1560 bytes. That is, it is a one-to-one map of each data byte of the FDDI-2 master cycle. Each byte entry of the map stores queue number of a the transmit queue and queue number of the receive queue for the channel data.

The steering map is mapped by 16 bit registers in the controller's address space, and is accessible by the local bus directly. Those 2-byte entries are stored side-by-side in the address space. When the mask on the local bus accesses the steering map, the local bus interface will map the bus address to a location in the steering map address space. When transmitting or receiving data, the controller will retrieve or store each data byte to the queue specified by the steering map. Data can be retrieved from any one of 8 transmit queues and stored to any one of 8 receive queues.

The controller registers that are directly accessible from the local bus include control registers, event registers, queue and parameter RAM registers, I-MAC steering map registers, and FRB access registers. To access any of these registers, the local bus master selects the desired address and the local bus interface decodes and selects or maps to the corresponding register. A local bus operation to the controller is always a 16-bit transfer.

The control registers described in connection with FIGS. 6–9 include a mode register; a queue enable/disable registers; a P-MAC copy criteria register; an I-MAC flow control register; a parity control register; and a synchronous bandwidth allocation register.

The mode register establishes the major operating parameters and modes of operation for the controller. The mode mix places the controller in one of four modes: Stop, Beacon, Void and Normal. After power on, the controller is placed in stop mode, this mode disables all queues and in this mode software configures the controller registers as desired before commencing operation. The controller is placed in the stop mode when specific errors are recognized in the course of operation.

5.6.1. Local Bus Interface Operation

FIG. 17 shows the timing for a single word read and write operations on the controller local bus interface. The local bus interface is an asynchronous interface since it does not run off the 40 mhz clock from the bus master, instead it uses the 50 mhz clock.

5.7. Controller/System Interface Operation

Referring to FIG. 18, the interface 127 provides a synchronous high speed data transfer path between a controller 122 and the SIU 128. Through this interface, the system interface 128 accesses the queue status register 110 the controller 122 to identify which of the 8 receive and 8 transmit queues are ready to be serviced.

The SIU 127 is the master of this interface. After reading the queue status registers and prioritizing the queue service requests, the SIU initiates data transfers from a receive queue or to a transmit queue by setting a request on a system request line 902 along with a queue number on a receive/transmit queue number line 904. The controller responds with acknowledgement on an acknowledge line 906 when it is ready to complete the data transfer. Completing the interface lines are a bi-directional data bus line 908, a bi-directional data bus parity line 910, and a bi-directional tag line 912.

A bus cycle is initiated by the system interface 128 issuing a request and is terminated by the transfer of a data word between the controller and the SIU or by a controller error acknowledgement. FIG. 18(A) shows an example of transmit and receive timings. The four bus states are described below:

| State | Description |
|---|---|
| S0 | State Zero is the request state. When a transmit, receive or queue status read request from chip becomes active the controller advances to a state S1. If no request is given, the bus state remains as S0. |
| S1 | State 1 is the arbitration state. The controller interface control logic determines if it is ready to service requests that the chip has asserted. Then the next cycle of the controller advances to state S2. |
| S2 | State 2 is the acknowledgement state. State 2 is the only bus state that may be repeated. The acknowledgement state is terminated by the controller driving the acknowledgement line 906 back to a value other than "11" (idle); on the next cycle the controller advances to State S3. For any request, the data/parity/tag lines will be valid during the final S2 cycle and through state S3. |
| S3 | State 3 is the data state. The data is read by the controller for a transmit request; the data is |

| State | Description |
|---|---|
| | read by the system interface for receive or a QSR request. On the next cycle, the bus returns to state 0. |

If a system interface queue status read operation is requested, the interface controller places a 32-bit status register on the interface data bus, along with parity. The status register contains a bit for each receive and transmit queue to indicate the availability of the queue for a data transfer bus cycle as shown in FIG. 18(B). The register bits are used as follows:

Reserved: Reserved will read as zero

Transmit Queues

The transmit queue bits indicate when the corresponding queue is ready for data transfer. Bit 16 represents transmit queue 0 while bit 23 represents transmit queue 7. A 0 indicates queue not ready. A 1 indicates queue ready. The queue ready bit of a transmit queue is set when the queue has room for at least 65 more words and the queue is enabled.

Receive Queues

The receive queue bits indicate that the corresponding queue is ready for data transfer. Bit 0 represents received queue 0 while bit 7 represents received queue 7. A zero bit indicates queue not ready. A 1-bit indicates queue ready.

The queue ready bit of a receive queue is set when the amount of data in the FRB for that queue passes a threshold value or when there is an end of file inside the queue. If the threshold value is zero, the queue ready bit will be set if there is any data for that queue in the FRB or the system interface interface receive buffer, or if there is an end of file inside the queue. The queue ready bit is cleared on the transfer involving the last word in the receive queue acknowledgement. This bit will only be asserted if the queue is enabled.

5.7.1. System Interface Unit (SIU) Logic

The organization of the system interface unit logic is shown in FIG. 18(C). The system interface logic provides two words of buffering for each receive queue in a receive buffer 914. The queue manager will try to keep the buffers always full and loaded with the front end of each queue. For a transmit side, a single word of buffering is provided in a transmit register 916. The queue manager will keep this latch empty and ready for data a transfer. The system interface logic indicates to the queue manager that a transmit data word is available, the queue manager will read the transmit word out of the transmit register 916 and assert and acknowledge to clear the register inform the chip interface logic that another transmit operation can be processed.

The system interface logic will issue requests to the queue manager for new receive data on a line 918 when receive data is transferred out of the receive buffer 914 to the chip. These requests will be stored in the receive request FIFO 920. The queue manager will service the request one at a time and clear each request out of the FIFO. The queue manager will write data to the receive buffer 914 in response to the interface request; the queue manager may also write data to the receive buffer without a interface request pending.

The interface object will report errors to a local bus logic on a line 922. These errors include parity errors, reads of empty queues, writes to full queues, write/writes of disabled queues, and overflows of the receive request FIFO. The local bus supplies the interface logic with information on the mode the controller is operating in (normal/stop/reset), the mode of each receive queue (normal/immediate), parity select (odd/even), and parity enable/disable.

5.8. System Interface Overview

In FIG. 19, the system interface unit 128 comprises a shared memory buffer 310, a DMA engine 312, a slave transmit port 314, a transmit engine 316, and a receive engine 318. The system interface is connected to the local bus interface 133 which is further connected to the local bus 132. The system interface is further connected to the controller interface and to a micro channel interface 320 which is connected to the micro channel 14. Interface registers 322 handle the transfer of control information between the system bus and the local bus.

5.8.1 DMA Engine

The DMA engine 312 is a wired standard gate array that controls the delivery of data between the system 114 and the local bus 132 through an internal 64-byte FIFO register 322. The DMA engine issues bus master requests to the micro channel interface 320 for data delivery. It also issues bus master requests to the local bus interface 133 for data delivery and descriptor fetches. The local processor 134 (see FIG. 1) interfaces with the DMA engine through a chain of link descriptor lists. The system interface 128 (see FIG. 1) contains a DMA engine descriptor pointer that locates the descriptor list in local bus memory 135. The system interface also contains a write bit 1-byte status register through which status is returned.

5.8.2. DMA Descriptors

The DMA engine descriptor pointer in the system interface 128, shown in FIG. 19(A) locates the chain of linked descriptors in local bus memory. When accessing a descriptor, the system interface will use local bus base address register to form a 20-bit address. Sixteen least significant bits of the address are the Engine Enable Bit (EEN). When enabled the DMA engine considers the descriptor valid and will fetch the first one into internal storage. After processing each descriptor, the DMA engine will load the link pointer into the address and fetch the next descriptor in the chain until a link pointer of zero is encountered. After processing a descriptor in which the link pointer is zero, the DMA engine will set an end of descriptor chain bit and disable the EEN bit. Thus, the address points to the last descriptor processed in a chain if an error condition occurs while processing a descriptor, the DMA engine will log the error in a status register and disable the EEN bit. The local processor can abort the engine by disabling the EEN bit. After the DMA engine terminates all activity, it will set the engine aborted bit.

The DMA engine descriptor is a 14-byte control block that is initialized by the local processor and local memory. This control block indicates to the DMA engine the source and destination for the transfer of data between the micro channel and local bus. In general, the DMA engine will transfer data until the byte count field of the descriptor is exhausted. It will then move to the next descriptor in the chain and continue.

The DMA engine descriptor contains a control word byte count micro channel address, local bus address and pointer link as shown in FIG. 19(A). The function of each bit in the descriptor is as follows:

ARB Arbitration Level Select.

This bit determines which arbitration level is used for accesses to the micro channel.

0 Primary arbitration level.

1 Secondary arbitration level.

MIO Memory/IO Select.

This bit determines if the address in the descriptor represents a micro channel memory or IO address.

0 IO address.

1 Memory address.

IAP Interrupt After Processing.

This bit indicates that system interface is to set the DPR bit of the DMASTAT Register after processing this descriptor.

0 No interrupt after processing.

1 Interrupt after processing.

DIR Transfer Direction.

This bit indicates the direction of the data transfer, micro channel to local bus or local bus to micro channel.

0 Micro channel to local bus.

1 Local bus to micro channel.

NAI No Address Increment.

This bit controls incrementing of the micro channel address.

0 Increment micro channel address.

1 Do not increment micro channel address.

BYTE COUNT Byte Count.

This field represents the number of bytes to be transferred.

MC LOW ADDRESS Micro Channel Low Address.

This field represents the least significant 16 bits of the micro channel address.

MC HIGH ADDRESS Micro Channel High Address.

This field represents the most significant 16 bits of the micro channel address.

LB LOW ADDRESS Micro Channel Low Address.

This field represents the least significant 16 bits of the local address bus.

LB HIGH ADDRESS Local Bus High Address.

This field represents the most significant 4 bits of the local bus address.

LINK POINTER Link Pointer.

This field represents the least significant 16 bits of the local bus address for the next descriptor in the chain. A link pointer of zero indicates the end of the chain.

The system interface contains a 1-byte status register (DMASTAT) for reporting DMA engine status. When a bit is set in the status register (DMASTAT), an interrupt is generated to the local bus provided it is unmasked. The DMA engine will set bits in a DMASTAT to indicate error conditions, engine aborted, descriptor processed, or end of descriptor chain.

5.8.3. DMA Engine Operation

DMA engine operation is as follows:

Fetch DMA Engine Descriptor. When the local processor enables the DMA engine via the EEN bit of the DMA engine descriptor point (DMADP), the DMA engine will issue a request to the local bus interface to fetch the first descriptor into internal storage.

Issue Service Requests. Once a descriptor has been fetched, the DMA engine will issue bus master requests to the micro channel interface and local bus interface identifying them as source and destination as determined from the descriptor. The source interface will then begin to load the FIFO register 322. The destination interface will unload the register 322 when it becomes half full.

FIFO Becomes Full. When the FIFO register 322 becomes full the source interface will stop loading data into it. The source interface will begin loading data again when the FIFO reaches half full.

Descriptor Byte Count Exhausted. When the source interface indicates to the DMA engine that the descriptor byte count has been exhausted, the DMA engine will request that the destination interface empty the FIFO register 322. Once the FIFO has been emptied, the DMA engine will set a DPR bit in the DMASTAT if the IAP bit in the descriptor is set. Provided that the link pointer field of the descriptor is not zero, the DMA engine will load the link pointer into the DMADP and fetch the next descriptor. Once a new descriptor has been fetched, the DMA engine will issue bus master requests to the micro channel and local bus interface.

Link Pointer Is Zero. After processing the data for a descriptor with a link pointer of zero, the DMA engine will disable the EEN bit of the DMADP and set the EDC bit in the DMASTAT.

Local Processor Issues Abort Command. The local processor can abort activity for the engine by disabling the EEN bit. The DMA engine will terminate all activity and set the queue aborted bit in the DMASTAT.

Error Condition Encountered. If an error condition is encountered while transferring data, the DMA engine will terminate all activity and disable the EEN bit in the DMADP. The DMA engine will then indicate the error condition in the DMASTAT. The receive engine 318 controls the delivery of data from one of the 8-receive queues (see FIG. 2A) managed by the controller to either the micro channel or local bus. The data is buffered internally through one of three 128-byte FIFO's. The receive engine issues bus master requests to the micro channel interface for data delivery. It also issues bus master requests to the local bus interface for data delivery and descriptor fetches. The receive engine monitors the controller queue status obtained by the controller interface and returns queue service requests.

The local processor interfaces with the receive engine through eight chains of linked descriptor lists, one per receive queue. The system interface contains 8-receive descriptor pointers (RDP's) that locate the descriptor lists in local bus memory. The system interface also contains eight 1-byte status registers (RQSTAT's) through which status is returned to each queue.

5.8.4 Receive Engine

The receive engine 318 is a wired standard gate array that controls the delivery of data from one of the 8 receive queues 214 (see FIG. 5) managed by the controller to either the system or local bus 132. Data is buffered internally through one of three 128 byte FIFO's (not shown). The receive engine issues bus master requests to the SIU for data delivery. It also issues bus master requests to the local bus interface for data delivery and descriptor fetches. The receive engine monitors the controller queue status obtained by the controller interface and returns queue service requests. The local processor interfaces with the receive engine through 8 chains of link descriptor lists, one per receive queue. The SIU contains 8 Receive Descriptor Pointers (RDP's) that locate the descriptor lists in local bus memory 137. SIU also contains 8 one-byte status registers (RQSTATS') through which status is returned for each queue.

5.8.5. Receive Descriptors

The system interface contains 8-receive descriptor pointers (RDP's), shown in FIG. 19(B), one for each of the 8-receive queues that locate the chain of linked descriptors in local bus memory. When accessing a descriptor, the system interface will use the appropriate RDP and the local bus address register (LBASE) to form a 20-bit address.

The least significant bit of an RDP is the Queue Enable Bit (QEN). When enabled, the receive engine considers the descriptors for that queue valid and will fetch the first one into internal storage. After processing each descriptor, the receive engine will load the link pointer field into the RDP and fetch the next descriptor in the chain until a link pointer of zero is encountered. After processing a descriptor with the link pointer of zero, the receive engine will set the end of descriptor chain bit of the appropriate status register (RQSTAT) and disable the QEN bit of the corresponding RDP. Thus the RDP points to the last descriptor processed in the chain. If an error condition occurs while processing a descriptor, the receive engine will log the error in the appropriate RQSTAT and disable the QEN bit of the corresponding RDP.

The local processor can abort activity for a queue by disabling the QEN bit of the appropriate RDP. After the receive engine terminates all activity, it will set the queue aborted bit of the corresponding RQSTAT.

The received descriptor, as shown in FIG. 19(B), is a 10-byte control block that is initialized by the local processor and local bus memory. This control block indicates to the receive engine the destination for received data. In general, the receive engine will transfer data to the destination till either the byte count field of the descriptor is exhausted, or the end of the frame has been reached. When the byte count has been exhausted, the receive engine moves to the next descriptor in the chain and continues. When the end of frame is reached, the receive engine first updates the control word and byte count field of the descriptor and then moves to the next one in the chain. Updating the control word and byte count field can be disabled by the descriptor enable (DUE) bit of the control word.

A receive descriptor contains a control word, byte count, address low, address high, and link pointer where the bits have the following function:

ARB Arbitration Level Select.

This bit determines which arbitration level is used for accesses to the micro channel.

0 Primary arbitration level.

1 Secondary arbitration level.

MIO Memory/IO Select.

This bit determines if the address in the descriptor represents a micro channel memory or IO address.

0 IO address.

1 Memory address.

H/L Host/Local Address.

This bit determines if the address in the descriptor represents a micro channel address or a local bus address.

0 Host address.

1 Local address.

IAP Interrupt After Processing.

This bit indicates that system interface is to set the RDP bit of the appropriate RQSTAT register after processing the descriptor.

0 No interrupt after processing.

1 Interrupt after processing.

IEF Interrupt If End of Frame.

This bit indicates that system interface is to set the EOF bit of the appropriate RQSTAT register after processing this descriptor provided the end of the frame has been reached.

0 No interrupt if End of Frame.

1 Interrupt if End of Frame.

DUE Descriptor Update Enable.

This bit enables system interface to update the control word and byte count field of the descriptor upon reaching End of Frame.

0 No updating of descriptor on EOF.

1 Update descriptor on EOF.

NAI No Address Increment.

This bit controls incrementing of the micro channel address.

0 Increment micro channel address.

1 Do not increment micro channel address.

EOF End of Frame.

System interface will update this field of the descriptor to indicate the End of the Frame has been reached.

0 No end of frame.

1 End of frame.

STATUS Frame Status.

System interface will pass the frame status byte, appended by combine to the end of the frame, into this field of the descriptor. The status byte contains information about the E, A, and C bits alsong with a frame abort indication.

BYTE COUNT Byte Count.

This field represents the number of bytes available for data at the indicated address. System interface will update this field when an end of frame has been reached to indicate the actual bytes transferred.

LOW ADDRESS Low Address.

This field represents the least significant 16 bits of a micro channel or local bus address.

HIGH ADDRESS High Address.

This field represents the most significant 16 bits of a micro channel address or the most significant 4 bits of a local bus address.

LINK POINTER Link Pointer.

This field represents the least significant 16 bits of the local bus address for the next descriptor in the chain. A link pointer of zero indicates the end of the chain.

5.8.6. Receive Operation

The receive engine operation is as follows:

Fetch Receive Descriptor. When the local processor 134 enables a receive queue via a QEN bit of a RDP, the receive engine will issue a request to the local bus interface to fetch the first descriptor into internal storage. If multiple queues are enabled, then the requests are prioritized with RQ0 having a the highest priority and RQ7 the lowest.

Controller Signals Queue Ready. The controller interface periodically polls the controller's internal status register and passes the status to the receive engine. When the status indicates that a queue is ready for service and a valid descriptor has been fetched for the queue, then the receive engine will assign the queue to one of the three internal FIFO's. If multiple queues become ready for assignment at the same time, then the FIFO assignment is done on a priority basis with RQ0 having the highest priority and RQ7 the lowest. If all three FIFO's are busy servicing queues, then the assignment is made when the next FIFO becomes available.

Issue Service Request. After assigning a queue to a FIFO, the receive engine will issue a service request to the controller interface for that FIFO and queue. The controller interface will then begin to fill the FIFO with data from the indicated queue. The receive engine will also issue a bus master request to either the system interface or the local bus interface as required by the descriptor. The system interface or local bus interface will begin unloading of the FIFO once it becomes half full.

FIFO Becomes Full. When the FIFO becomes full, the controller interface will stop requesting data for the queue. The controller interface will assume requests for this queue when at least 4 bytes are available in the FIFO.

Controller Signals Queue Empty. When the controller indicates that a queue has become empty, the controller interface will stop requesting data from this queue and pass the empty condition to the receive engine. The receive engine will then indicate the empty condition to the system or local bus interface such that the appropriate interface can immediately unload the FIFO regardless of the amount of data stored. Once the FIFO is unloaded, the receive engine is free to assign it to another queue.

End of Frame Reached. When the controller indicates that the end of a frame has been reached (EOF), the controller interface will stop requesting data from this queue and pass the EOF condition to the receive engine. The receive engine will then indicate the EOF condition to the system or local bus interface such that the appropriate interface can immediately unload the FIFO regardless of the amount of data stored. Once the FIFO is unloaded and the descriptor update enable (DUE) bit is set, the receive engine issues a descriptor write request to the local bus interface such that the control word and byte count field of the descriptor can be updated. The control word is updated with the EOF bit set and the status field set is indicated in the frame status byte appended by the controller to the end of the frame. The byte count field is updated when the actual bytes transferred for this descriptor. After the descriptor has been updated, the receive engine will set the EOF bit in the appropriate RQSTAT provided the interrupt if end of frame (IEF) bit was set. The receive engine will also set the RDP bit of the RQSTAT provided the interrupt after processing (IAP) bit was set. Provided that the linked pointer field of the descriptor is not zero, the receive engine will load the link pointer into the appropriate RDP and fetch the next descriptor. The FIFO is then available for assignment to another queue.

Descriptor Byte Count Exhausted. When the system or local bus interface indicates that the descriptor byte count has been exhausted, the receive engine will set the RDP bit in the appropriate RQSTAT if the IAP bit in the descriptor is set. Provided that the link pointer field of the descriptor is not zero, the receive engine will load the link pointer into the appropriate RDP and fetch the next descriptor. Once a new descriptor has been fetched, the receive engine will issue a bus master request to the system or local bus interface as indicated by the descriptor.

Link Pointer Is Zero. After processing the data for a descriptor with a link pointer of zero, the receive engine will disable the QEND bit of the appropriate queue and set the End Of Descriptor Chain (EDC) bit in the corresponding RQSTAT. It is impossible for the FIFO to remain assigned to the queue if the end of frame or queue empty boundary has not been reached. The local processor assures that descriptors are provided in a timely manner such as not to consume internal SIU resources.

Local Processor Issues Abort Command. The local processor can abort activity for a queue by disabling the QEN bit of the appropriate RDP. The receive engine will terminate all activity for that queue and set the queue aborted bit in the corresponding RQSTAT.

Error Condition Encountered. If an error condition is encountered while transferring data for a queue, the receive engine will terminate all activity for the queue and disable the QEN bit in the appropriate RDP. The receive engine will indicate the error condition in the corresponding RQSTAT.

5.8.7. Transmit Engine

The transmit engine 316 is a wired standard gate array that controls delivery of data from the system or local bus to one of four transmit queues 216 (see FIG. 5) managed by the controller. Although the controller has a total of 8 transmit queues, the transmit engine has only access to the first four. The data is buffered internally through 128 byte FIFO (not shown). The transmit engine issues bus master requests to the system interface for data delivery. It also issues bus master requests to the local bus interface for data delivery in descriptor fetches. The transmit engine monitors the controller queue status obtained by the controller interface and returns queue service requests. The local processor interfaces with the transmit engine through four chains of linked descriptor lists, one per transmit queue. The SIU contains four Transmit Descriptor Pointers (TDP's) to locate the descriptor lists in local bus memory 137. The SIU also contains four 1-byte status registers (TQSTAT's) to which status is returned for each queue.

5.8.8. Transmit Descriptors

The controller contains four transmit descriptor pointers (TDP's) one for each of the four transmit queues, that locate the chain of link descriptors in local bus memory. When accessing a descriptor, the SIU will use the appropriate TDP and the base field of the local bus address register to form a 20-bit address. The base field forms the 4 most significant bits while the TDP forms the least significant 16 bits.

The least significant bit of a TDP is the Queue Enable Bit (QEN). When enabled, the transmit engine considers the descriptors for that queue valid and will fetch the first one into internal storage. After processing each descriptor, the transmit engine will load the link pointer field into the TDP and fetch the next descriptor in the chain until a link pointer of zero is encountered. After processing a descriptor in which the link pointer is zero, the transmit engine will send the end of descriptor chain bit of the appropriate TQSTAT and disable the QEN bit of the corresponding TDP. Thus, the TDP points to the last descriptor process in the chain. If an error condition occurs while processing a descriptor, the tranmit engine will log the error in the appropriate TQSTAT and disable the QEN bit of the corresponding TDP. The local processor can abort activity for a queue by disabling the QEN bit of the appropriate TDP. After the transmit engine terminates all activity, it will set the queue aborted bit of the corresponding TQSTAT.

The transmit descriptor is shown in FIG. 19(C). The descriptor is a 10-byte control block that is initialized by the local processor. The control block indicates to the transmit engine the source for transmit data. The transmit engine will transfer data from the source until the byte count feed is exhausted. When the count is exhausted, the transmit engine moves to the next descriptor and continues. The transmit descriptor contains a control word, byte count, address low, address high and link pointer, as follows.

ARB Arbitration Level Select.

This bit determines which arbitration level is used for accesses to the micro channel.

0 Primary arbitration level.

1 Secondary arbitration level.

MIO Memory/IO Select.

This bit determines if the address in the descriptor represents amicro channel memory or IO address.

0 IO address.

1 Memory address.

H/L Host/Local Address.

This bit determines if the address in the descriptor represents a micro channel address or a local bus address.

0 Host address.

1 Local address.

IAP Interrupt After Processing.

This bit indicates that system interface is tos et the TDP bit of the appropriate TQSTAT register after processing this descriptor.

0 No interrupt after processing.

1 Interrupt after processing.

EOF End of Frame.

0 No end of frame.

1 End of frame.

NAI No Address Increment.

This bit controls incrementing of the micro channel access.

0 Increment micro channel access.

1 Do not increment micro channel access.

BYTE COUNT Byte Count.

This field represents the number of bytes to transmit from the indicated address.

LOW ADDRESS Low Address.

This field represents the least significant 16 bits of micro channel or local address bus.

HIGH ADDRESS High Address.

This field represents the most significant 16 bits of a micro channel address or the most significant 4 bits of a local bus address.

LINK POINTER Link Pointer.

This field represents the least significant 16 bits of the local bus address for the next descriptor in the chain. A link pointer of zero indicates the end of the chain.

5.8.9. Transmit Operation

The operation of the transmit engine is as follows:

Fetch Transmit Descriptor. When the local processor enables a transmit queue via the QEN bit of a TDP, the transmit engine will issue a request to the local bus interface to fetch the first descriptor into internal storage. If multiple queues are enabled, then a request to prioritize with TQ0 having the highest priority and TQ3 the lowest.

Controller Signals Queue Ready. The controller interface periodically polls the controller's internal status register and passes the status to the transmit engine. When the status indicates that a queue is ready for data and a valid descriptor has been fetched for the queue, then the transmit engine will assign the queue to the internal FIFO (not shown). If multiple queues become ready for assignment at the same time, then the FIFO assignment is done on a priority basis with TQ0 having the highest priority and TQ3 the lowest. If the FIFO is busy servicing another queue, then the assignment is made with the FIFO becomes available.

Issues Service Requests. After assigning the queue to the FIFO, the transmit engine will issue a-bus master request to either the system interface or the local bus interface as required by the descriptor. The system interface or local bus interface will then begin load the FIFO. The transmit engine will issue a service request to the controller interface for the queue. The controller interface will then begin unloading the FIFO once 4 bytes become available.

FIFO Becomes Full. When the FIFO becomes full, the source interface (system or local bus) will stop loading data into it. The source interface will begin loading data again when the FIFO reaches half full.

Controller Signals Queue Almost Full. The controller interface will pass a queue almost full indication from the controller to the transmit engine. The transmit engine will then indicate the almost full condition to the system or local bus interface such that the appropriate interface can immediately stop loading the FIFO. Once the FIFO has been unloaded by the controller interface, the transmit engine is free to assign it to another queue.

End of Frame Descriptor. When the system or local bus interface indicates that the descriptor byte count has been exhausted and the EOF bit in the descriptor is set, the tranmit engine will indicate the end of frame condition to the controller interface such that it can set the EOF tag bit with the last byte of data. After the FIFO has been unloaded, the transmit engine will set the TDP bit in the appropriate TQSTAT if the IAP bit in the descriptor is set. Provided the link pointer field of the descriptor is not zero, the transmit engine will load the link pointer into the appropriate TDP and fetch the next descriptor. The FIFO is then available for assignment to another queue.

Descriptor Byte Count Exhausted. When the system or local bus interface indicates a descriptor byte count has been exhausted and the EOF bit in the descriptor is not set, the transmit engine will set the TDP bit in the appropriate TQSTAT if the IAP bit in the descriptor is set. Provided the link pointer field of the descriptor is not zero, the transmit engine will load the link pointer in the appropriate TDP and fetch the next descriptor. Once a new descriptor has been fetched, the transmit engine will issue a bus master request to the system or local bus interface as indicated by the descriptor.

Link Pointer Is Zero. After processing the data for a descriptor with a link pointer of zero, the transmit engine will disable the QEN bit of the appropriate queue and set the EDC bit in a corresponding TQSTAT. The FIFO is then available for assignment to another queue.

Local Processor Issues Abort Command. The local processor can abort activity for a queue by disabling the QEN bit of the appropriate TDP. The transmit engine will terminate all activity for that queue and set the queue aborted bit in the corresponding TQSTAT.

Error Condition Encountered. If an error condition is encountered while transferring data for a queue, the transmit engine will terminate all activity for the queue and disable the QEN bit in the appropriate TDP. The transmit engine will then indicate the error condition in the corresponding TQSTAT.

5.8.10 Slave Transmit Port

The slave transmit port 314 is a wired standard gate array that maps the 8 transmit queues 216 (see FIG. 5) managed by the controller memory space of the system. This allows devices on the system to write directly into the queues with the SIU as bus slave. The data is internally buffered through a 128-byte FIFO (not shown). The slave transmit port responds to data delivery requests from the system interface and issues requests for the appropriate queue to the controller interface. The local processor has the ability to selectively enable the mapping of each of the queues to the system via a slave transmit port enable register (not shown). The local processor ensures that the queues being services by the transmit engine are not also mapped to the slave transmit port. The slave transmit port occupies an 8 kilobyte region of the system memory space (not shown). It is made up of eight 1-kilobyte blocks that map directly to each of the 8 transmit queues.

5.8.11. Slave Transmit Port Operation

The slave transmit port operation is as follows:

System Accesses Slave Transmit Port. The SIU will respond to the initial request to the slave transmit port for a queue by indicating to the system that it is not ready. The slave transmit port will then ensure that all data for any previous queue has been transferred from the FIFO to the controller before indicating to the system that it is ready. The SIU can then load the FIFO with the data from the system bus. The SIU will not deassert channel ready as long as the subsequent accesses are for the same queue. The SIU will respond to accesses to the slave transmit port as a 64-bit 100 n.s. streaming data device provided at least 32-bytes are available in the FIFO, otherwise the SIU will respond as a 32-bit basic transfer device.

Unloading the FIFO. The controller interface will transfer the data from the FIFO to the controller as long as one byte is available. The data is sent to the queue indicated by the system address.

FIFO Becomes Full. When the FIFO becomes full, the SIU will respond to an access to the slave transmit port by deasserting channel ready. The SIU will assert channel ready as soon as 4 bytes become available in the FIFO.

Controller Signals Queue Almost Full. The queue almost full indication from the controller is ignored for transfers involving the slave transmit port.

Controller Signals Queue Full. The queue full indication from the controller is ignored for transfers involving the slave transmit port.

Data Parity Error from the System. A parity error detected on the data from the system will result in the data being ignored and a channel check being asserted.

Read Access to Slave Transmit Port. The controller of the SIU will not respond to any read access from the system to the address space of the slave transmit port.

Access to Disable Queue. The SIU will not respond to any access to a queue that has not been enabled via a slave transmit port enable register (not shown).

5.8.12. Shared Memory Window

A Shared Memory Window (SMW) 310 is a wired standard gate array that maps a region of the local bus memory 137 for the memory space of the system. This allows devices on the system to read and write local bus memory. Accesses to the SMW from the system will cause the SIU to become bus master of the local bus to transfer the data. The data is internally buffered through a 64-byte FIFO (not shown). The SMW responds to accesses from the SIU and issues bus master requests to the local bus interface. The SMW can be located any where within the lower 4 bytes of the system address space and is selectable in size, either 8 kilabytes or 16 kilobytes. The SMW must be located on a boundary according to its size.

5.8.13 System Write Access

System Write Access from the SMW is as follows:

System Indicates Non-Sequential Write. A non-sequential write is any write access to the SMW in which the system address does not sequentially follow the address from the previous operation or any write access that follows a read from the SMW. The SIU will respond to a non-sequential write address by indicating to the system that it is not ready. The SMW will then ensure that all data from any previous write has been transferred from the FIFO to the local bus or that any read data has been flushed from the FIFO before indicating to the system that it is ready. The SIU can then load the FIFO with data from the bus. The controller will not deassert channel ready again as long as subsequent accesses are sequential. The SIU will respond to write access to the SMW as a 64-bit 100 n.s. streaming data device provided at least 32 bytes were available in the FIFO, otherwise the SIU will respond as a 32-bit basic transfer device.

Unloading the FIFO. The local bus interface will transfer the data from the FIFO to the local bus as long as one byte is available. The data is sent to the address formed by the shared memory window base field and an offset field passed from the system address.

FIFO Becomes Full. When the FIFO becomes full, the system interface unit will respond to a write access to the shared memory window by deasserting channel ready signal. The system interface unit will assert channel ready as soon as 4 bytes become available in the FIFO.

Data Parity Error from the System. A parity error detected on the data from the system will result in the data being ignored and channel check being asserted.

5.8.14 System Read Access

System read access from the SMW is as follows:

System Initiates Non-Sequential Read. A non-sequential read is any read access to the shared memory window in which the system address does not sequentially follow the address from the previous operation or any read access that follows a write to the system shared memory window. The system interface unit will respond to a non-sequential read access by indicating to the system that it is not ready. The shared memory window will then ensure that all data from any previous write has been transferred from the FIFO to the local bus or that any read data has been flushed from the FIFO before issuing a read request to the local bus interface. The local bus interface will then begin to load the FIFO. The address used to obtain the data is the shared memory window base field address and offset field passed from the system address. Once 4 bytes are obtained in the FIFO, the system interface unit will indicate to the system that it is ready. The system interface unit will not deassert the channel not ready as long as subsequent accesses are sequential and at least 4 bytes of data are present in the FIFO. The system interface unit will respond to read access to the shared memory window as a 32-bit basic transfer device.

FIFO Becomes Full. When the FIFO becomes full, the local bus interface will stop loading data. The local bus interface will begin to fill the FIFO again when it becomes half empty.

Data Parity Error from Local Bus. For read accesses to the shared memory window, the local bus interface will not check parity on the data obtained from the local bus, rather it will pass the parity on to the system.

5.9. Adapter Operation

5.9.1. Receive Operation

A receive operation comprises the following steps:

Referring to FIG. 20 and FIG. 5, an operation 1000 provides serial packet and isochronous data from a LAN as an input to the network interface layer 116. An operation 1002 performed by the network interface layer converts the serial data stream into 80 ns. byte streams and tags all bytes as isochronous or packet data as per the standard LAN protocol specifications. The byte-wide stream is provided directly to the MAC 118 and indirectly to the I-MAC indicate engine 142.

In an operation 1004, the MAC 118 determines the beginning and end of a protocol data unit as per the LAN protocol specification, address comparisons are made and based on programmable criteria, the data is either stripped, copied or repeated. Data to be copied is presented to the P-MAC indicate engine 132 and then repeated. Repeated data and isochronous data is presented to the I-MAC indicate engine 142.

In an operation 1006 which can occur simultaneously with an operation 1006 (to be described), the P-MAC indicate engine stores the tagged packet data in a local FIFO 218 for staging purposes and then either directly transmits the packet data directly to the system interface or to the memory interface 210 for the FDDI RAM buffer 130.

The operation 1006' which may occur simultaneously with the operation 1006", processes the isochronous data in the I-MAC indicate engine 142. The engine uses the steering map 222, copies the data in the FIFO 223 with an associated queue number and tagged value to associate data from the byte stream with pre-programmed queue numbers. If a valid queue number exists in the steering map for the associated byte in the byte stream, then the data is copied into FIFO 223 for staging purposes. The queue manager transfers the first 4-byte word of the staging FIFO to either the memory interface bus 210 for storage in the FRB 130 or to the system interface unit 128.

An operation 1008, under control of the queue manager transfers the packet data to received queues 0–2 and the isochronous data from the I-MAC indicate engine to receive queues 3–7. The parameter RAM 218 is utilized by the queue manager to determine the FRB addresses that correspond to each queue. Once a queue has been programmed via the parameter RAM, it will allow data transfer to occur after it has been enabled by the setting of the appropriate bit in the queue enable/disable register. The threshold register defines the amount of data that will be buffered in the queue before transfer action is taken. The controller/system interface includes queue status register which is used to indicate when a queue is ready to support data transfer between the SIU and the controller. The system interface polls the status register periodically and begins to transfer data from those queues whose bits are set. A queue status register bit is reset after the last word is transmitted from the queue.

An operation 1010 conducted by the SIU 128 accesses the queue status register of the controller to identify which of the eight receive queues are ready to be serviced.

The system interface 127 will issue requests to the queue manager for a new receive data as data is transferred out of the SIU to the host bus system. The queue manager will, service the requests for each queue one at a time.

An operation 1012 is performed by the system interface 128 to transfer data from the receive FIFO to enter the Host Bus system or the local bus. A receive engine 218 controls the delivery of data from one of the receive queues to either the system bus 114 or a local bus 132. FDDI protocol frame data is sent to the local processing bus for processing all other queue data to the Host Bus System. The receive engine issues requests to a system bus arbitration unit (not shown) for data transfer bandwidth. It also issues requests to the local bus controller. The system interface contains descriptive pointers, one for each of the receive queues that locate a chain of linked receive descriptors in the local bus memory 137. A receive descriptor is a control block that is initialized by the local processor in the local memory. The control block defines the destination for the receive data in either the system bus address space or local memory address space. The receive engine will transfer data to the destination until either the byte count defined in the descriptor is exhausted, or the end of a frame (packet queues) has been reached.

5.9.2. Transmit Operations

Referring to FIGS. 21 and FIG. 5, an operation 1100 controls the delivery of data from the system bus or local bus to one of the four transmit queues in the FRB which are managed by the controller. Although the controller manages a total of 8 transmit queues in the FRB, the transmit engine 316 only has access to the first 4. The transmit engine 316 issues bus master requests to the system bus arbitration unit for data delivery. It also issues requests to the local bus for data delivery if requested. When the local processor enables a transmit queue, the SIU transmit engine will issue a request to the local bus interface to fetch the first descriptor into internal storage. When the controller queue status register indicates, that a queue is ready for data and a valid descriptor has been fetched for the queue, the transmit engine in an operation 1101 will assign the queue to the internal FIFO. After assigning the queue to the FIFO, the transmit engine will issue a request to either the system or the local bus as required by the descriptor. The system bus Dr local bus, as defined by the transmit descriptor, will then begin loading the FIFO. The system bus logic or local bus logic will then begin loading the FIFO. The transmit engine will also issue a request to the controller interface for the queue. The controller interface will begin unloading the FIFO once four bytes become available. When the queue storage in the FRB is almost full (unable to hold more than one transmit engine FIFO's worth of data) the transmit engine will empty the FIFO data into the transmit queue and assign the FIFO to another queue, if another queue is ready. The controller monitors queue status and reports almost full condition via the queue status register.

An operation 1102" enables the system interface to relate directly into the queues with the interface as bus slave. The slave transmit port (See FIG. 19) responds to data delivery requests from the system interface and issues service requests for the appropriate queues to the system interface. The local processor has the ability to selectively enable the mapping each of the queues to the system via the slave transmit port enable register. The local processor ensures that queues being serviced by the transmit engine are not also mapped to the slave transmit port.

The system interface will respond to an initial system bus request for a queue mapped to the slave transmit port by indicating to the system bus that the device is not ready for the transfer. The slave transmit port to a queue by indicating to the micro channel that it is not ready. The slave transmit port will then ensure that all data for any previous queue has been transferred from the slave transmit port FIFO to the controller before indicating to the system that it is ready. The slave transmit port FIFO can then be loaded with the data from the bus.

The system interface will transfer the data from the FIFO to the controller as long as one byte is available in the FIFO. The data is mapped to a specific queue indicated by the system address. If the slave transmit port FIFO becomes full during the operation, the system bus is held not ready until room for an additional transfer exists.

In an operation 1104 the controller interface 127 indicates to the queue manager that a transmit data word is available. The queue manager will read the transmit word out of the controller transmit register and assert an acknowledge to clear the register and inform the SIU that another transmit operation can be processed. The system interface transmits packet frames directly to a P-MAC or I-MAC transmit FIFO, if empty, without loading the words to the FRB. The ensuing words from the interface are written to the FRB in the appropriate queue. The queue manager maintains a write pointer and threshold for each queue that the data is being written to in FRB and also looks for the end of frame to occur on packet queues. Two packet frame counters are maintained in the queue manager, the reception of an end of frame for synchronous frame increments the synchronous frame counter, likewise for the asynchronous frame counter. The P-MAC transmit notifies the queue manager when the last byte of a synchronous frame has been transmitted, this results in the queue manager decrementing the frame count for the synchronous frame, likewise for the asynchronous frame.

In operation 1106', the P-MAC transmitter requests a service opportunity to the MAC once there is at least one complete frame buffered in the FRB. Synchronous frames have higher priority than asynchronous frames. If a synchronous frame becomes available while an asynchronous frame is being transmitted, the P-MAC transmitter requests MAC to switch to asynchronous frames servicing once the current asynchronous frame completes. The P-MAC transmitter switches to servicing the synchronous frames even though additional asynchronous frames are buffered. The synchronous frames that are available are sent to the MAC as long as the synchronous bandwidth counter is not expired. The P-MAC transmitter asserts a request for asynchronous traffic while the last synchronous frame is transmitted. If the MAC token holding timer has not expired, asynchronous frames will be transmitted.

In operation 1106" the controller interface writes the isochronous bytes from any of the isochronous transmit queues into the FDDI system based on the steering map entries and Queue Threshold. The steering map table provides a number of the queue from which the bytes have to be transmitted. A data byte is only transmitted if the steering map table entry for that byte is active and the queue is enabled and the threshold has been reached. The I-MAC request engine repeats the byte present on the indicate interface if the steering map transmit entry is inactive or the queue is disabled. The I-MAC request interface transmits the programmable flow control when a queue is empty or has not crossed its threshold if the transmit condition is true. After a queue has been underrun or was disabled, the byte transmission is resumed at the next FDDI2 cycle directly following the queue threshold crossing. If immediate thresholding is used, the I-MAC interface request engine waits for at least two words of buffering inside its FIFO before transmitting on the next FDDI2 cycle.

In an operation 1108 the physical interface layer accepts the packet and isochronous data from the MAC in sequence. The layer block encodes the data and converts the data from byte form to serial form for transmission to the FDDI system. This completes the transmit operation and the adapter returns to the start transmit operation.

The control operations associated with the Receive and Transmit operations have been described in connection with the DMA (Section 5.8.13) and the SMW (Section 5.8.12) Operations. Likewise, the system read and write access were described in Section 5.8.13 and 5.8.14, respectively.

While the operation of the invention has been described with respect to FDDI I/II systems, the invention can be used for other systems such as Token Ring, Ethernet, Isoethernet, and ATM's.

Having described the invention in connection with certain specific embodiments, it is to be understood that further modifications may now suggest themselves to those skilled in the art, and it is intended to over such modifications as falling within the spirit and scope of the present invention and the appended claims.

What is claimed is:

1. A method of controlling the delivery of data from an adapter including a controller, storage queues, a local processor and a local processor bus to a host bus system using a receive engine, comprising the steps of:
   a) storing data in the queues;
   b) issuing a request by the receive engine to the system for data delivery;
   c) issuing a request by the receive engine to the local bus interface for (i) data delivery and (ii) a descriptor list of addresses in the system for the storage of data;
   d) assigning a temporary storage buffer to a filled queue by the receive engine;
   e) filling the temporary storage buffer with data from the queues by the controller on signal from the receive engine; and
   f) signalling the system by the receive engine to empty the temporary storage buffer to the system at addresses specified in the descriptor list.

2. The method of claim 1 further comprising the steps of:
   a) polling an internal status register of the controller to determine whether a queue is ready to be emptied; and
   b) initiating the request for data delivery when the status register indicates the queue is filled.

3. The method of claim 2 further comprising the steps of:
   a) forming descriptor pointers for each queue which locate a chain of linked descriptors in a local bus memory.

4. The method of claim 3 further comprising the steps of:
   a) forming a received descriptor which is initialized by the local processor and a local bus memory to indicate to the receive engine the destination for received data.

5. The method of claim 4 further comprising the step of:
   a) providing for each received descriptor a control word, a byte count, an address low, an address high and a linked pointer.

6. The method of claim 5 further comprising the step of:
   a) transferring data through the receive engine to a destination in the system till either the byte count field is exhausted or an end of frame has been reached.

7. The method of claim 6 further comprising the step of:
   a) transferring the receive engine to the next descriptor in the list and continuing the transfer of data to the system.

8. The method of claim 7 further comprising the step of:
   a) updating the control word and byte count and moving to the next descriptor in the list when an end of frame is reached.

9. The method of claim 8 further comprising the steps of:
   a) forming a plurality of FIFO registers in the temporary storage buffer;
   b) filling the FIFO with data from a designated queue; and
   c) unloading the FIFO once it becomes half-full using a host bus system interface or local processor bus interface.

10. The method of claim 9 further comprising the steps of:
    a) terminating the transfer of data to the host system bus interface or the local processor bus interface when the FIFO becomes full; and b) reinitiating the transfer of data when at least a selected number of bytes are available in the FIFO.

11. A method of controlling the delivery of data to an adapter including a controller, storage queues, a local processor and a local processor bus from a host bus system using a transmit engine, comprising the steps of:
   a) issuing a request to a local bus interface by the transmit engine to fetch a descriptor list for the transfer of data from the system;
   b) assigning a queue to a temporary storge buffer in the transmit engine;
   c) issuing a request to the system or the local bus by the transmit engine to begin filling the temporary storage buffer;
   d) issuing a request to the controller by the transmit engine to begin unloading the temporary storage buffer and filling the storage queues;
   e) signalling the transmit engine by the controller when the queue is almost full; and
   f) signalling the system or the local bus by the transmit engine to stop filling the temporary storage buffer.

12. The method of claim 11 further comprising the step of:
   a) issuing a request to a slave transport port by a data device coupled to the system to write directly to a queue;
   b) issuing a request to the controller by the slave transmit port for assignement of a storage queue to store system data;
   c) loading a storage buffer in the slave transmit port by the system; and
   d) emptying the storage buffer by the controller to a queue indicated by a system address.

13. The method of claim 12 further comprising the step of:
   a) assigning the FIFO to another queue after the FIFO has been unloaded by the controller.

14. The method of claim 11 further comprising the step of:
   a) forming a transmit descriptor containing a control word, a byte count, an address low, an address high, and a linked pointer.

15. The method of claim 14 further comprising the steps of:
   a) forming descriptor pointers that locate a chain of linked transmit descriptors in a local bus memory; and
   b) accessing a descriptor in the list using a transmit descriptor pointer in a base field of a local processor bus address register, the least significant bit of the transmit descriptor pointer being a Queue Enable Bit (QEN).

16. The method of claim 15 further comprising the step of
   a) processing each descriptor by loading the linked pointer field into the transmit descriptor pointer and fetching the next descriptor in the chain until a linked pointer of zero is encountered.

17. The method of claim 16 further comprising the step of:
   a) disenabling the QEN bit of the transmit descriptor pointer when the linked pointer is zero.

18. The method of claim 17 further comprising the steps of:
   a) receiving a signal from a controller wherein a queue is ready for data;
   b) fetching a valid descriptor for the queue; and
   c) assigning a queue to a FIFO register in the temporary storage buffer.

19. A method of controlling the delivery of data from a host bus system using a slave transmit engine to an adapter including a controller, storage queues, a local processor, a local processor bus and a local memory comprising the steps:
   a) assigning a queue to a temporary storage buffer contained in the slave transmit engine;
   b) using the system interface unit to load the temporary storage buffer with data from the host bus system;
   c) using the controller to transfer data from the temporary storage buffer to the queue indicated by a system address; and
   d) transferring the data to the queue using a streaming data or basic transfer mode.

20. The method of claim 19 wherein a shared memory buffer allows input/output devices on the system to read and write local bus memory and accesses to the shared memory buffer cause the system interface unit to become bus master of the local bus in transferring data therebetween.

21. The method of claim 20 further comprising the step of:
   buffering the transferred data in the shared memory buffer.

22. Apparatus for controlling the delivery of data from an adapter including a controller, storage queues, a local processor and a local processor bus to a host bus system using a receive engine, comprising:
   a) means for storing data in the queues;
   b) means for issuing a request by the receive engine to the system for data delivery;
   c) means for issuing a request by the receive engine to a local bus interface for (i) data delivery and (ii) a descriptor list of addresses in the system for the storage of data;
   d) means for assigning a temporary storage buffer to a filled queue by the receive engine;
   e) means for filling the temporary storage buffer with data from the queues by the controller on signal from the receive engine; and
   f) means for signalling the system by the receive engine to empty the buffer to the system at addresses specified in the descriptor list.

23. The apparatus of claim 22 further comprising:
   a) means for polling an internal status register of the controller to determine whether a queue is ready to be emptied; and
   b) means for initiating the request for data delivery when the status register indicates the queue is filled.

24. The apparatus of claim 23 further comprising:
   a) means for forming descriptor pointers for each queue which locate a chain of linked descriptors in a local bus memory.

25. The apparatus of claim 24 further comprising:
   a) means for forming a received descriptor which is initialized by the local processor and a local bus memory to indicate to the receive engine the destination for received data.

26. The apparatus of claim 25 further comprising:
   a) means for providing for each received descriptor a control word, a byte count, an address low, an address high and a linked pointer.

27. The apparatus of claim 26 further comprising:
   means for transferring data through the receive engine to a destination in the system till either the byte count field is exhausted or an end of frame has been reached.

28. The apparatus of claim 27 further comprising:
   means for transferring the receive engine to the next descriptor in the list and continuing the transfer of data to the system.

29. The apparatus of claim 28 further comprising:
means for updating the control word and byte count and moving to the next descriptor in the list when an end of frame is reached.

30. The apparatus of claim 29 further comprising:
a) means for forming a plurality of FIFO registers in the temporary storage buffer;
b) means for filling the FIFO with data from a designated queue; and
c) means for unloading the FIFO once it becomes half-full using a host bus system interface or local processor bus interface.

31. The apparatus of claim 30 further comprising:
a) means for terminating the transfer of data to the host system bus interface or the local processor bus interface when the FIFO becomes full; and
b) means for reinitiating the transfer of data when at least a selected number of bytes are available in the FIFO.

32. Apparatus for controlling the delivery of data from a host bus system using a transmit engine to an adapter including a controller, storage queues, a local processor and a local processor bus, comprising:
a) means for issuing a request to a local bus interface by the transmit engine to fetch a descriptor list for the transfer of data from the system;
b) means for assigning a queue to a temporary storage buffer in the transmit engine;
c) means for issuing a request to the system or the local bus by the transmit engine to begin filling the temporary storage buffer;
d) means for issuing a request to the controller by the transmit engine to begin unloading the temporary storage buffer and filling the storage queues;
e) means for signalling the transmit engine by the controller when the queue is almost full; and
f) means for signalling the system or the local bus by the transmit engine to stop filling the temporary storage buffer.

33. The apparatus of claim 32 further comprising:
means for forming a transmit descriptor containing a control word, a byte count, an address low, an address high, and a link pointer.

34. The apparatus of claim 33 further comprising:
a) means for forming descriptor pointers that locate a chain of link transmit descriptors in a local bus memory; and
b) means for accessing a descriptor in the list using a transmit descriptor pointer in a base field of a local processor bus address register, the least significant bit of the transmit descriptor pointer being a Queue Enable Bit (QEN).

35. The apparatus of claim 34 further comprising:
means for processing each descriptor by loading the linked pointer field into the transmit descriptor pointer and fetching the next descriptor in the chain until a linked pointer of zero is encountered.

36. The apparatus of claim 35 further comprising:
means for disenabling the QEN bit of the transmit descriptor pointer when the linked pointer is zero.

37. The apparatus of claim 36 further comprising:
a) means for receiving a signal from a controller wherein a queue is ready for data;
b) means for fetching a valid descriptor for the queue;
c) means for assigning a queue to a FIFO register in the temporary storage buffer.

38. The apparatus of claim 37 further comprising:
a) means for issuing a request to a slave transport port by a data device coupled to the system to write directly to a queue;
b) means for issuing a request to the controller by the slave transmit port for assignment of a storage queue to store system data;
c) means for loading a storage buffer in the slave transmit port by the system; and
d) means for emptying the storage buffer by the controller to a queue indicated by a system address.

39. The apparatus of claim 38 further comprising:
means for assigning the FIFO to another queue after the FIFO has been unloaded by the controller.

40. The apparatus of claim 39 further comprising:
a) means for controlling the delivery of data to an adapter including a controller, storage queues, a local processor, a local processor bus and a local memory from a host bus system using a slave transmit engine;
b) means for assigning a queue to a temporary storage buffer contained in the slave transmit engine;
c) means for using the system interface unit to load the temporary storage buffer with data from the host bus system;
d) means for using the controller to transfer data from the FIFO to the queue indicated by a system address; and
e) means for transferring the data to the queue using a streaming data or basic transfer mode.

41. Apparatus for controlling the delivery of data from an adapter including a controller, storage queues, a local processor and a local processor bus to a host bus system comprising:
a) means for issuing a request to a slave transport port by a data device coupled to the system to write directly to a queue;
b) means for issuing a request to the controller by the slave transmit port for assignment of a storage queue to store system data;
c) means for loading a storage buffer in the slave transmit port by the system; and
d) means for emptying the storage buffer by the controller to a queue indicated by a system address.

42. The apparatus of claim 41 further comprising means for assigning the FIFO to another queue after the FIFO has been unloaded by the controller.

43. Apparatus controlling the delivery of data from a host bus system using a slave transmit engine to an adapter including a controller, storage queues, a local processor, a local processor bus and a local memory comprising:
a) means for assigning a queue to a temporary storage buffer contained in the slave transmit engine;
b) means for using the system interface unit to load the temporary storage buffer with data from the host bus system;
c) means for using the controller to transfer data from the temporary storage buffer to the queue indicated by a system address; and
d) means for transferring the data to the queue using a streaming data or basic transfer mode.

44. The apparatus of claim 43 further comprising a shared memory buffer which allows input/output devices on the system to read and write local bus memory and accesses to the shared memory buffer which cause the system interface unit to become bus master of the local in transferring data therebetween.

45. The apparatus of claim 44 further comprising means for buffering the transferred data in the shared memory buffer.

46. An article of manufacturing comprising:

a computer usable medium having computer readable program code means embodied therein for controlling the delivery of data from an adapter including a controller, storage queues, a local processor and a local processor bus to a host bus system using a receive engine, the computer readable program code means in said article of manufacturing comprising:

a) computer readable program code means for storing data in the queues;

b) computer readable program code means for issuing a request by the receive engine to the system for data delivery;

c) computer readable program code means for issuing a request by the receive engine to a local bus interface for (i) data delivery and (ii) a descriptor list of addresses in the system for the storage of data;

d) computer readable code means for assigning a temporary storage buffer to a filled queue by the receive engine;

e) computer readable code means for filling the temporary storage buffer with data from the queues by the controller on signal from the receive engine; and f) computer readable code means for signalling the system by the receive engine to empty the buffer to the system at addresses specified in the descriptor list.

47. An article of manufacture, comprising:

a computer usable medium having computer readable program code means embodied therein for controlling the delivery of data from a host bus system using a transmit engine to an adapter including a controller, storage queues, a local processor and a local processor bus, the computer readable program code means in said article of manufacture comprising:

a) computer readable program code means for issuing a request to a local bus interface by the transmit engine to fetch a descriptor list for the transfer of data from the system;

b) computer readable program code means for assigning a queue to a temporary storage buffer in the transmit engine;

c) computer readable program code means for issuing a request to the system or the local bus by the transmit engine to begin filling the temporary storage buffer;

d) computer readable program code means for issuing a request to the controller by the transmit engine to begin unloading the temporary storage buffer and filling the storage queues;

e) computer readable program code means for signalling the transmit engine by the controller when the queue is almost full; and f) computer readable program code means for signalling the system or the local bus by the transmit engine to stop filling the temporary storage buffer.

48. An article of manufacture, comprising:

a computer usable medium having computer readable program code means embodied therein for controlling the delivery of data from a host bus system using a slave transmit engine to an adapter including a controller, storage queues, a local processor, a local processor bus and a local memory, the computer readable program code means in said article of manufacture comprising:

a) computer readable program code means for assigning a queue to a temporary storage buffer contained in the slave transmit engine;

b) computer readable program code means for using a system interface unit to load the temporary storage buffer with data from the host bus system;

c) computer readable program code means for using the controller to transfer data from the temporary storage buffer to the queue indicated by a system address; and d) computer readable program code means for transferring the data to the queue using a streaming data or basic transfer mode.

* * * * *